（12） United States Patent
Ikenuma et al.

(10) Patent No.: US 10,354,810 B2
(45) Date of Patent: Jul. 16, 2019

(54) ELECTRODE, POWER STORAGE DEVICE, ELECTRONIC DEVICE, AND METHOD FOR FABRICATING ELECTRODE

(71) Applicant: SEMICONDUCTOR ENERGY LABORATORY CO., LTD., Atsugi-shi, Kanagawa-ken (JP)

(72) Inventors: Tatsuya Ikenuma, Kanagawa (JP); Kazutaka Kuriki, Kanagawa (JP); Ai Nakagawa, Kanagawa (JP)

(73) Assignee: Semiconductor Energy Laboratory Co., Ltd., Kanagawa-ken (JP)

(*) Notice: Subject to any disclaimer, the term of this patent is extended or adjusted under 35 U.S.C. 154(b) by 768 days.

(21) Appl. No.: 14/645,090

(22) Filed: Mar. 11, 2015

(65) Prior Publication Data
US 2015/0262762 A1 Sep. 17, 2015

(30) Foreign Application Priority Data

Mar. 13, 2014 (JP) .................... 2014-050374
Oct. 23, 2014 (JP) .................... 2014-216071

(51) Int. Cl.
H01G 11/30 (2013.01)
H01G 11/38 (2013.01)
(Continued)

(52) U.S. Cl.
CPC ........... *H01G 11/38* (2013.01); *G06F 1/16* (2013.01); *H01G 11/30* (2013.01); *H01G 11/40* (2013.01);
(Continued)

(58) Field of Classification Search
None
See application file for complete search history.

(56) References Cited

U.S. PATENT DOCUMENTS 5,705,291 A   1/1998 Amatucci et al.
6,218,050 B1  4/2001 Yoon et al.
(Continued)

FOREIGN PATENT DOCUMENTS

CN   102388486 A   3/2012
CN   103022440 A   4/2013
(Continued)

OTHER PUBLICATIONS

International Search Report (Application No. PCT/IB2015/051632), dated May 26, 2015.
(Continued)

*Primary Examiner* — Daniel S Gatewood
(74) *Attorney, Agent, or Firm* — Nixon Peabody LLP; Jeffrey L. Costellia

(57) ABSTRACT

The cycle performance of a lithium-ion secondary battery or a lithium-ion capacitor can be obtained by minimizing the decomposition reaction of an electrolytic solution, etc. in the repeated charge and discharge cycles of the lithium-ion secondary battery or the lithium-ion capacitor. An electrode includes a current collector and an active material layer over the current collector. The active material layer includes active material particles, a conductive additive, a binder, and a film containing silicon oxide as its main component. The surface of one of the active material particles includes at least one of a region in contact with the surface of another active material particle, a region in contact with the conductive additive, and a region in contact with the binder. The surface of the active material particle except these regions is at least partly in contact with the film containing silicon oxide as its main component.

6 Claims, 22 Drawing Sheets

(51) Int. Cl.
*H01G 11/40* (2013.01)
*H01G 11/86* (2013.01)
*H01M 4/13* (2010.01)
*H01M 4/1393* (2010.01)
*H01M 4/133* (2010.01)
*H01M 4/36* (2006.01)
*H01M 4/58* (2010.01)
*H01M 4/587* (2010.01)
*H01M 4/62* (2006.01)
*H01M 4/04* (2006.01)
*G06F 1/16* (2006.01)
*H01M 4/02* (2006.01)

(52) U.S. Cl.
CPC .......... *H01G 11/86* (2013.01); *H01M 4/0404* (2013.01); *H01M 4/0419* (2013.01); *H01M 4/0471* (2013.01); *H01M 4/133* (2013.01); *H01M 4/1393* (2013.01); *H01M 4/366* (2013.01); *H01M 4/587* (2013.01); *H01M 4/622* (2013.01); *H01M 4/625* (2013.01); *H01M 2004/027* (2013.01); *Y02E 60/13* (2013.01); *Y02T 10/7022* (2013.01)

(56) References Cited

U.S. PATENT DOCUMENTS

| | | | |
|---|---|---|---|
| 8,906,547 B2 | 12/2014 | Taniguchi et al. | |
| 9,362,557 B2 | 6/2016 | Watanabe et al. | |
| 2011/0177396 A1* | 7/2011 | Moriwaka | H01M 4/133 429/304 |
| 2011/0291240 A1 | 12/2011 | Yamazaki | |
| 2012/0064406 A1* | 3/2012 | Sato | H01M 4/0421 429/213 |
| 2012/0141866 A1 | 6/2012 | Kuriki et al. | |
| 2012/0261622 A1 | 10/2012 | Honma | |
| 2013/0052528 A1 | 2/2013 | Kuriki et al. | |
| 2013/0078516 A1* | 3/2013 | Taniguchi | H01M 4/366 429/213 |
| 2013/0230772 A1 | 9/2013 | Noda et al. | |
| 2013/0266858 A1 | 10/2013 | Inoue et al. | |
| 2013/0323585 A1 | 12/2013 | Inoue et al. | |
| 2014/0087251 A1 | 3/2014 | Takahashi et al. | |
| 2014/0099554 A1 | 4/2014 | Inoue et al. | |
| 2014/0127566 A1 | 5/2014 | Kuriki et al. | |
| 2014/0127567 A1 | 5/2014 | Kuriki et al. | |

FOREIGN PATENT DOCUMENTS

| | | | |
|---|---|---|---|
| EP | 2518803 A | 10/2012 | |
| EP | 2573843 A | 3/2013 | |
| EP | 2685530 A | 1/2014 | |
| JP | 61-230264 A | 10/1986 | |
| JP | 08-102332 A | 4/1996 | |
| JP | 09-063905 A | 3/1997 | |
| JP | 10-255800 A | 9/1998 | |
| JP | 11-096993 | 4/1999 | |
| JP | 11-329504 A | 11/1999 | |
| JP | 2001-126740 A | 5/2001 | |
| JP | 2002-008657 A | 1/2002 | |
| JP | 2004-014381 | 1/2004 | |
| JP | 2005-078800 A | 3/2005 | |
| JP | 2005-302510 | 10/2005 | |
| JP | 2005-332769 | 12/2005 | |
| JP | 2005-347147 | 12/2005 | |
| JP | 2006-059641 | 3/2006 | |
| JP | 2006-156008 | 6/2006 | |
| JP | 2008-016195 | 1/2008 | |
| JP | 2009-193686 | 8/2009 | |
| JP | 2009-245926 | 10/2009 | |
| JP | 2010-015895 A | 1/2010 | |
| JP | 2010-102895 A | 5/2010 | |
| JP | 2010-118330 A | 5/2010 | |
| JP | 2010102895 A | * 5/2010 | |
| JP | 2010-244847 | 10/2010 | |
| JP | 2013-069531 A | 4/2013 | |
| JP | 2014-112539 A | 6/2014 | |
| JP | 2014-157661 A | 8/2014 | |
| KR | 2013-0032267 A | 4/2013 | |
| TW | 201145655 | 12/2011 | |
| TW | 201238127 | 9/2012 | |
| TW | 201306363 | 2/2013 | |
| TW | 201330367 | 7/2013 | |
| TW | 201436349 | 9/2014 | |
| WO | WO-2003/061050 | 7/2003 | |
| WO | WO-2010/001993 | 1/2010 | |
| WO | WO-2012/147837 | 11/2012 | |
| WO | WO-2014/073461 | 5/2014 | |

OTHER PUBLICATIONS

Written Opinion (Application No. PCT/IB2015/051632), dated May 26, 2015.
Lithium secondary battery, 6.1.6 Influence of Electrolytic Solution and Surface Film Formation, pp. 116-124.
$222^{nd}$ ECS Meeting Abstract, "Improvement of Cycle Performance of Lithium Ion Batteries at Elevated Temperature of 60° C. Using Graphite Coated with Metal Oxide", pp. 654.
Taiwanese Office Action (Application No. 104107414) dated Oct. 25, 2018.

* cited by examiner

FIG. 9A
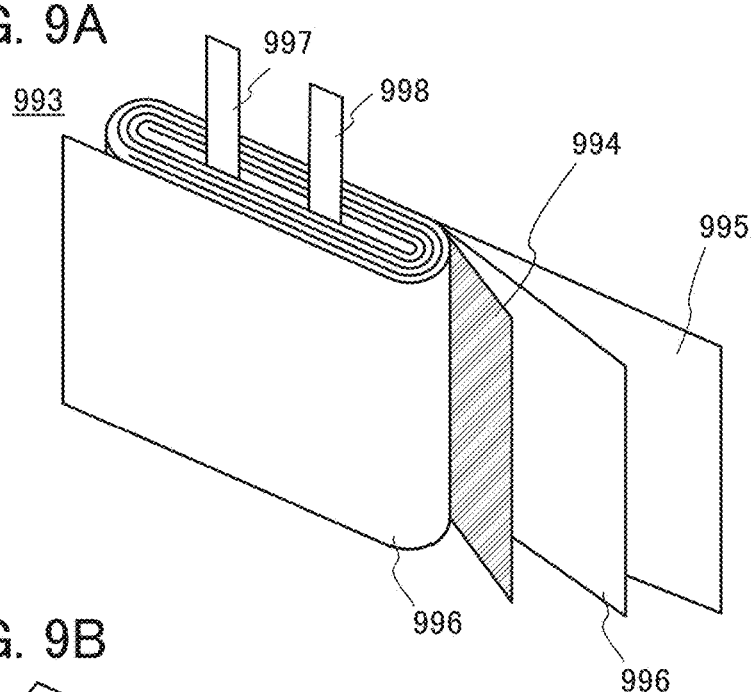
FIG. 9B
FIG. 9C
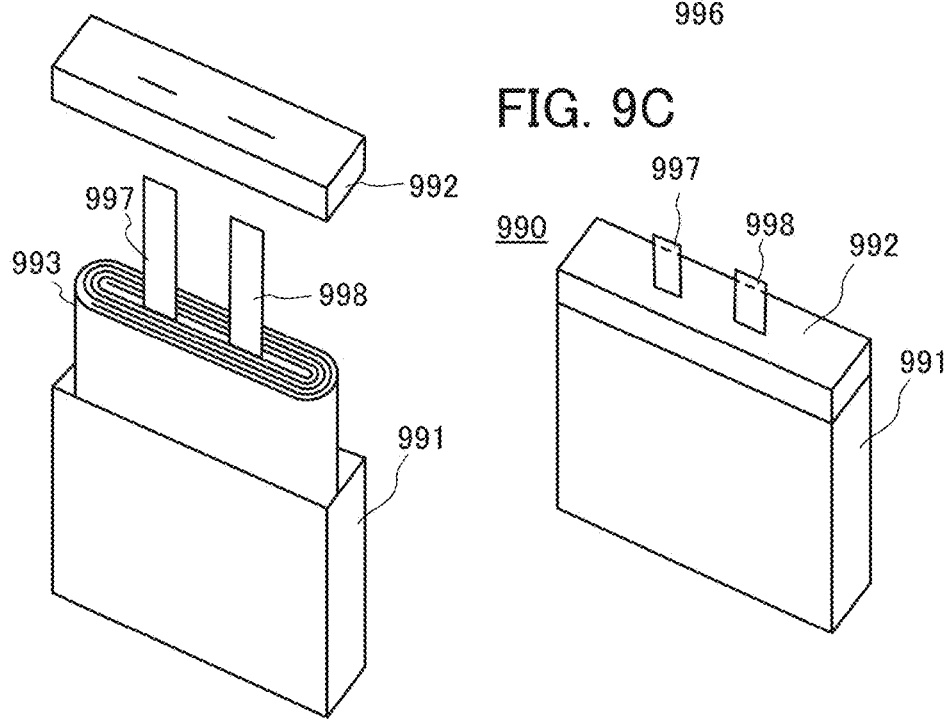

FIG. 11A1 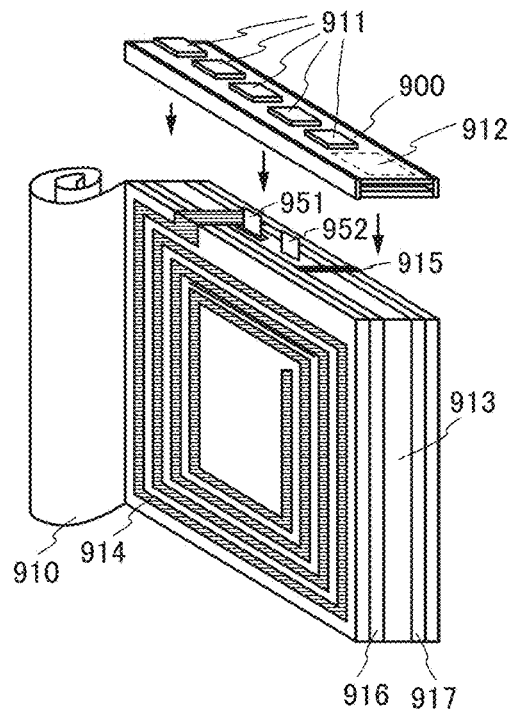
FIG. 11A2 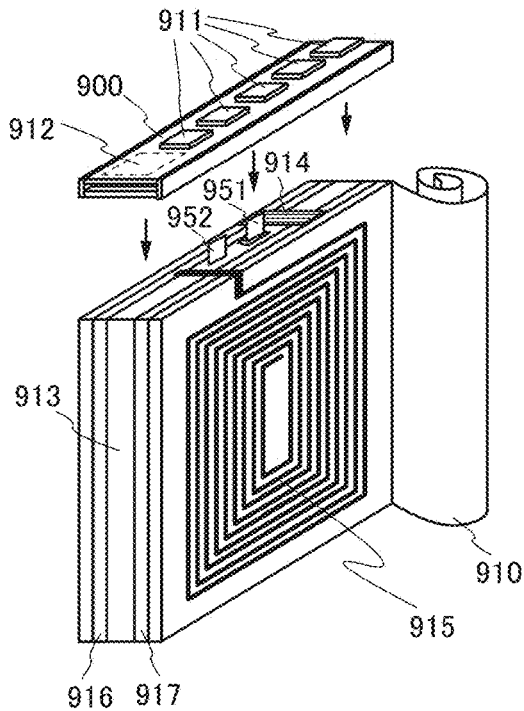
FIG. 11B1 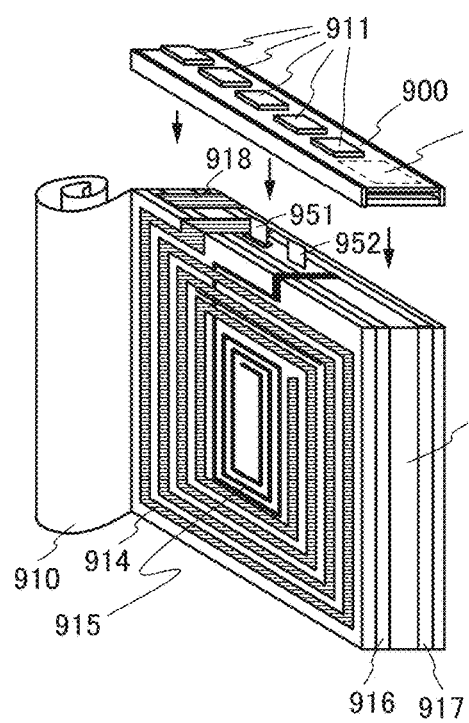
FIG. 11B2 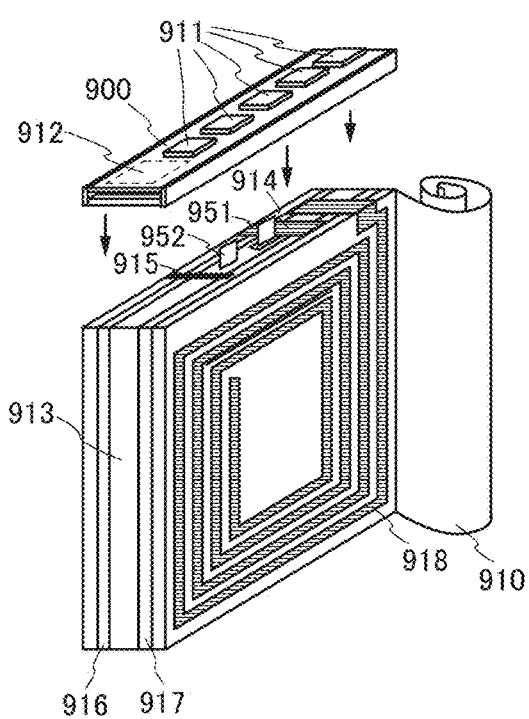

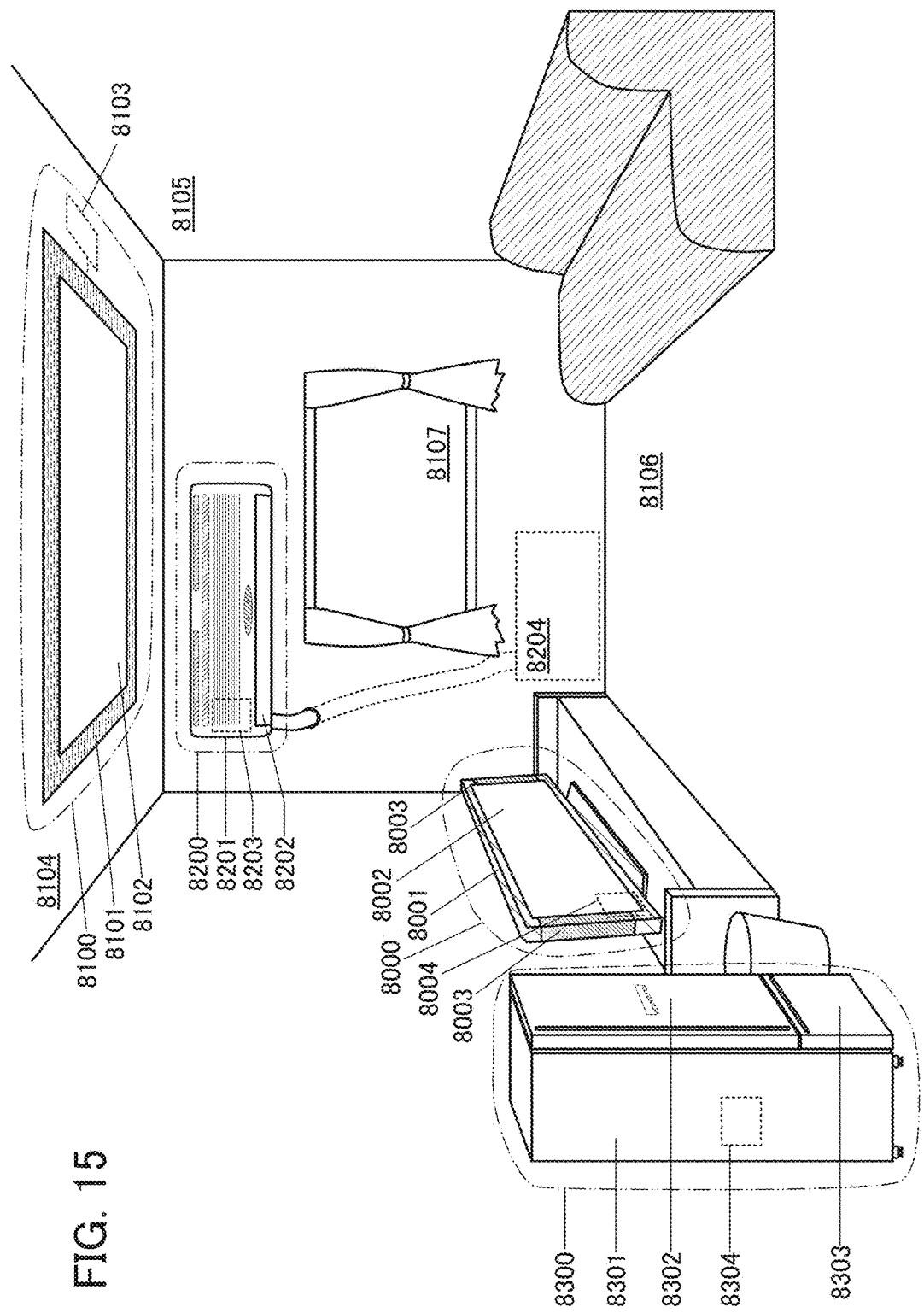

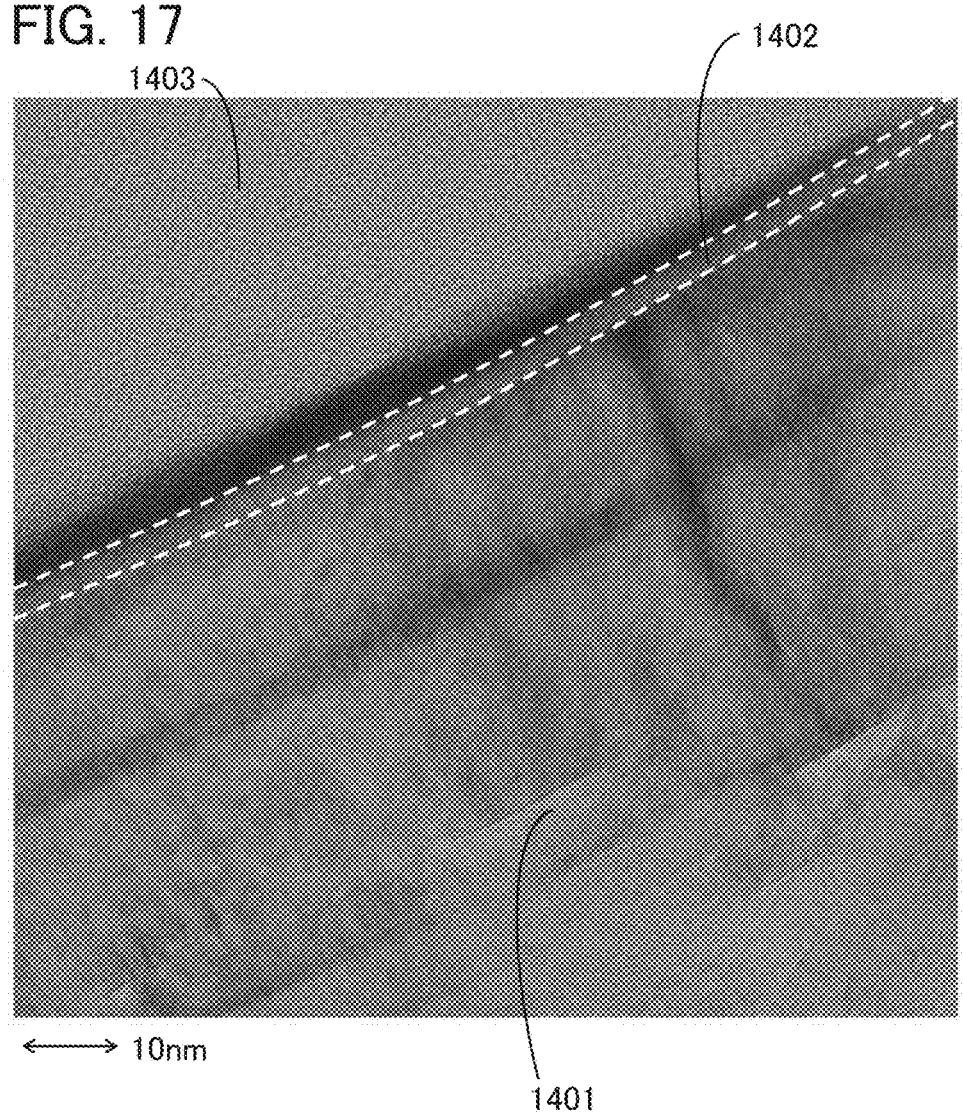

● Si₂O₅H(136.9)

● C(12.0)

←→ 10nm

←→ 10nm

ELECTRODE, POWER STORAGE DEVICE, ELECTRONIC DEVICE, AND METHOD FOR FABRICATING ELECTRODE

TECHNICAL FIELD

Embodiments of the present invention relate to an electrode, a power storage device, an electronic device, and a method for fabricating the electrode.

Note that one embodiment of the present invention is not limited to the above technical field. The technical field of one embodiment of the invention disclosed in this specification and the like relates to an object, a method, or a manufacturing method. One embodiment of the present invention relates to a process, a machine, manufacture, or a composition of matter. Specifically, examples of the technical field of one embodiment of the present invention disclosed in this specification include a semiconductor device, a display device, a liquid crystal display device, a light-emitting device, a lighting device, a power storage device, a storage device, a method for driving any of them, and a method for manufacturing any of them.

BACKGROUND ART

In recent years, a variety of power storage devices, for example, nonaqueous secondary batteries such as lithium-ion secondary batteries (LIBs), lithium-ion capacitors (LICs), and air cells have been actively developed. In particular, demand for lithium-ion secondary batteries with high output and high energy density has rapidly grown with the development of the semiconductor industry, for electronic devices, for example, portable information terminals such as cell phones, smartphones, and laptop computers, portable music players, and digital cameras; medical equipment; next-generation clean energy vehicles such as hybrid electric vehicles (HEVs), electric vehicles (EVs), and plug-in hybrid electric vehicles (PHEVs); and the like. The lithium-ion secondary batteries are essential as rechargeable energy supply sources for today's information society.

A negative electrode for power storage devices such as lithium-ion secondary batteries and the lithium-ion capacitors is a structure body including at least a current collector (hereinafter referred to as a negative electrode current collector) and an active material layer (hereinafter referred to as a negative electrode active material layer) provided over a surface of the negative electrode current collector. The negative electrode active material layer contains an active material (hereinafter referred to as a negative electrode active material) which can receive and release lithium ions serving as carrier ions, such as carbon or silicon.

At present, a negative electrode of a lithium-ion secondary battery which contains a graphite-based carbon material is generally formed by mixing graphite as a negative electrode active material, acetylene black (AB) as a conductive additive, PVDF, which is a resin as a binder, to form a slurry, applying the slurry over a current collector, and drying the slurry, for example.

Such a negative electrode of a lithium-ion secondary battery and a lithium-ion capacitor has an extremely low electrode potential and a high reducing ability. For this reason, an electrolytic solution containing an organic solvent is subjected to reductive decomposition. The range of potentials in which the electrolysis of an electrolytic solution does not occur is referred to as a potential window. The potential of the negative electrode needs to be within the potential window of an electrolytic solution. Most of the potentials of negative electrodes of lithium-ion secondary batteries and lithium-ion capacitors are, however, out of the potential windows of all electrolytic solutions; thus, electrolytic solutions are subjected to reductive decomposition and passivating films (also referred to as solid electrolyte films) are formed as decomposition products on the surfaces of the negative electrodes. The passivating films inhibit further reductive decomposition, which enables insertion of lithium ions into the negative electrodes with the use of low electrode potentials out of the potential windows of the electrolytic solutions (for example, see Non-Patent Document 1).

[Non-Patent Document 1] Zempachi Ogumi, "Lithium Secondary Battery", Ohmsha, Ltd., the first impression of the first edition published on Mar. 20, 2008, pp. 116-118

DISCLOSURE OF INVENTION

A passivating film is a reductive decomposition product generated by reductive decomposition reaction of an electrolytic solution or a product of a reaction between a reductive decomposition product and an electrolytic solution. For example, in the case where a negative electrode active material is graphite, which has a layered structure, a passivating film is formed between layers in an edge surface of the graphite and on a surface (basal surface) of the graphite. When carrier ions are inserted into the graphite and thus the volume of the graphite increases, part of the passivating film is separated from the graphite and part of the negative electrode active material is exposed.

Although a generated passivating film kinetically inhibits the decomposition of an electrolytic solution, the thickness of the passivating film gradually increases on repeated charge and discharge. The passivating film having an increased thickness is susceptible to the volume expansion of a negative electrode active material, and part of the passivating film is easily separated.

Another passivating film is formed on a surface of the negative electrode active material which is exposed by the separation of the passivating film.

A passivating film of a conventional negative electrode is considered as being formed because of battery reaction in charging, and electric charge used for formation of the passivating film cannot be discharged. Thus, irreversible capacity resulting from the electric charge used for forming the passivating film reduces the initial discharge capacity of a lithium-ion secondary battery. In addition, separation of the passivating film and formation of other passivating films on repeated charge and discharge further reduce the discharge capacity.

As the electrochemical decomposition of an electrolytic solution proceeds, the amount of lithium responsible for charge and discharge is decreased in accordance with the number of electrons used in the decomposition reaction of the electrolytic solution. Therefore, as charge and discharge are repeated and other passivating films are formed, the capacity of a lithium-ion secondary battery is lost after a while. In addition, the higher the temperature is, the faster the electrochemical reaction proceeds. Thus, the capacity of a lithium-ion secondary battery decreases more significantly as charge and discharge are repeated at high temperature.

Not only lithium-ion secondary batteries but also power storage devices such as lithium-ion capacitors have the above problems.

In view of the above, an object of one embodiment of the present invention is to minimize the electrochemical decomposition of an electrolytic solution, etc. around an electrode in a lithium-ion secondary battery or a lithium-ion capacitor.

Another object of one embodiment of the present invention is to improve the long-term cycle performance of a lithium-ion secondary battery or a lithium-ion capacitor by minimizing the decomposition reaction of an electrolytic solution, etc. as a side reaction of charge and discharge in the repeated charge and discharge cycles of the lithium-ion secondary battery or the lithium-ion capacitor.

Another object of one embodiment of the present invention is to provide an electrode that allows minimization of the decomposition reaction of an electrolytic solution, etc. in a lithium-ion secondary battery or a lithium-ion capacitor.

Another object of one embodiment of the present invention is to provide a power storage device where the decomposition reaction of an electrolytic solution, etc. around an electrode can be minimized.

Another object of one embodiment of the present invention is to provide a method for fabricating an electrode that allows minimization of the decomposition reaction of an electrolytic solution or the like in a lithium-ion secondary battery or a lithium-ion capacitor.

Another object of one embodiment of the present invention is to provide a novel electrode, a novel power storage device, or the like. Note that the descriptions of these objects do not disturb the existence of other objects. Note that one embodiment of the present invention does not necessarily achieve all the objects. Objects other than the above objects will be apparent from and can be derived from the descriptions of the specification, the drawings, the claims, and the like.

One embodiment of the present invention is an electrode including a current collector and an active material layer over the current collector. The active material layer includes active material particles, a conductive additive, a binder, and a film containing silicon oxide as its main component. The surface of at least one of the active material particles includes at least one of a first region in contact with one of the other active material particles, a second region in contact with the conductive additive, and a third region in contact with the binder. The surface of the one of the active material particles except the first to third regions is at least partly in contact with the film containing silicon oxide as its main component.

In the above structure, the active material particles preferably contain graphite. Furthermore, in the above structure, the conductive additive preferably has a needle-like shape. Furthermore, in the above structure, the binder preferably contains a water-soluble polymer. The water-soluble polymer preferably includes one or more of carboxymethyl cellulose, methyl cellulose, ethyl cellulose, hydroxypropyl cellulose, diacetyl cellulose, a styrene monomer, and a butadiene monomer.

Another embodiment of the present invention is a power storage device including the electrode described above and a second electrode. The electrode described above has a function of operating as one of a positive electrode and a negative electrode. The second electrode has a function of operating as the other of the positive electrode and the negative electrode.

Another embodiment of the present invention is an electronic device including the power storage device described above and a display device.

Another embodiment of the present invention is a method for fabricating an electrode that includes preparing a dispersion liquid containing active material particles, an organosilicon compound, and a solvent; forming powder by spraying and drying the dispersion liquid with a spray dryer; performing heat treatment on the powder; forming slurry by mixing the powder, a conductive additive, a binder, and a solvent after performing the heat treatment; and forming an active material layer by applying the slurry to a current collector and drying the slurry. In the step of performing heat treatment, the organosilicon compound deposited on the active material particles is hydrolyzed and condensed, so that a film containing silicon oxide as its main component is formed on at least part of a surface of each of the active material particles.

Another embodiment of the present invention is a method for fabricating an electrode that includes preparing a dispersion liquid containing active material particles, an organosilicon compound, a conductive additive, and a solvent; forming powder by spraying and drying the dispersion liquid with a spray dryer; performing heat treatment on the powder; forming slurry by mixing the powder, a binder, and a solvent after performing the heat treatment; and forming an active material layer by applying the slurry to a current collector and drying the slurry. In the step of performing heat treatment, the organosilicon compound deposited on the surfaces of the active material particles and the surface of the conductive additive is hydrolyzed and condensed. Consequently, a film containing silicon oxide as its main component is formed on at least part of a surface of at least one of the active material particles, and a film containing silicon oxide as its main component is formed on at least part of a surface of at least one of the other active material particles and at least part of a surface of the conductive additive in the state where the one of the other active material particles is at least partly in contact with the conductive additive.

In the above structure, the active material particles preferably contain graphite. Examples of the organosilicon compound are ethyl silicate, ethyl polysilicate, methyl polysilicate, propyl polysilicate, butyl polysilicate, tetramethoxysilane, tetraethoxysilane, tetrabutoxysilane, and tetrapropoxysilane. Furthermore, in the above structure, the conductive additive preferably contains carbon fiber. Furthermore, in the above structure, the binder preferably contains a water-soluble polymer. The water-soluble polymer preferably includes one or more of carboxymethyl cellulose, methyl cellulose, ethyl cellulose, hydroxypropyl cellulose, diacetyl cellulose, a styrene monomer, and a butadiene monomer.

According to one embodiment of the present invention, the electrochemical decomposition of an electrolytic solution, etc. around an electrode can be minimized in a power storage device such as a lithium-ion secondary battery or a lithium-ion capacitor.

Furthermore, according to one embodiment of the present invention, by minimizing the decomposition reaction of an electrolytic solution, etc. as a side reaction of charge and discharge in the repeated charge and discharge cycles of a power storage device such as a lithium-ion secondary battery or a lithium-ion capacitor, formation of other passivating films can be inhibited. Consequently, the long-term cycle performance of the lithium-ion secondary battery or the lithium ion capacitor can be improved.

Furthermore, according to one embodiment of the present invention, a film containing silicon oxide as its main component can be efficiently formed on at least part of the surface of an active material particle.

Furthermore, according to one embodiment of the present invention, a film containing silicon oxide as its main component can be efficiently formed on at least part of the surface of an active material particle and at least part of the surface of a conductive additive in the state where the active material particle is at least partly in contact with the conductive additive. One embodiment of the present invention can provide a novel electrode, a novel power storage device, or the like. Note that the description of these effects does not disturb the existence of other effects. One embodiment of the present invention does not necessarily have all the effects listed above. Other effects will be apparent from and can be derived from the description of the specification, the drawings, the claims, and the like.

BRIEF DESCRIPTION OF DRAWINGS

In the accompanying drawings:

FIGS. 9A to 9C illustrate an example of a power storage device;

FIGS. 11A1, 11A2, 11B1, and 11B2 illustrate examples of power storage devices;

FIG. 15 illustrates examples of electronic devices;

FIG. 17 is a TEM image;

BEST MODE FOR CARRYING OUT THE INVENTION

Figure 1A:
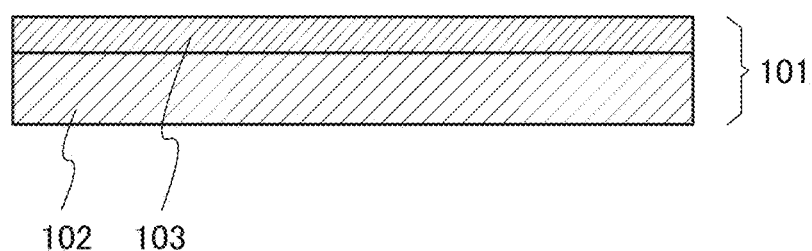
FIGS. 1A and 1B illustrate an electrode and an active material layer.

Hereinafter, embodiments and examples of the present invention will be described in detail with reference to the accompanying drawings. However, the embodiments and examples can be implemented with various modes. It will be readily appreciated by those skilled in the art that modes and details can be changed in various ways without departing from the spirit and scope of the present invention. Accordingly, the present invention should not be interpreted as being limited to the description of the embodiments and examples below.

Note that in drawings used in this specification, the thicknesses of films, layers, and substrates and the sizes of components (e.g., the sizes of regions) are exaggerated for simplicity in some cases. Therefore, the sizes of the components are not limited to the sizes in the drawings and relative sizes between the components.

Note that the ordinal numbers such as "first" and "second" in this specification and the like are used for convenience and do not denote the order of steps, the stacking order of layers, or the like. Therefore, for example, description can be made even when "first" is replaced with "second" or "third", as appropriate. In addition, the ordinal numbers in this specification and the like are not necessarily the same as those which specify one embodiment of the present invention.

Note that in structures of the present invention described in this specification and the like, the same portions or portions having similar functions are denoted by common reference numerals in different drawings, and descriptions thereof are not repeated. Further, the same hatching pattern is applied to portions having similar functions, and the portions are not especially denoted by reference numerals in some cases.

Note that in this specification and the like, a positive electrode and a negative electrode for a power storage device may be collectively referred to as a power storage device electrode; in this case, the power storage device electrode refers to at least one of the positive electrode and the negative electrode for the power storage device.

(Embodiment 1)

In this embodiment, an electrode of one embodiment of the present invention will be described with reference to FIGS. 1A and 1B.

Figure 1B:
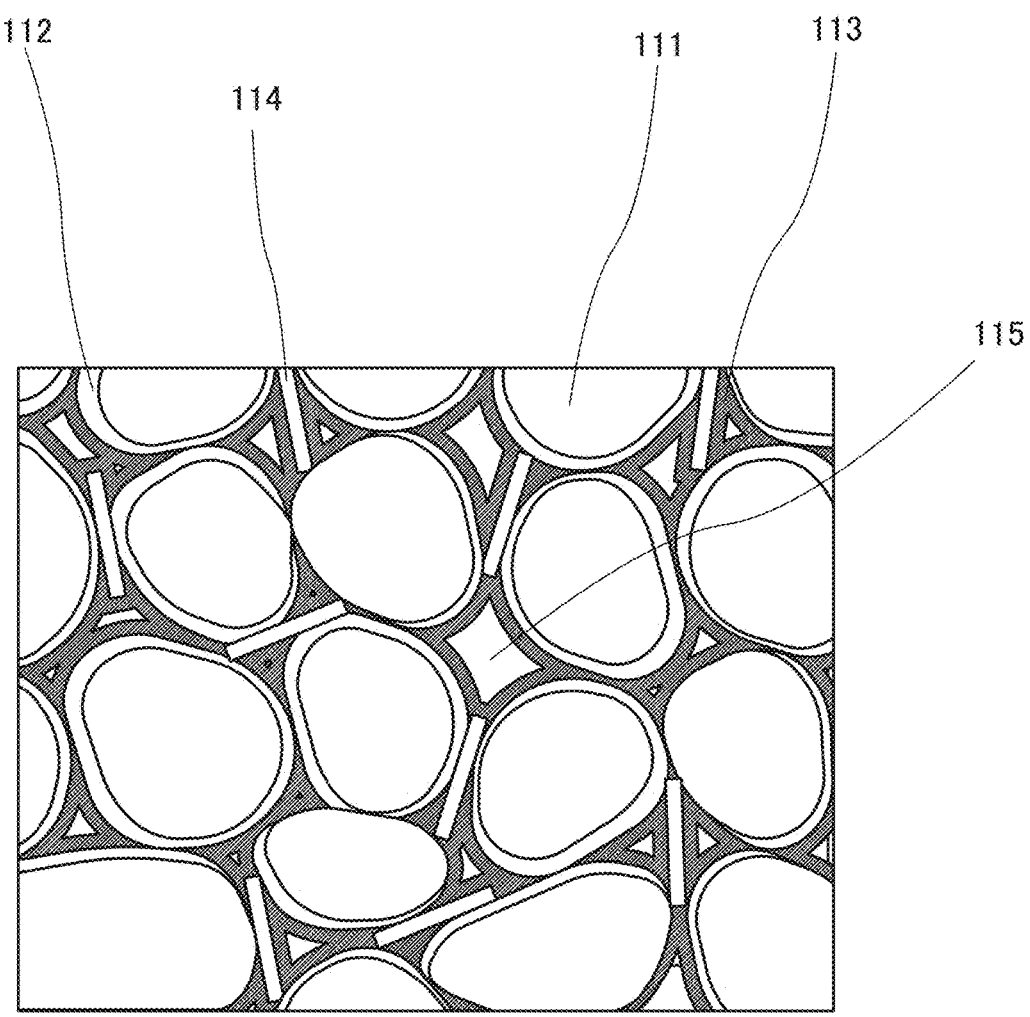

FIGS. 1A and 1B each illustrate an electrode of one embodiment of the present invention. FIG. 1A is a cross-sectional view of an electrode 101. In the schematic view of FIG. 1A, an active material layer 103 is formed over one surface of the current collector 102. Note that active material layers 103 may be provided so that the current collector 102 is sandwiched therebetween.

There is no particular limitation on the current collector 102 as long as it has high conductivity without causing a significant chemical change in a power storage device. For example, the current collector 102 can be formed using a metal such as stainless steel, gold, platinum, zinc, iron, nickel, copper, aluminum, titanium, tantalum, or manganese, an alloy thereof, sintered carbon, or the like. Alternatively, copper or stainless steel that is coated with carbon, nickel, titanium, or the like can be used to form the current collector 102. Alternatively, the current collector 102 can be formed using an aluminum alloy to which an element that improves heat resistance, such as silicon, neodymium, scandium, or molybdenum, is added. The current collector 102 can have any of various shapes including a foil-like shape, a plate-like shape (sheet-like shape), a net-like shape, a cylindrical shape, a coil shape, a punching-metal shape, an expanded-metal shape, a porous shape, and a shape of non-woven fabric as appropriate. The current collector 102 may be formed to have micro irregularities on the surface thereof in order to enhance adhesion to the active material layer, for example. The current collector 102 preferably has a thickness of 5 μm to 30 μm inclusive.

The positive electrode active material layer 103 includes the active material. An active material refers only to a material that relates to insertion and extraction of ions that carriers. In this specification and the like, a material that is actually an "active material" and the material including a conductive additive, a binder, and the like are collectively referred to as an active material layer.

In the case where the active material is a negative electrode active material, a material that enables charge and discharge reactions by an alloying reaction and a dealloying reaction with lithium (e.g., a carbon-based material) can be used.

Examples of the carbon-based material include graphite, graphitizing carbon (soft carbon), non-graphitizing carbon (hard carbon), a carbon nanotube, graphene, and carbon black.

Examples of graphite include artificial graphite such as meso-carbon microbeads (MCMB), coke-based artificial graphite, and pitch-based artificial graphite and natural graphite such as spherical natural graphite.

Graphite has a low potential substantially equal to that of a lithium metal (higher than or equal to 0.1 V and lower than or equal to 0.3 V vs. Li/Li$^+$) when lithium ions are intercalated into the graphite (while a lithium-graphite intercalation compound is formed). For this reason, a lithium-ion secondary battery can have a high operating voltage. In addition, graphite is preferred because of its advantages such as relatively high capacity per unit volume, small volume expansion, low cost, and higher level of safety than that of a lithium metal.

For the negative electrode active material, a material which enables charge-discharge reactions by an alloying reaction and a dealloying reaction with lithium can be used. In the case where carrier ions are lithium ions, a material containing at least one of Al, Si, Ge, Sn, Pb, Sb, Bi, Ag, Au, Zn, Cd, In, Ga, and the like can be used, for example. Such elements have higher capacity than carbon. In particular, silicon has a significantly high theoretical capacity of 4200 mAh/g. For this reason, silicon is preferably used as the negative electrode active material. Examples of the material which enables charge-discharge reactions by an alloying reaction and a dealloying reaction with lithium include SiO, $Mg_2Si$, $Mg_2Ge$, SnO, $SnO_2$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, SbSn, and the like. Note that SiO refers to the powder of a silicon oxide including a silicon-rich portion and can also be referred to as $SiO_y$ (2>y>0). Examples of SiO include a material containing one or more of $Si_2O_3$, $Si_3O_4$, and $Si_2O$ and a mixture of Si powder and silicon dioxide ($SiO_2$). Furthermore, SiO may contain another element (e.g., carbon, nitrogen, iron, aluminum, copper, titanium, calcium, and manganese). In other words, SiO refers to a colored material containing two or more of single crystal silicon, amorphous silicon, polycrystal silicon, $Si_2O_3$, $Si_3O_4$, $Si_2O$, and $SiO_2$. Thus, SiO can be distinguished from $SiO_x$ (x is 2 or more), which is clear and colorless or white. Note that in the case where a secondary battery is fabricated using SiO as a material thereof and the SiO is oxidized because of repeated charge and discharge cycles, SiO is changed into $SiO_2$ in some cases.

Alternatively, for the negative electrode active material, an oxide such as titanium dioxide, lithium titanium oxide, lithium-graphite intercalation compound, niobium pentoxide, tungsten oxide, or molybdenum oxide can be used.

Still alternatively, for the negative electrode active materials, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm$^3$).

A nitride containing lithium and a transition metal is preferably used, in which case lithium ions are contained in the negative electrode active materials and thus the negative electrode active materials can be used in combination with a material for a positive electrode active material which does not contain lithium ions, such as $V_2O_5$ or $Cr_3O_8$. In the case of using a material containing lithium ions as a positive electrode active material, the nitride containing lithium and a transition metal can be used for the negative electrode active material by extracting the lithium ions contained in the positive electrode active material in advance.

Alternatively, a material which causes a conversion reaction can be used for the negative electrode active materials; for example, a transition metal oxide which does not cause an alloy reaction with lithium, such as cobalt oxide, nickel oxide, and iron oxide, may be used. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$.

The above carbon materials can each function as an active material and a conductive additive of a negative electrode. Thus, the active material layer 103 may include one or more of the above carbon materials. The carbon material can also function as a conductive additive of a positive electrode. Note that as the conductive additive, a carbon material with a large specific surface area is preferably used. The use of a carbon material with a large specific surface area as the conductive additive can increase contact points and the contact area of active materials.

In the case where the electrode 101 is a positive electrode, a material into and from which lithium ions can be intercalated and deintercalated can be used; for example, a material having an olivine crystal structure, a layered rock-salt crystal structure, a spinel crystal structure, or a NASICON crystal structure, or the like can be used.

As the positive electrode active material, a compound such as $LiFeO_2$, $LiCoO_2$, $LiNiO_2$, or $LiMn_2O_4$, $V_2O_5$, $Cr_2O_5$, or $MnO_2$ can be used.

Alternatively, lithium-containing complex phosphate with an olivine crystal structure ($LiMPO_4$ (general formula) (M is one or more of Fe(II), Mn(II), Co(II), and Ni(II))) can be used. Typical examples are lithium metal phosphate compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1).

Alternatively, lithium-containing complex silicate such as $Li_{(2-j)}MSiO_4$ (general formula) (M is one or more of Fe(II), Mn(II), Co(II), and Ni(II); 0≤j≤2) may be used. Typical examples are lithium silicate compounds such as $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l≤1, 0<k<1, and 0<l<1), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ (m+n+q≤1, 0<m<1, 0<n<1, and 0<q<1), and $Li_{(2-j)}Fe_rNi_sCo_tMn_uSiO_4$ (r+s+t+u≤1, 0<r<1, 0<s<1, 0<t<1, and 0<u<1).

Still alternatively, a NASICON compound expressed by $A_xM_2(XO_4)_3$ (general formula) (A=Li, Na, or Mg, M=Fe, Mn, Ti, V, Nb, or Al, X=S, P, Mo, W, As, or Si) can be used for the positive electrode active material. Examples of the NASICON compound are $Fe_2(MnO_4)_3$, $Fe_2(SO_4)_3$, and $Li_3Fe_2(PO_4)_3$. Further alternatively, a compound expressed by $Li_2MPO_4F$, $Li_2MP_2O_7$, or $Li_5MO_4$ (general formula) (M=Fe or Mn), a perovskite fluoride such as $NaF_3$ and $FeF_3$, a metal chalcogenide (a sulfide, a selenide, or a telluride) such as $TiS_2$ and $MoS_2$, a material with an inverse spinel structure such as $LiMVO_4$, a vanadium oxide ($V_2O_5$, $V_6O_{13}$, LiV$_3$O$_8$, or the like), a manganese oxide, an organic sulfur compound, or the like can be used as the positive electrode active material.

In the case where carrier ions are alkali metal ions other than lithium ions, or alkaline-earth metal ions, a compound containing carriers such as an alkali metal (e.g., sodium and potassium) or an alkaline-earth metal (e.g., calcium, strontium, barium, beryllium, and magnesium) instead of lithium of the lithium compound, the lithium-containing complex phosphate, or the lithium-containing complex silicate may be used as the positive electrode active material.

The particle size of the positive electrode active material is preferably, for example, greater than or equal to 5 nm and less than or equal to 100 μm.

For example, lithium-containing complex phosphate having an olivine crystal structure used for the positive electrode active material has a one-dimensional lithium diffusion path, so that lithium diffusion is slow. The particle size of the active material is thus preferably, for example, greater than or equal to 5 nm and less than or equal to 1 μm. The specific surface area of the active material is preferably, for example, greater than or equal to 10 m$^2$/g and less than or equal to 50 m$^2$/g.

A positive electrode active material having an olivine crystal structure is much less likely to be changed in the crystal structure by charge and discharge and has a more stable crystal structure than, for example, an active material having a layered rock-salt crystal structure. Thus, a positive electrode active material having an olivine crystal structure is stable toward operation such as overcharge. The use of such a positive electrode active material allows fabrication of a highly safe power storage device.

The active material layer 103 may include a conductive additive. For example, a carbon material or a carbon fiber such as natural graphite, artificial graphite (e.g., mesocarbon microbeads), and graphene can be used. Alternatively, metal powder or metal fiber of copper, nickel, aluminum, silver, gold, or the like, a conductive ceramic material, or the like can be used.

As the conductive additive, a material having a flake-like shape, a needle-like shape, or a fiber-like shape can be used. Flaky graphene has an excellent electrical characteristics of high conductivity and excellent physical properties of high flexibility and high mechanical strength. For this reason, the use of graphene as the conductive additive can increase the points and the area where the active materials are in contact with each other.

Note that graphene in this specification includes single-layer graphene and multilayer graphene including two to hundred layers. Single-layer graphene refers to a one-atom-thick sheet of carbon molecules having π bonds. Graphene oxide refers to a compound formed by oxidation of such graphene. When graphene oxide is reduced to form graphene, oxygen contained in the graphene oxide is not entirely released and part of the oxygen remains in graphene. When graphene contains oxygen, the proportion of oxygen, which is measured by X-ray photoelectron spectroscopy (XPS), is higher than or equal to 2 at. % and lower than or equal to 20 at. %, preferably higher than or equal to 3 at. % and lower than or equal to 15 at. %.

Examples of carbon fiber include mesophase pitch-based carbon fiber, isotropic pitch-based carbon fiber, carbon nanofiber, carbon nanotube, and vapor-grown carbon fiber (VGCF). The representative values of VGCF are as follows: the fiber diameter is 150 nm; the fiber length is 10 μm to 20 μm, inclusive; the real density is 2 g/cm$^3$; and the specific surface area is 13 m$^2$/g. Note that when a cross section perpendicular to a fiber axis is regarded as a cutting plane in a two-dimensional SEM image, the fiber diameter is a diameter of a perfect circle that circumscribes the cutting plane. The real density is a density calculated using a volume occupied by a substance itself. The specific surface area is the surface area of an object per unit mass or per unit volume.

In addition, VGCF, which has a needle-like shape, has an excellent electrical characteristic of high conductivity and an excellent physical property of high mechanical strength. Thus, the use of VGCF as the conductive additive can increase contact points and the contact area of active materials.

Alternatively, a particle-like material can be used for the conductive additive. A typical example of the particle-like material is carbon black, such as acetylene black or ketjen black, whose diameter is 3 nm to 500 nm, inclusive.

The conductive additive including a flake-like shape, a needle-like shape, or a fiber-like shape has a function of binding the active materials and inhibits deterioration of a battery. The conductive additive including any one of the above shapes also functions as a structure body or cushioning for maintaining the shape of the active material layer 103. Thus, separation between the current collector and the active materials is less likely to occur even when a secondary battery is changed in its form by being bent or by repeated expansion and contraction of the active materials. Although carbon black such as acetylene black or ketjen black may be used instead of the material, VGCF is preferably used because the strength for keeping the shape of the active material layer 103 can be increased. When the strength for keeping the shape of the active material layer 103 is high, deterioration of the secondary battery caused by changes in its form (e.g., bending) can be prevented.

The active material layer 103 may include a binder. The active material layer 103 may include a plurality of kinds of binders. A binder that can be included in the active material layer 103 will be described below.

As the binder, water-soluble polymer can be used. As the water-soluble polymer, a polysaccharide or the like can be used. As the polysaccharide, a cellulose derivative such as carboxymethyl cellulose (CMC), methyl cellulose, ethyl cellulose, hydroxypropyl cellulose, diacetyl cellulose, or regenerated cellulose, starch, or the like can be used.

Here, a water-soluble polymer can be dissolved in water and thus can adjust and stabilize the viscosity of slurry when the slurry is formed to fabricate an electrode. Furthermore, a water-soluble polymer facilitates dispersion of other materials, here, the active material and other materials such as a binder and a conductive additive, in the slurry. The slurry is finally applied and then dried, so that an electrode is obtained. Note that "something can be dissolved in water" means that a functional group of a polymer can be ionized in water, for example, here.

Here, a water-soluble polymer does not necessarily dissolve only in water, and a polymer that dissolve in a solvent other than water may be used. For example, a polymer are dissolved in a polar solvent and an active material and other materials are dispersed in the mixture to form slurry. Alternatively, a polymer that can be dissolved only in a solvent other than water may be used.

As the binder, a rubber material such as styrene-butadiene rubber (SBR), styrene-isoprene-styrene rubber, acrylonitrile-butadiene rubber, butadiene rubber, or ethylene-propylene-diene copolymer is preferably used. Any of these rubber materials is more preferably used in combination with the aforementioned water-soluble polymers. Since these rubber materials have rubber elasticity and easily expand and contract, it is possible to obtain a highly reliable electrode that is resistant to stress due to expansion and contraction of an active material by charge and discharge, bending of the electrode, or the like. On the other hand, the rubber materials have a hydrophobic group and thus are unlikely to be soluble in water in some cases. In such a case, particles are dispersed in an aqueous solution without being dissolved in water and, so that increasing the viscosity of slurry up to the viscosity suitable for application to form the electrode might be difficult. A water-soluble polymer having an excellent function of adjusting viscosity, such as a polysaccharide, can moderately increase the viscosity of the solution and can be uniformly dispersed together with a rubber material. Thus, a favorable electrode with high uniformity (e.g., an electrode with uniform electrode thickness or electrode resistance) can be obtained.

As the binder, a material such as polystyrene, poly(methyl acrylate), poly(methyl methacrylate) (PMMA), sodium polyacrylate, polyvinyl alcohol (PVA), polyethylene oxide (PEO), polypropylene oxide, polyimide, polyvinyl chloride, polytetrafluoroethylene, polyethylene, polypropylene, isobutylene, polyethylene terephthalate, nylon, polyvinylidene fluoride (PVDF), or polyacrylonitrile (PAN) can be used.

A single binder may be used or plural kinds of binders may be used in combination.

For example, a binder having high adhesion or high elasticity and a binder having a significant viscosity modifying effect may be used in combination. As the binder having a significant viscosity modifying effect, for example, a water-soluble polymer is preferably used. An example of a water-soluble polymer having an especially significant viscosity modifying effect is the above-mentioned polysaccharide; for example, a cellulose derivative such as carboxymethyl cellulose (CMC), methyl cellulose, ethyl cellulose, hydroxypropyl cellulose, diacetyl cellulose, or regenerated cellulose, or starch can be used.

Note that a cellulose derivative such as carboxymethyl cellulose obtains a higher solubility when converted into a salt such as a sodium salt or an ammonium salt of carboxymethyl cellulose, and accordingly, easily exerts an effect as a viscosity modifier. The high solubility can also increase the dispersibility of an active material and other components in the formation of slurry for an electrode. In this specification, cellulose and a cellulose derivative used as a binder of an electrode include salts thereof.

The water-soluble polymer stabilizes viscosity by being dissolved in water and allow stable dispersion of the active material and a second binder such as styrene-butadiene rubber in an aqueous solution. Furthermore, a water-soluble polymer is expected to be easily and stably adsorbed to an active material surface because it has a functional group. Many cellulose derivatives such as carboxymethyl cellulose have functional groups such as a hydroxyl group and a carboxyl group. Because of functional groups, polymers are expected to interact with each other and cover an active material surface in a large area.

FIG. 1B is an enlarged schematic view of a cross section of the active material layer 103. FIG. 1B illustrates active material particles 111 and conductive additives 114 with a needle-like shape. There is no particular limitation on the size of each active material particle 111, and in the case where the active material particles 111 are negative electrode active material particles, the size of the particle can be in the range from 5 μm to 50 μm, for example. In the case where the active material particles 111 are positive electrode active material particles used for a positive electrode and each of the positive electrode active material particles is a secondary particle, the diameter of each primary particle in the secondary particle can be in the range from 5 nm to 100 μm.

The surface of the active material particle 111 may include a region in contact with the surface of another active material particle 111. The surface of the active material particle 111 may include a region in contact with the conductive additive 114. The surface of the active material particle 111 may include a region in contact with the binder 113. The surface of the active material particle 111 except these regions is at least partly in contact with a film 112. The film 112 is preferably formed on all of the surface of the active material particle 111 except the regions but may be formed on part of the surface of the active material particle 111. The active material particles 111 are bound with the binder 113 in the state where they are adjacent to each other, are adjacent to each other with the conductive additive 114 therebetween, and/or are adjacent to each other with the conductive additive 114 and the film 112 therebetween. In some cases, the active material layer 103 includes a space 115 formed by some of the active material particles 111.

Note that a "film" in this specification is not limited to one entirely covering the surface of an object and includes one partly covering the surface of an object.

It is preferable that carrier ions can pass through the film 112. Thus, it is preferable that the film 112 be formed using a material through which carrier ions can pass, and be thin enough to allow carrier ions to pass through the film.

A film containing metal oxide, silicon oxide, or lithium salt as its main component can be used as the film 112. For the film containing metal oxide as a main component, an oxide film of any one of niobium, titanium, vanadium, tantalum, tungsten, zirconium, molybdenum, hafnium, chromium, and aluminum or an oxide film containing lithium and one or more of these elements can be used. Alternatively, a film containing silicon oxide as a main component can be used. As the lithium salt, lithium carbonate or the like can be used. Note that "main component" refers to an element determined by energy dispersive X-ray spectrometry (EDX), X-ray photoelectron spectroscopy (XPS), or time-of-flight secondary ion mass spectrometry (ToF-SIMS).

For example, in the case where graphite is used as an active material, a film containing silicon oxide as a main component preferably has a mesh structure where a carbon atom in the graphite is bonded to a silicon atom through an oxygen atom and the silicon atom is bonded to another silicon atom through an oxygen atom.

When the thickness of the film 112 is, for example, greater than or equal to 1 nm and less than or equal to 1 μm, preferably greater than or equal to 1 nm and less than or equal to 100 nm, the decomposition reaction between the active material particle 111 and an electrolytic solution can be inhibited.

In the case of using, as the active material particles 111, the material whose volume is changed by charge and discharge, the film 112 is preferably changed in shape accordingly when the active material particles 111 are changed in shape because of the change in volume thereof. Therefore, the Young's modulus of the film 112 is preferably less than or equal to 70 GPa. The film 112 including a region covering the surface of the active material particle 111 can be changed following a change in shape due to the change in volume of the active material particle 111, so that separation of the film 112 from the active material particle 111 can be suppressed.

The surface of the active material particle 111 includes at least one of a region in contact with another active material particle 111, a region in contact with the conductive additive 114, and a region in contact with the binder 113, and at least part of the surface of the active material particle 111 except the regions is in contact with the film 112. This can prevent the supply of electrons between the surface of the active material particle 111 and an electrolytic solution in charging of a power storage device. Thus, the reductive decomposition of the electrolytic solution can be inhibited. Accordingly, formation of a passivating film on the active material particles due to the reductive decomposition of the electrolytic solution can be inhibited, resulting in inhibition of a reduction in the initial capacity of the power storage device.

The film 112 which includes a region covering the surface of the active material particle 111 can be changed in shape accordingly when the active material particle 111 is changed in shape because of the change in volume thereof, so that separation of the film 112 from the active material particle 111 can be prevented. Further, when an increase in the thickness of a passivating film on repeated charge and discharge is inhibited, the passivating film is less likely to be influenced by volume expansion of the active material particles, so that separation of the passivating film from the active material particles can be suppressed.

A conduction path of electrons of the active material particles 111 will be described. As illustrated in FIG. 1B, when the active material particle 111 includes at least one of a region in contact with another active material particle 111 and a region adjacent to another active material particle 111 with the conductive additive 114 therebetween, an electron conduction path is formed. Also in a region where the active material particle 111 and a thin portion of the film 112 are in contact with each other, an electron conduction path through the conductive additive 114 is formed. When the surface of the active material particle 111 is at least partly covered with the film 112 in the state where an electron conduction path is thus formed, the supply of electrons between the surface of the active material particle 111 and an electrolytic solution in charging of a power storage device can be prevented. Thus, the decomposition reaction between the active material particles 111 and an electrolytic solution can be inhibited. Consequently, an increase in the resistance of an electrode can be suppressed and the capacity of the power storage device can be increased.

As described above, the film 112 including a region covering the surface of the active material particle 111 in the electrode of one embodiment of the present invention can minimize the electrochemical decomposition of an electrolytic solution, etc. around the electrode.

Further, when the electrode is used in a power storage device such as a lithium-ion secondary battery or a lithium-ion capacitor to minimize the decomposition reaction of an electrolytic solution as a side reaction of charge and discharge in the repeated charge and discharge cycles of the power storage device, the long-term cycle performance of the power storage device such as a lithium-ion secondary battery or a lithium-ion capacitor can be improved.

This embodiment can be implemented in combination with any of the other embodiments and examples as appropriate.

(Embodiment 2)

In this embodiment, an example of a fabricating method of an electrode will be described with reference to FIGS. 2A and 2B. A film is formed on the surface of an active material using a spray dryer in this embodiment.

The spray dryer is an apparatus that allows an undiluted solution to continuously turn into dry particles in a moment with a hot air. FIG. 2A is a schematic view of the spray dryer. An undiluted solution is sprayed in the form of fine liquid drops from a two fluid nozzle 121, is continuously exposed to hot air blown from a heating means 122 while increasing the surface area per unit volume, and is dried in a moment in a spray cylinder 123 to be solid particles. Then, the particles are separated by a cyclone 124, and fine powder is collected in a container 125. A tube (not illustrated) is connected to the two fluid nozzle 121, and the undiluted solution is transferred to the two fluid nozzle 121 with the use of a pump. A tube made of silicone is used as the tube, for example. Reference numerals 126 and 127 represent an outlet filter that removes fine particles and an aspirator that makes the flow of a gas, respectively. Note that arrows in FIG. 2A indicate the flow of a dry gas.

(Fabricating Method 1)

Figure 2A:
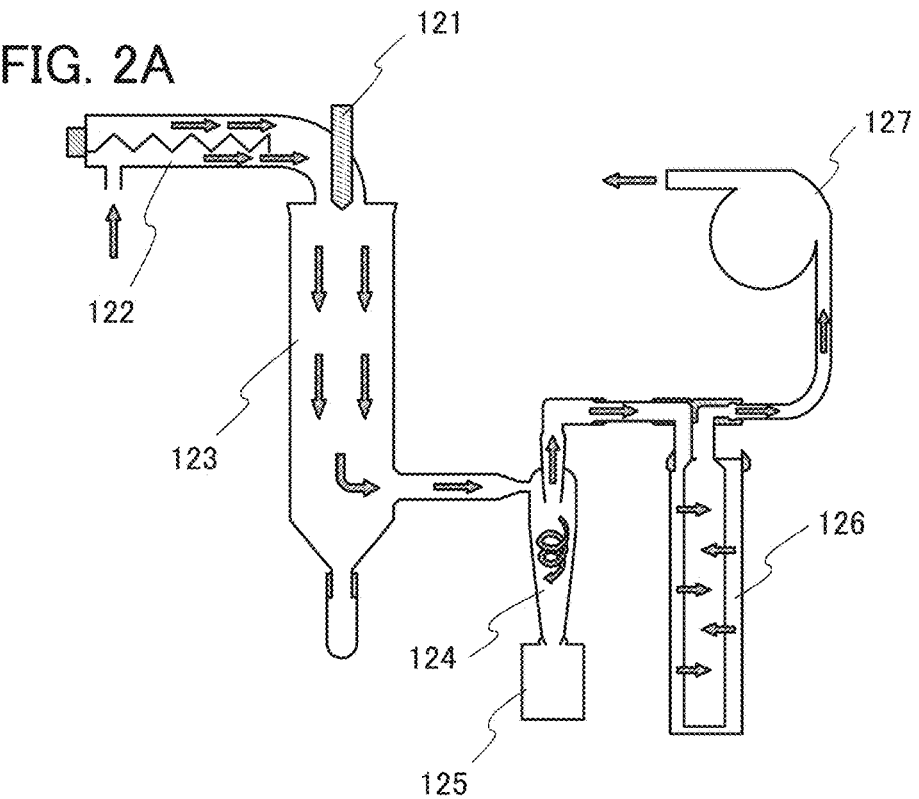
FIG. 2A illustrates a spray dryer.
Figure 2B:
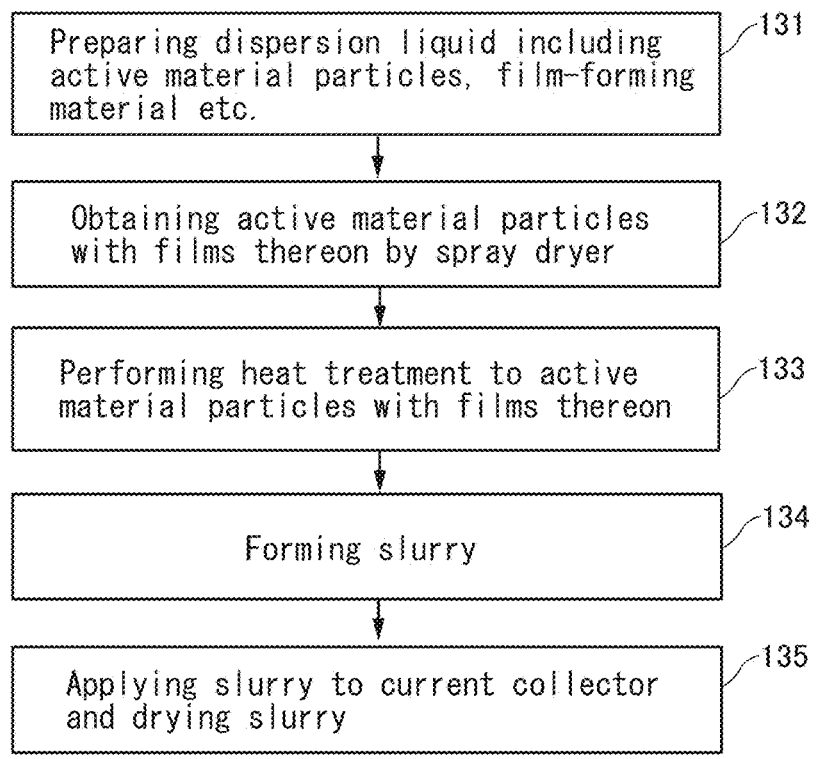
FIG. 2B shows fabrication flow of an electrode.

FIG. 2B shows the fabrication flow of an electrode.

First, an active material, a film-forming material, a solvent, and a catalyst are mixed to prepare a dispersion liquid (Step 131). For the active material, any of the materials given in Embodiment 1 can be used. In this embodiment, graphite is used as the active material. Note that a dispersion liquid in this specification and the like refers to that in which particles of an active material, a film-forming material, and the like uniformly exist in a solvent.

Examples of the film-forming material include an organometallic compound and an organosilicon compound. Examples of the organometallic compound include an organic lithium compound, an organic aluminum compound, and an organogallium compound. Examples of the organosilicon compound include ethyl silicate, ethyl polysilicate, methyl polysilicate, propyl polysilicate, butyl polysilicate, tetramethoxysilane, tetraethoxysilane, tetrabutoxysilane, and tetrapropoxysilane. Further, an oligomer obtained by partial hydrolysis and condensation of any of the organosilicon compounds may be used. An organic composite metal compound containing a lithium compound such as an organic lithium silicate compound or an organic lithium aluminate compound may be used.

In the case of using an organosilicon compound, its amount is determined such that silicon oxide contained in the organosilicon compound is, for example, 1 wt % (weight percent) with respect to graphite. That is to say, the value is not the proportion of silicon oxide to graphite in the state of a film but the weight proportion of silicon oxide to graphite in formation of the dispersion liquid.

In this embodiment, ethyl silicate as Pentamer is used as the organosilicon compound.

As the solvent, ethanol can be used, and as the catalyst, hydrochloric acid can be used. Furthermore, water may be added as an additive.

Next, the dispersion liquid is poured into the spray dryer illustrated in FIG. 2A, sprayed from the two fluid nozzle 121, and dried in a moment in the spray cylinder 123 (Step 132). In the sprayed fine liquid drops, at least part of the surface of each active material particles is covered with the organosilicon compound. When the fine liquid drops are exposed to a gas heated by the heating means 122, they are dried in a moment. For example, the drying is performed with nitrogen heated to 100° C. by the heating means 122.

The thus obtained fine powder is subjected to heat treatment (Step 133). The heat treatment is performed, for example, on a hot plate at 70° C. Through the heat treatment, the organosilicon compound deposited on the active material particle reacts with moisture in the air, so that hydrolysis occurs, and the hydrolyzed organosilicon compound is condensed following the hydrolysis reaction. Consequently, a film containing silicon oxide as its main component is formed on the surface of the active material particle. More preferably, the fine powder is steamed at 70° C. using a bell jar, in which case the time for hydrolysis can be shortened.

In this embodiment, the spray dryer enables efficient formation of the film containing silicon oxide as its main component on the surface of each of the active material particles. Thus, powder of the active material particles with films thereon can be efficiently obtained.

Next, the active material particles whose surfaces are each partly or entirely covered with a film containing silicon oxide (hereinafter, referred to as active material particles with films each containing silicon oxide), a conductive additive, a binder, and a solvent are mixed to form slurry (Step 134).

By the mixing, the active material particles with films each containing silicon oxide, the conductive additive, and the binder are mixed while being in contact with each other. Consequently, part of the film might be separated, partly exposing the surfaces of the active material particles. In the exposed region, the active material particle might be directly in contact with one or more of another active material particle, the conductive additive, and the binder.

As the conductive additive, any of the materials for the conductive additive described in Embodiment 1 can be used, for example. For the binder, any of the materials described in Embodiment 1 can be used. With the use of a water-soluble polymer as the binder, slurry with an appropriate viscosity for application can be formed. In addition, slurry with high dispersibility can be formed. As the solvent, water or a polar solvent can be used. For example, methanol, ethanol, acetone, tetrahydrofuran (THF), dimethylformamide (DMF), N-methylpyrrolidone (NMP), dimethyl sulfoxide (DMSO), or a mixed solution of any two or more of the above can be used. Water is preferably used in terms of the safety and cost. In this embodiment, VGCF is used as the conductive additive, CMC-Na and SBR are used as binders, and water is used as the solvent.

First, graphite whose surface is partly or entirely covered with a film containing silicon oxide as its main component (hereinafter, referred to as graphite with a film containing silicon oxide) and VGCF are mixed. The mixing is performed with a mixer, for example. At this time, it is preferred that graphite with a film containing silicon oxide, VGCF, and a small amount of water be kneaded (mixed in a high viscosity state), in which case graphite with a film containing silicon oxide and VGCF may be easily dispersed uniformly.

Next, CMC-Na is added and mixing is performed using a mixer or the like to obtain a mixture. At this time, a CMC-Na aqueous solution prepared by mixing CMC-Na with water in advance is preferably added, in which case cohesion of CMC-Na can be prevented. When water is added prior to the addition of CMC-Na, the viscosity is lowered, damaging the dispersive state of graphite and VGCF in some cases.

After that, water may further be added and mixing may be performed.

Then, SBR is added and mixing is performed using a mixer or the like. Here, an SBR dispersion liquid in which water has been mixed is preferably added to the mixture, in which case cohesion of SBR can be suppressed unlike in the case where SBR powder is added. Furthermore, dispersibility of other materials and SBR is improved in some cases.

Next, the pressure in the mixer containing this mixture may be reduced to perform degasification. Through the above steps, favorable slurry in which graphite with a film containing silicon oxide, carbon fiber, CMC-Na, and SBR are uniformly dispersed can be formed.

Note that the order of mixing graphite with a film containing silicon oxide, carbon fiber, CMC-Na, and SBR is not limited to the above. All the materials may be added at a time and mixed.

As an example, another fabricating method will be described. First, graphite with a film containing silicon oxide, VGCF, and CMC-Na in the form of powder are mixed in a mixer or the like. Then, water is added in the state where the materials are mixed, and mixing is further performed.

When a small amount of water is added and mixing (kneading) in a high viscosity state is performed, cohesion of graphite can be weaken and dispersibility of graphite, VGCF, and CMC-Na can be improved.

After the kneading is performed, water may further be added and mixing may be performed using a mixer or the like.

Then, SBR is added and mixing is performed using a mixer or the like. Here, an SBR dispersion liquid in which water has been mixed is preferably added to the mixture, in which case cohesion of SBR can be suppressed unlike in the case where SBR powder is added. Furthermore, dispersibility of other materials and SBR is improved in some cases.

After that, degasification may be performed. Through the above steps, favorable slurry in which graphite with a film containing silicon oxide, VGCF, CMC-Na, and SBR are uniformly dispersed can be formed.

CMC-Na and SBR are uniformly dispersed, whereby when these binders cover the surfaces of VGCF and graphite with a film containing silicon oxide, the binders have a film-like shape whose thickness is not become too thick. As a result, the surfaces can be covered with a small amount of binders, and the proportion of an area in contact with the film-like binders with respect to the surfaces can be increased. The binders have low electric conductivity and thus might increase the resistance of the electrode when they cohere. Uniform dispersion of the binders can inhibit cohesion of the binders, so that a favorable electrode with high electric conductivity can be fabricated.

The current collector 102 may be subjected to surface treatment. Examples of such surface treatment include corona discharge treatment, plasma treatment, and undercoat treatment. The surface treatment can increase the wettability of the current collector 102 with respect to the slurry. In addition, the adhesion between the current collector 102 and the active material layer 103 can be increased.

Here, the "undercoat" refers to a film formed over a current collector before application of slurry onto the current collector for the purpose of reducing the interface resistance between an active material layer and the current collector or increasing the adhesion between the active material layer and the current collector. Note that the undercoat is not necessarily formed in a film shape, and may be formed in an island shape. In addition, the undercoat may serve as an active material to have capacity. For the undercoat, a carbon material can be used, for example. Examples of the carbon material include graphite, carbon black such as acetylene black and ketjen black, and a carbon nanotube.

Then, the slurry is applied to one of or both the surfaces of a current collector, and dried (Step 135). In the case where both the surfaces of the current collector are subjected to the coating step, the slurry is applied to the surfaces at the same time or one by one, and dried. After that, rolling with a roller press machine is performed, whereby active material layers are formed so that the current collector is sandwiched therebetween.

For the application, a blade method or the like can be used. Furthermore, a continuous coater or the like may be used for the application. In the drying step of the slurry, drying is performed using a hot plate or a drying furnace in an air atmosphere or a reduced pressure atmosphere at a temperature in the range from room temperature to 200° C. The drying can be performed in a plurality of steps. Alternatively, the temperature for the drying may be increased in stages. In addition, time for the drying can be set appropriately. For example, a drying step is performed using a hot plate at 30° C. or higher and 70° C. or lower in an air atmosphere for longer than or equal to 10 minutes, and then, for example, another drying step is performed at room temperature or higher and 100° C. or lower in a reduced-pressure environment for longer than or equal to 1 hour and shorter than or equal to 10 hours.

In the case of using a drying furnace, the drying is performed at 30° C. or higher and 120° C. or lower for longer than or equal to 30 seconds and shorter than or equal to 20 minutes, for example. For example, after a drying step is performed at 60° C. or lower for shorter than or equal to 10 minutes, another drying step may further be performed at higher than or equal to 65° C. for longer than or equal to 1 minute.

The thickness of the active material layer 103 formed through the above steps is, for example, preferably greater than or equal to 5 μm and less than or equal to 500 μm, more preferably greater than or equal to 5 μm and less than or equal to 200 μm. Furthermore, the amount of the active material in the active material layer 103 is, for example, preferably greater than or equal to 2 mg/cm$^2$ and less than or equal to 50 mg/cm$^2$.

The active material layer 103 may be formed over only one surface of the current collector 102, or the active material layers 103 may be formed over both of surfaces of the current collector 102. Alternatively, the active material layers 103 may be formed partially over both of surfaces of the current collector 102.

Note that the active material layer 103 may be predoped. There is no particular limitation on the method for predoping the active material layer 103. For example, the active material layer 103 may be predoped electrochemically. For example, before the battery is assembled, the active material layer 103 can be predoped with lithium in an electrolytic solution described later with the use of a lithium metal as a counter electrode.

By the above method, the electrode 101 illustrated in FIGS. 1A and 1B can be fabricated. Note that although not illustrated in FIG. 1B, the binder includes a part of the film containing silicon oxide as its main component separated from the surface of the active material particle because the materials are mixed in formation of the slurry.

(Fabricating Method 2)

In Fabricating method 1, the example of forming a film on the surface of an active material particle by pouring a dispersion liquid containing the active material particles, a film-forming material, a solvent, and a catalyst into a spray dryer is described. A conductive additive may be added to the dispersion liquid. Another example of a fabricating method of an electrode will be described below. Note that Fabricating Method 1 can be referred to for Fabricating Method 2 except a dispersion liquid, and repeated description is omitted.

First, active material particles, a film-forming material, a conductive additive, a solvent, and a catalyst are mixed to prepare a dispersion liquid. For the active material and the conductive additive, any of the materials given in Embodiment 1 can be used. Here, graphite is used as the active material particles, and VGCF with a needle-like shape is used as the conductive additive.

Any of the aforementioned materials can be used as the film-forming material. Here, ethyl silicate as Pentamer is used.

As the solvent, ethanol can be used, and as the catalyst, hydrochloric acid can be used. Furthermore, water may be added as an additive.

Next, the dispersion liquid formed by mixing the active material particles, the film-forming material, the conductive additive, the solvent, and the catalyst is poured into a spray dryer, sprayed from the two fluid nozzle 121, and dried in a moment in the spray cylinder 123. In the sprayed fine liquid drops, at least part of the surface of the active material particle is covered with an organosilicon compound, and/or at least part of the surfaces of the active material particle and the conductive additive that are adjacent to each other are covered with an organosilicon compound. When the fine liquid drops are dried in a moment, they turn into fine powder.

Next, the fine powder is subjected to heat treatment. The heat treatment is performed, for example, on a hot plate at 70° C. More preferably, the fine powder is steamed at 70° C. using a bell jar. Through the heat treatment, the organosilicon compound deposited on the active material particle and the conductive additive reacts with moisture, so that hydrolysis occurs, and the hydrolyzed organosilicon compound is condensed following the hydrolysis reaction. Consequently, a film containing silicon oxide as its main component can be formed on at least part of the surface of the active material particle. The surfaces of the active material particle and the conductive additive that are adjacent to each other are partly or entirely covered with a film containing silicon oxide as its main component.

Then, the fine powder after the heat treatment, a binder, and a solvent are mixed to form slurry. Note that the conductive additive is already mixed into the dispersion liquid and thus contained in the fine powder, so that the conductive additive is not added in this step.

By the mixing, the active material particles with films each containing silicon oxide, the conductive additive, and the binder are mixed while being in contact with each other. Consequently, part of the film might be separated, partly exposing the surface of the active material particle. In the exposed region, the active material particle might be directly in contact with one or more of another active material particle, the conductive additive, and the binder.

For a step after the formation of the slurry, Fabricating Method 1 can be referred to; thus, the description thereof is omitted here.

Figure 3:
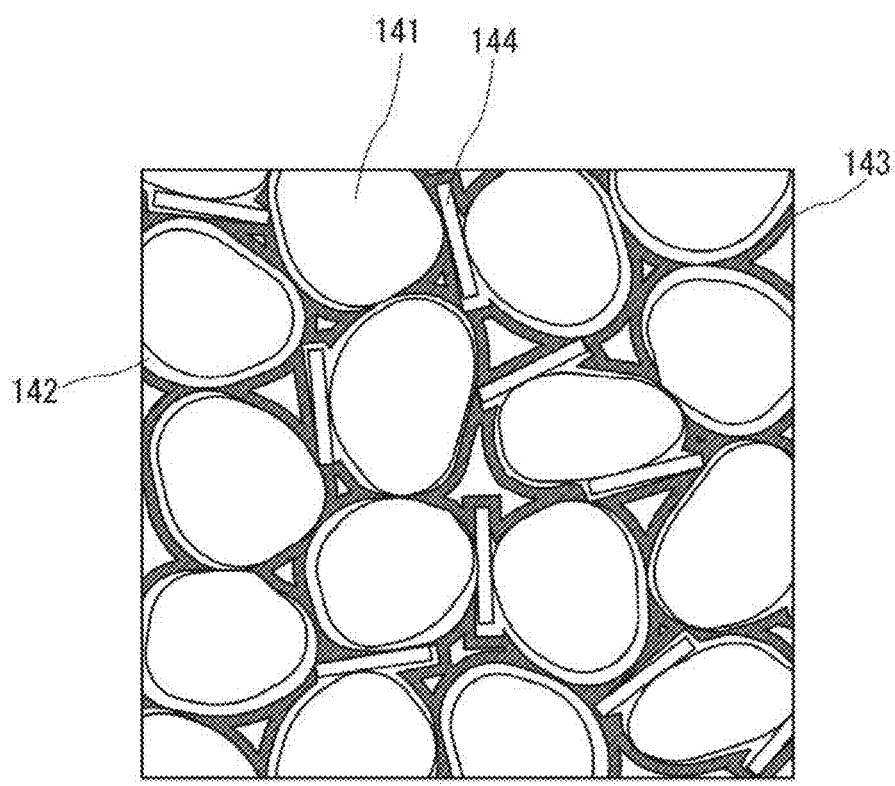
FIG. 3 illustrates an active material layer.

FIG. 3 is an enlarged cross-sectional view of an active material layer formed using Fabricating Method 2. The surface of an active material particle 141 may include a region in contact with another active material particle 141. The surface of the active material particle 141 may include a region in contact with a conductive additive 144. The surface of the active material particle 141 may include a region in contact with a binder 143. The surface of the active material particle 141 except these regions is at least partly in contact with a film 142. The film 142 preferably entirely covers the surface of the active material particle 141 except the regions but may be formed on part of the surface of the active material particle 141.

In Fabricating Method 2, the conductive additive is added in preparing the dispersion liquid, whereby the film 142 can be formed on at least part of the surface of the active material particle and at least part of the surface of the conductive additive in the state where the active material particle is at least partly in contact with the conductive additive. Thus, the proportion of the active material particles 141 each having a region in contact with the conductive additive 144 without the film 142 therebetween can be higher in an active material layer formed using Fabricating Method 2 than in the active material layer formed using Fabricating Method 1, so that electron conduction paths increase.

The active material particles 141 are bound with the binder 143 in the state where they are adjacent to each other, are adjacent to each other with the conductive additive 144 therebetween, and/or are adjacent to each other with the conductive additive 144 and the film 142 therebetween. In some cases, the active material layer includes a space formed by some of the active material particles 141.

As described in this embodiment, the spray dryer can dry the sprayed dispersion liquid containing the film-forming material in a moment, so that the active material particles whose surfaces are each partly or entirely covered with a film can be efficiently obtained. Furthermore, the method described in this embodiment allows obtaining active material particles with films thereon, as a material, in a stage before formation of slurry for electrode fabrication. Thus, compared with the method in which a film is formed over the surface of the active material particles through various steps after fabrication of an electrode, time (takt time) for electrode fabrication can be shortened and a yield can be increased.

Furthermore, the method described in this embodiment allows a film to be formed on the surface of an active material particle in a stage of obtaining a material. Thus, compared with the method in which a film is formed after fabrication of an electrode (in other words, the case where a film is formed in the state where active material particles are already in contact with each other), a larger area of the surface of the active material particle can be covered with the film leading to inhibition of the decomposition of an electrolytic solution, etc. around the electrode.

Furthermore, as described in this embodiment, when a film is formed on the surface of an active material particle in a stage of obtaining a material, the film can be positioned also in a minute space formed by some active material particles adjacent to each other. Thus, the decomposition of an electrolytic solution, etc. around the electrode can be inhibited.

This embodiment can be implemented in combination with any of the other embodiments and examples as appropriate.

(Embodiment 3)

Described in this embodiment will be an example of a power storage device using the electrode of one embodiment of the present invention.

Note that the power storage device in this specification and the like indicates all elements and devices that have the function of storing electric power. For example, a storage battery such as a lithium-ion secondary battery, a lithium-ion capacitor, and an electric double layer capacitor are included in the category of the power storage device.

(Thin Storage Battery)

Figure 4:
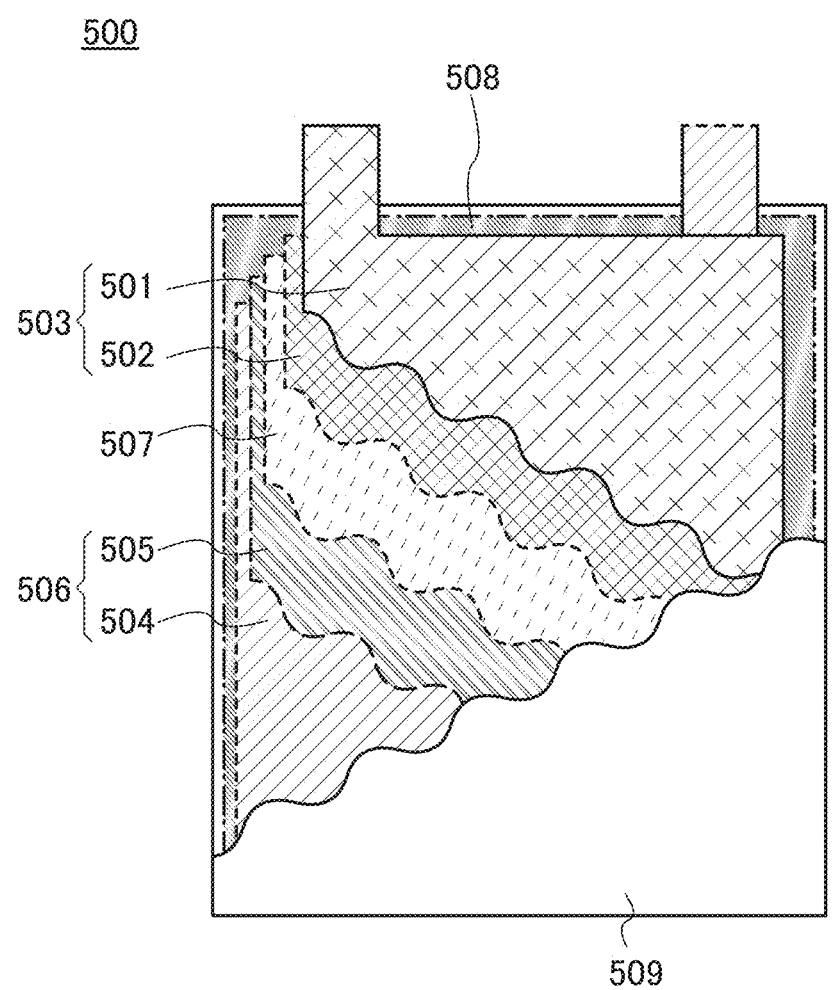
FIG. 4 illustrates a thin storage battery.

FIG. 4 illustrates thin storage batteries (also referred to as laminated storage batteries) as examples of power storage devices. When a flexible thin storage battery is used in an electronic device at least part of which is flexible, the storage battery can be bent as the electronic device is bent.

In a laminated lithium-ion secondary battery 500 illustrated in FIG. 4, a positive electrode 503 including a positive electrode current collector 501 and a positive electrode active material layer 502, a separator 507, and a negative electrode 506 including a negative electrode current collector 504 and a negative electrode active material layer 505 are stacked and sealed in an exterior body 509, and then an electrolyte solution 508 is injected into the exterior body 509. Although the laminated lithium-ion secondary battery 500 in each of FIGS. 4A and 4B has a structure where one sheet-like positive electrode 503 and one sheet-like negative electrode 506 are stacked, it is preferred that the stack be rolled or a plurality of the stacks be stacked and then they be laminated in order to increase battery capacity. Particularly in the case of the laminated lithium-ion secondary battery, the battery has flexibility and thus is suitable for applications that require flexibility.

In the laminated lithium-ion secondary battery 500 illustrated in FIG. 4, the positive electrode current collector 501 and the negative electrode current collector 504 also serve as terminals for an electrical contact with an external portion. For this reason, each of the positive electrode current collector 501 and the negative electrode current collector 504 is arranged so that part of the positive electrode current collector 501 and part of the negative electrode current collector 504 are exposed to the outside the exterior body 509.

As the exterior body 509 in the laminated lithium-ion secondary battery 500, for example, a laminate film having a three-layer structure in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided as the outer surface of the exterior body over the metal thin film can be used. With such a three-layer structure, permeation of an electrolytic solution and a gas can be blocked and an insulating property and resistance to the electrolytic solution can be obtained.

As at least one of the positive electrode 503 and the negative electrode 506, the electrode of one embodiment of the present invention can be used. The electrode of one embodiment of the present invention may be used as both the positive electrode 503 and the negative electrode 506.

In the case where both the positive electrode 503 and the negative electrode 506 are the electrodes of embodiments of the present invention, the decomposition of the electrolytic solution caused by a negative electrode reaction (e.g., mainly, oxidative decomposition) and the decomposition of the electrolytic solution caused by a positive electrode reaction (e.g., mainly, reductive decomposition) can be inhibited. Thus, it is possible that a storage battery having excellent properties can be fabricated even with the use of an electrolytic solution having a narrower potential window than a conventional electrolytic solution. In other words, the electrolytic solution used in the storage battery can be selected from a wide range of alternatives. For example, a safer electrolytic solution such as a nonflammable electrolytic solution to which fluorine is added might have low resistance to oxidation; however, even in the case where such an electrolytic solution is selected, a decrease in capacity by charge and discharge can be inhibited, so that a power storage device having more excellent characteristics can be obtained.

First, the structure of the negative electrode 506 will be described. Here, an example of using the electrode 101 described in Embodiment 1 as the negative electrode 506 will be described.

The negative electrode active material and the conductive additive that are described in Embodiment 1 are used for the negative electrode 506. The surface of each of the negative electrode active material particles is preferably partly or entirely covered with a film containing silicon oxide as its main component. Carbon fiber is preferably used as the conductive additive. Furthermore, the binder described in Embodiment 1 may be used for the negative electrode 506.

The negative electrode 506 is fabricated by the method described in Embodiment 2.

Next, the structure of the positive electrode 503 will be described.

Figure 5A:
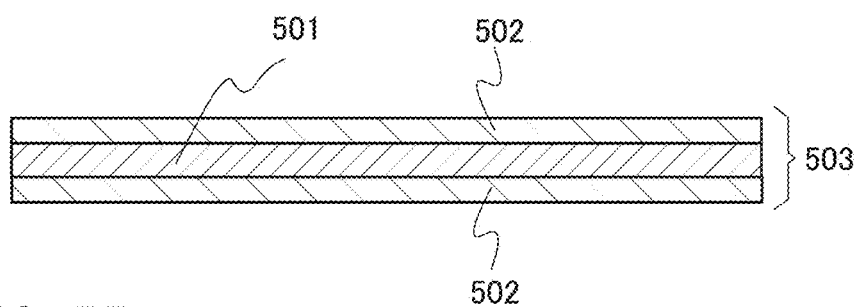
FIGS. 5A and 5B illustrate a positive electrode and a positive electrode active material layer.

FIG. 5A is a schematic cross-sectional view of the positive electrode 503 that includes a positive electrode current collector 501 and positive electrode active material layers 502 provided both of surfaces of the positive electrode current collector 501. Alternatively, positive electrode active material layer 502 may be provided over one of surfaces of the positive electrode current collector 501.

The positive electrode active material layer 502 does not necessarily have to be formed on and in direct contact with the positive electrode current collector 501. Any of the following functional layers may be formed using a conductive material such as a metal between the positive electrode current collector 501 and the positive electrode active material layer 502: an adhesion layer for increasing the adhesion between the positive electrode current collector 501 and the positive electrode active material layer 502; a planarization layer for reducing the roughness of the surface of the positive electrode current collector 501; a heat dissipation layer; a stress relaxation layer for relaxing the stress on the positive electrode current collector 501 or the positive electrode active material layer 502; and the like.

For the positive electrode current collector 501, any of the examples of the materials for the current collector that are described in Embodiment 1 can be selected to be used. The desired thickness of the positive electrode active material layer 502 is determined to be greater than or equal to 5 μm and less than or equal to 500 μm, preferably greater than or equal to 5 μm and less than or equal to 200 μm. It is preferred that the thickness of the positive electrode active material layer 502 be adjusted as appropriate so that a crack and separation are not caused.

Figure 5B:
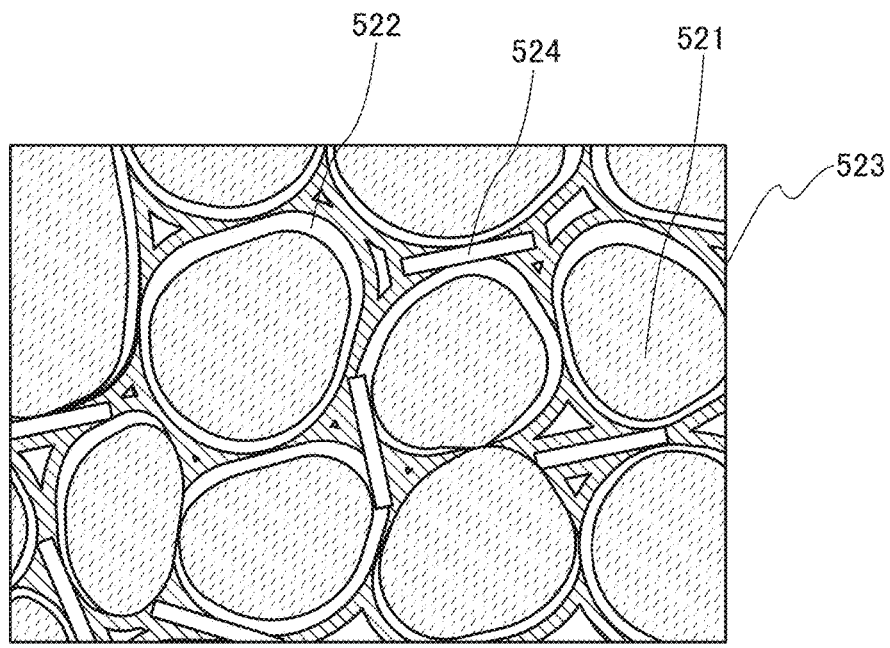

FIG. 5B is a longitudinal sectional view of the positive electrode active material layer 502. The positive electrode active material layer 502 includes positive electrode active material particles 521. As described above, an "active material" refers only to a material that relates to insertion and extraction of ions functioning as carriers. In this specification and the like, however, a layer including a conductive additive, a binder, or the like as well as a material that is actually an "active material" is also referred to as an active material layer.

The positive electrode active material described in Embodiment 1 can be used as the positive electrode active material particles 521. FIG. 5B illustrates an active material in the form of particles as the positive electrode active material. The size of the positive electrode active material particle 521 is preferably greater than or equal to 5 nm and less than or equal to 100 nm. Note that the size of the positive electrode active material particle 521 is preferably smaller because electrons move in the positive electrode active material particles 521.

The positive electrode active material layer 502 may further include a conductive additive 524. The conductive additive described in Embodiment 1 may be used as the conductive additive 524. In FIG. 5B, a fibrous conductive material is illustrated as the conductive additive 524.

The positive electrode active material layer 502 may further include a binder 523. As the binder 523, the binder described in Embodiment 1 can be used.

Here, it is preferred that at least part of the surface of the positive electrode active material particle 521 be covered with a film 522. The film 522 can be formed using any of the materials for the film-forming material that are described in Embodiment 1. In FIG. 5B, a film containing silicon oxide as its main component is illustrated as the film 522.

The surface of one of the positive electrode active material particles 521 includes at least one of a region in contact with the surface of another positive electrode active material particle 521, a region in contact with the conductive additive 524, and a region in contact with the binder 523. The surface of the positive electrode active material particle 521 except these regions is at least partly in contact with the film 522. The film 522 is preferably formed on all of the surface of the positive electrode active material particle 521 except the regions but may be formed on part of the surface of the positive electrode active material particle 521. The positive electrode active material particles 521 are bound with the binder 523 in the state where they are adjacent to each other, are adjacent to each other with the conductive additive 524 therebetween, and/or are adjacent to each other with the conductive additive 524 and the film 522 therebetween. In some cases, the positive electrode active material layer 502 includes a space formed by some of the positive electrode active material particles 521.

It is preferable that carrier ions can pass through the film 522. Thus, it is preferable that the film 522 be thin enough to allow carrier ions to pass through the film.

When the thickness of the film 522 is, for example, greater than or equal to 1 nm and less than or equal to 1 μm, preferably greater than or equal to 1 nm and less than or equal to 100 nm, the decomposition reaction between the positive electrode active material particle 521 and an electrolytic solution can be inhibited.

In the case of using, as the active material, an active material particle whose volume is changed by charge and discharge, the film 522 is preferably changed in shape accordingly when the positive electrode active material particle 521 is changed in shape because of the change in volume thereof. Therefore, the Young's modulus of the film 522 is preferably less than or equal to 70 GPa. The film 522 including a region covering the surface of the positive electrode active material particle 521 can be changed following a change in shape due to the change in volume of the positive electrode active material particle 521, so that separation of the film 522 from the positive electrode active material particle 521 can be suppressed.

The surface of one of the positive electrode active material particles 521 includes at least one of a region in contact with another positive electrode active material particle 521, a region in contact with the conductive additive 524, and a region in contact with the binder 523, and at least part of the surface of the one of the positive electrode active material particle except the regions is in contact with the film 522. This can prevent the supply of electrons between the surface of the positive electrode active material particle 521 and an electrolytic solution in charging of a power storage device. Thus, the decomposition reaction between the positive electrode active material particle 521 and an electrolytic solution can be inhibited, resulting in inhibition of formation of a passivating film on the positive electrode active material particle 521. This contributes to inhibition of a reduction in the initial capacity of the power storage device. Consequently, an increase in the resistance of the positive electrode 503 can be suppressed and the capacity of the power storage device can be increased.

When the positive electrode 503 is used in a power storage device such as a lithium-ion secondary battery or a lithium-ion capacitor, the long-term cycle performance of the power storage device such as a lithium-ion secondary battery or a lithium-ion capacitor can be improved.

Next, an example of a method for fabricating the positive electrode 503 will be described.

First, a film is formed on at least part of the surface of a positive electrode active material particle. Positive electrode active material particles, a film-forming material, a solvent, and a catalyst are mixed to prepare a dispersion liquid and the dispersion liquid is poured into a spray dryer, and fine powder of the positive electrode active material particles whose surfaces are each partly or entirely covered with the film is obtained.

As a positive electrode active material, any of the materials for the positive electrode active material described in Embodiment 1 can be used. As the film-forming material, any of the materials for the film-forming material described in Embodiment 2 can be used. Here, an example of using an organosilicon compound as the film-forming material will be described. The details of the dispersion liquid are described in Embodiment 2.

Next, heat treatment is performed on the fine powder. Through the heat treatment, the organosilicon compound attached to the positive electrode active material particles reacts with moisture in the air, so that hydrolysis occurs, and the hydrolyzed organosilicon compound is condensed following the hydrolysis reaction. Consequently, a film containing silicon oxide as a main component is formed on the surface of each of the positive electrode active material particles. The details of the heat treatment are described in Embodiment 2.

Next, the positive electrode active material particles with films thereon, a conductive additive, a binder, and a solvent are mixed to form slurry. Any of the materials for the conductive additive that are described in Embodiment 1 can be used as the conductive additive. Any of the materials for the binder that are described in Embodiment 1 can be used as the binder. One example is PVDF, which has high resistance to oxidation and is stable even in the case where the reaction potential of the positive electrode is high. Another example is a water-soluble polymer, which have high dispensability and can be evenly dispersed with small active material particles. Thus, a water-soluble polymer can function even in a smaller amount. As the solvent, any of the solvents described in Embodiment 2 can be used. Note that for the details of the mixing, Embodiment 2 can be referred to. Note that a solvent may be further added after the mixing so that the viscosity of the mixture can be adjusted. Mixing and addition of a solvent may be performed multiple times.

Then, the slurry is applied to the positive electrode current collector 501 and dried, whereby the positive electrode active material layer 502 is formed. For the application, a blade method, a continuous coater, or the like can be used. The steps for drying the slurry are as follows, for example. A drying step is performed using a hot plate at 30° C. or higher and 70° C. or lower in an air atmosphere for longer than or equal to 10 minutes, and then, another drying step is performed at room temperature or higher and 100° C. or lower in a reduced-pressure environment for longer than or equal to 1 hour and shorter than or equal to 10 hours.

Alternatively, the drying may be performed using a drying furnace or the like. In the case of using a drying furnace, the drying is performed at 30° C. to 120° C. inclusive for longer than or equal to 30 seconds and shorter than or equal to 20 minutes, for example. The temperature may be increased in stages. For example, after a drying step is performed at lower than or equal to 60° C. for shorter than or equal to 10 minutes, another drying step may further be performed at higher than or equal to 65° C. for longer than or equal to 1 minute.

Note that the positive electrode active material layer 502 may be formed over only one surface of the positive electrode current collector 501, or the positive electrode active material layers 502 may be formed over both of surfaces of the positive electrode current collector 501. Alternatively, the positive electrode active material layers 502 may be formed partially over both of surfaces of the positive electrode current collector 501.

The positive electrode current collector 501 may be subjected to surface treatment. Examples of such surface treatment include corona discharge treatment, plasma treatment, and undercoat treatment. The surface treatment increases the wettability of the positive electrode current collector 501 to the positive electrode slurry. In addition, the adhesion between the positive electrode current collector 501 and the positive electrode active material layer 502 can be increased.

The positive electrode active material layer 502 may be pressed by a compression method such as a roll press method or a flat plate press method so as to be consolidated.

Through the above steps, the positive electrode 503 provided with the positive electrode active material layer 502 that includes the positive electrode active material particles 521 with the films 522 thereon, the conductive additive 524, and the binder 523 can be fabricated.

Next, the separator 507 will be described below. As the separator 507, paper; nonwoven fabric; glass fiber; ceramics; synthetic fiber containing nylon (polyamide), vinylon (polyvinyl alcohol-based fiber), polyester, acrylic, polyolefin, or polyurethane; or the like can be used.

The separator 507 is preferably formed to have a bag-like shape to surround one of the positive electrode 503 and the negative electrode 506. For example, the separator 507 is folded in two such that the negative electrode 506 is sandwiched, and sealed in a region outside the region overlapping with the negative electrode 506; thus, the negative electrode 506 can be reliably supported inside the separator 507. Then, the positive electrodes 503 surrounded by the separators 507 and the negative electrodes 506 are alternately stacked and provided in the exterior body 509, whereby the laminated storage battery 500 can be formed.

The electrolytic solution 508 will be described. As a solvent of the electrolytic solution 508, an aprotic organic solvent is preferably used. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

When a high-molecular material that undergoes gelation is used as a solvent of the electrolytic solution, safety against liquid leakage and the like is improved. Furthermore, a secondary battery can be thinner and more lightweight. Typical examples of the high-molecular material that undergoes gelation include a silicone gel, an acrylic gel, an acrylonitrile gel, a polyethylene oxide-based gel, a polypropylene oxide-based gel, a fluorine-based polymer gel, and the like.

Alternatively, the use of one or more kinds of ionic liquids (room temperature molten salts) which have features of non-flammability and non-volatility as a solvent of the electrolytic solution can prevent a power storage device from exploding or catching fire even when a power storage device internally shorts out or the internal temperature increases owing to overcharging or the like. An ionic liquid contains a cation and an anion. The ionic liquid of one embodiment of the present invention contains an organic cation and an anion. Examples of the organic cation used for the electrolytic solution include aliphatic onium cations such as a quaternary ammonium cation, a tertiary sulfonium cation, and a quaternary phosphonium cation, and aromatic cations such as an imidazolium cation and a pyridinium cation. Examples of the anion used for the electrolytic solution include a monovalent amide-based anion, a monovalent methide-based anion, a fluorosulfonate anion, a perfluoroalkylsulfonate anion, a tetrafluoroborate anion, a perfluoroalkylborate anion, a hexafluorophosphate anion, and a perfluoroalkylphosphate anion.

In the case of using lithium ions as carriers, as an electrolyte dissolved in the above-described solvent, one of lithium salts such as $LiPF_6$, $LiClO_4$, $LiAsF_6$, $LiBF_4$, $LiAlCl_4$, $LiSCN$, $LiBr$, $LiI$, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, and $LiN(C_2F_5SO_2)_2$ can be used, or two or more of these lithium salts can be used in an appropriate combination in an appropriate ratio.

The electrolytic solution used for a power storage device is preferably highly purified and contains a small amount of dust particles and elements other than the constituent elements of the electrolytic solution (hereinafter, also simply referred to as impurities). Specifically, the weight ratio of impurities to the electrolytic solution is less than or equal to 1%, preferably less than or equal to 0.1%, and more preferably less than or equal to 0.01%.

Furthermore, an additive agent such as vinylene carbonate, propane sultone (PS), tert-butylbenzene (TBB), fluoroethylene carbonate (FEC), or LiBOB may be added to the electrolytic solution. The concentration of such an additive agent in the whole solvent is, for example, higher than or equal to 0.1 wt % and lower than or equal to 5 wt %.

Alternatively, a gelled electrolyte obtained in such a manner that a polymer is swelled with an electrolytic solution may be used. Examples of the gelled electrolyte (polymer-gel electrolyte) include a host polymer that is used as a support and contains the electrolytic solution described above.

Examples of a host polymer include a polymer having a polyalkylene oxide structure, such as polyethylene oxide (PEO); PVDF; polyacrylonitrile; and a copolymer containing any of them. For example, PVDF-HFP, which is a copolymer of PVDF and hexafluoropropylene (HFP) can be used. The formed polymer may be porous.

Instead of the electrolytic solution, a solid electrolyte including an inorganic material such as a sulfide-based inorganic material or an oxide-based inorganic material, or a solid electrolyte including a macromolecular material such as a polyethylene oxide (PEO)-based macromolecular material may alternatively be used. When the solid electrolyte is used, a separator and a spacer are not necessary. Furthermore, the battery can be entirely solidified; therefore, there is no possibility of liquid leakage and thus the safety of the battery is dramatically increased.

As the exterior body 509 in the laminated lithium-ion secondary battery 500, for example, a film having a three-layer structure in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided as the outer surface of the exterior body over the metal thin film can be used.

The example in FIG. 4 includes one positive electrode-negative electrode pair (the positive and negative electrodes face each other). It is needless to say that the number of pairs of electrodes is not limited to one, and may be more than one. In the case of using a large number of electrode layers, the storage battery can have high capacity. In contrast, in the case of using a small number of electrode layers, the storage battery can have a small thickness and high flexibility.

(Coin-Type Storage Battery)

Figure 6A:
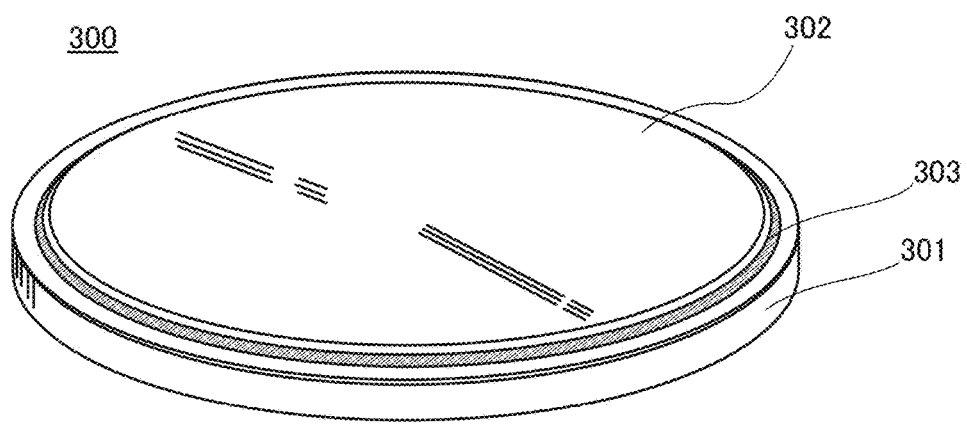
FIGS. 6A and 6B illustrate a coin-type lithium-ion secondary battery.
Figure 6B:
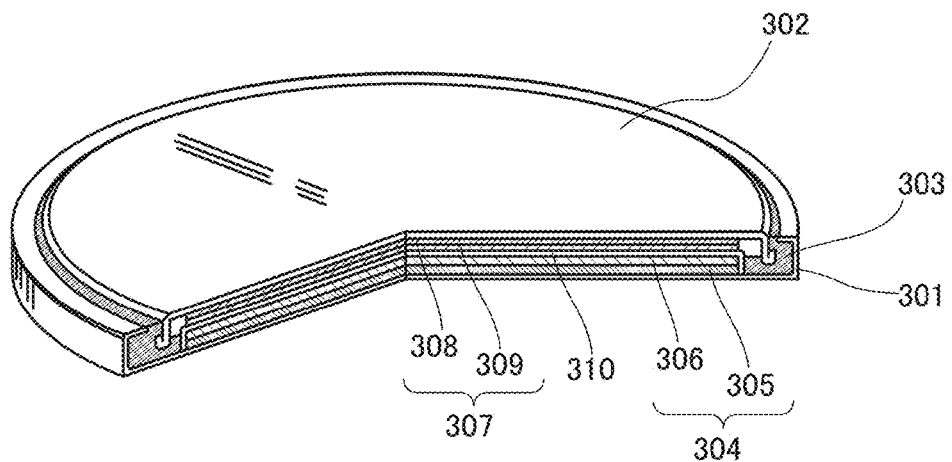

Next, an example of a coin-type storage battery will be described as an example of a power storage device with reference to FIGS. 6A and 6B. FIG. 6A is an external view of a coin-type (single-layer flat type) storage battery, and FIG. 6B is a cross-sectional view thereof.

In a coin-type storage battery 300, a positive electrode can 301 doubling as a positive electrode terminal and a negative electrode can 302 doubling as a negative electrode terminal are insulated from each other and sealed by a gasket 303 made of polypropylene or the like. A positive electrode 304 includes a positive electrode current collector 305 and a positive electrode active material layer 306 provided in contact with the positive electrode current collector 305. The description of the positive electrode active material layer 502 can be referred to for the positive electrode active material layer 306.

A negative electrode 307 includes a negative electrode current collector 308 and a negative electrode active material layer 309 provided in contact with the negative electrode current collector 308. The description of the active material layer 103 of Embodiment 1 can be referred to for the negative electrode active material layer 309. The description of the separator 507 can be referred to for the separator 310. The description of the electrolytic solution 508 can be referred to for the electrolytic solution.

Note that only one surface of each of the positive electrode 304 and the negative electrode 307 used for the coin-type storage battery 300 is provided with an active material layer.

For the positive electrode can 301 and the negative electrode can 302, a metal having a corrosion-resistant property to an electrolytic solution, such as nickel, aluminum, or titanium, an alloy of such a metal, or an alloy of such a metal and another metal (e.g., stainless steel or the like) can be used. Alternatively, the positive electrode can 301 and the negative electrode can 302 are preferably covered with nickel, aluminum, or the like in order to prevent corrosion due to the electrolytic solution. The positive electrode can 301 and the negative electrode can 302 are electrically connected to the positive electrode 304 and the negative electrode 307, respectively.

The negative electrode 307, the positive electrode 304, and the separator 310 are immersed in the electrolytic solution. Then, as illustrated in FIG. 6B, the positive electrode 304, the separator 310, the negative electrode 307, and the negative electrode can 302 are stacked in this order with the positive electrode can 301 positioned at the bottom, and the positive electrode can 301 and the negative electrode can 302 are subjected to pressure bonding with the gasket 303 interposed therebetween. In such a manner, the coin-type storage battery 300 can be manufactured.

[Cylindrical Storage Battery]

Figure 7A:
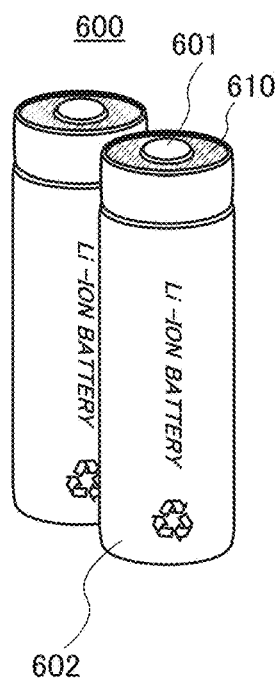
FIGS. 7A and 7B illustrate a cylindrical lithium-ion secondary battery.

Next, an example of a cylindrical storage battery will be described as an example of a power storage device with reference to FIGS. 7A and 7B. As illustrated in FIG. 7A, a cylindrical storage battery 600 includes a positive electrode cap (battery cap) 601 on the top surface and a battery can (outer can) 602 on the side surface and bottom surface. The positive electrode cap 601 and the battery can 602 are insulated from each other by a gasket (insulating gasket) 610.

Figure 7B:
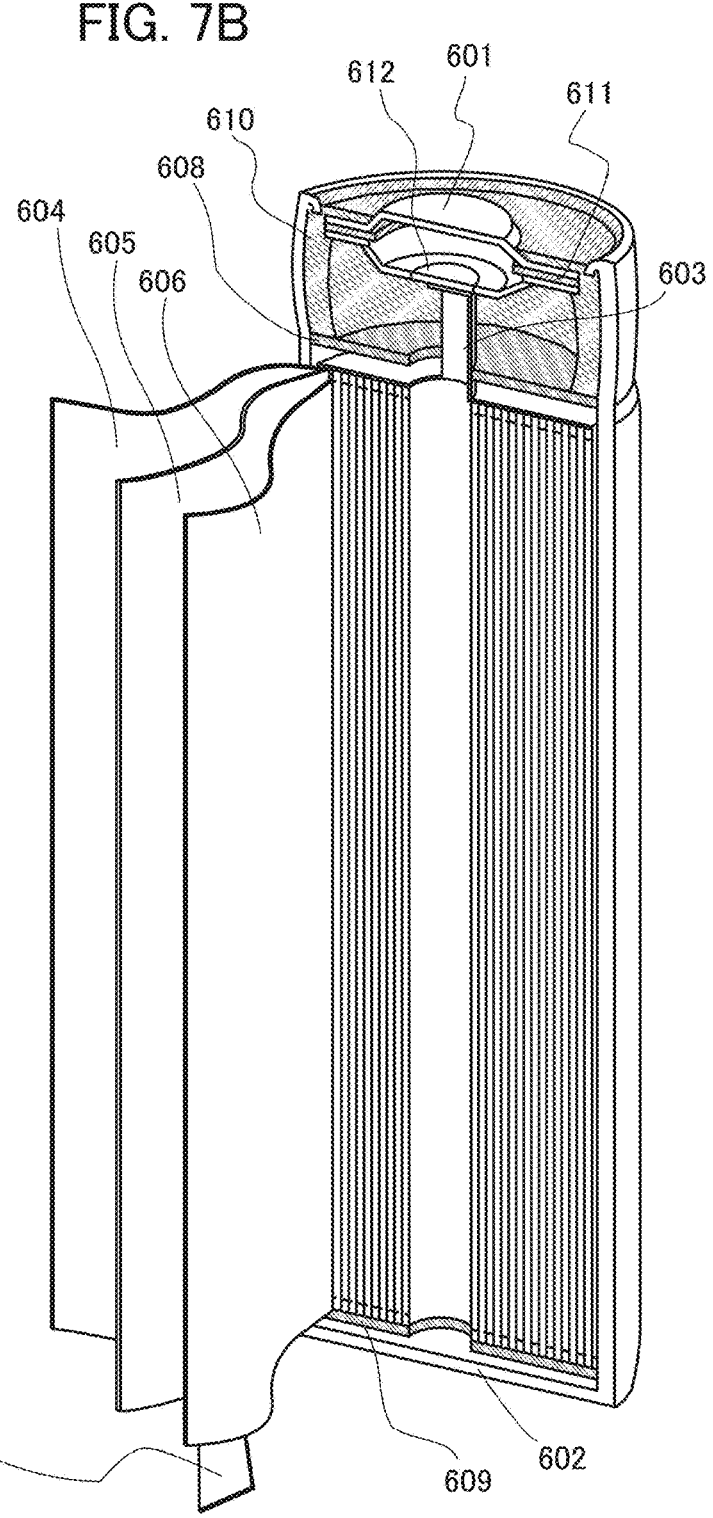

FIG. 7B is a diagram schematically illustrating a cross section of the cylindrical storage battery. Inside the battery can 602 having a hollow cylindrical shape, a battery element in which a strip-like positive electrode 604 and a strip-like negative electrode 606 are wound with a stripe-like separator 605 interposed therebetween is provided. Although not illustrated, the battery element is wound around a center pin. One end of the battery can 602 is close and the other end thereof is open. For the battery can 602, a metal having a corrosion-resistant property to an electrolytic solution, such as nickel, aluminum, or titanium, an alloy of such a metal, or an alloy of such a metal and another metal (e.g., stainless steel or the like) can be used. Alternatively, the battery can 602 is preferably covered with nickel, aluminum, or the like in order to prevent corrosion due to the electrolytic solution. Inside the battery can 602, the battery element in which the positive electrode, the negative electrode, and the separator are wound is provided between a pair of insulating plates 608 and 609 which face each other. Furthermore, a nonaqueous electrolytic solution (not illustrated) is injected inside the battery can 602 provided with the battery element. As the nonaqueous electrolytic solution, a nonaqueous electrolytic solution that is similar to those of the coin-type storage battery can be used.

The positive electrode 604 and the negative electrode 606 can be formed in a manner similar to that of the positive electrode and the negative electrode of the thin storage battery described above. Since the positive electrode and the negative electrode of the cylindrical storage battery are wound, active material layers are preferably formed on both sides of the current collectors. A positive electrode terminal (positive electrode current collecting lead) 603 is connected to the positive electrode 604, and a negative electrode terminal (negative electrode current collecting lead) 607 is connected to the negative electrode 606. Both the positive electrode terminal 603 and the negative electrode terminal 607 can be formed using a metal material such as aluminum. The positive electrode terminal 603 and the negative electrode terminal 607 are resistance-welded to a safety valve mechanism 612 and the bottom of the battery can 602, respectively. The safety valve mechanism 612 is electrically connected to the positive electrode cap 601 through a positive temperature coefficient (PTC) element 611. The safety valve mechanism 612 cuts off electrical connection between the positive electrode cap 601 and the positive electrode 604 when the internal pressure of the battery exceeds a predetermined threshold value. The PTC element 611, which serves as a thermally sensitive resistor whose resistance increases as temperature rises, limits the amount of current by increasing the resistance, in order to prevent abnormal heat generation. Note that barium titanate (BaTiO$_3$)-based semiconductor ceramic can be used for the PTC element.

Note that in this embodiment, the thin storage battery, the coin-type storage battery, and the cylindrical storage battery are given as examples of the storage battery; however, any of storage batteries with a variety of shapes, such as a sealed storage battery and a square-type storage battery, can be used. Furthermore, a structure in which a plurality of positive electrodes, a plurality of negative electrodes, and a plurality of separators are stacked or wound may be employed. For example, FIGS. 8A to 8C, FIGS. 9A to 9C, FIGS. 10A and 10B, FIGS. 11A1 to 11B2, and FIGS. 12A and 12B illustrate examples of other storage batteries.

[Structural Example of Storage Battery]

FIGS. 8A to 8C and FIGS. 9A to 9C illustrate structural examples of thin storage batteries. A wound body 993 illustrated in FIG. 8A includes a negative electrode 994, a positive electrode 995, and a separator 996.

The wound body 993 is obtained by winding a sheet of a stack in which the negative electrode 994 overlaps with the positive electrode 995 with the separator 996 therebetween. The wound body 993 is covered with a rectangular sealed container or the like; thus, a rectangular secondary battery is fabricated.

Note that the number of stacks each including the negative electrode 994, the positive electrode 995, and the separator 996 is determined as appropriate depending on capacity and element volume which are required. The negative electrode 994 is connected to a negative electrode current collector (not illustrated) via one of a lead electrode 997 and a lead electrode 998. The positive electrode 995 is connected to a positive electrode current collector (not illustrated) via the other of the lead electrode 997 and the lead electrode 998.

Figure 8A:
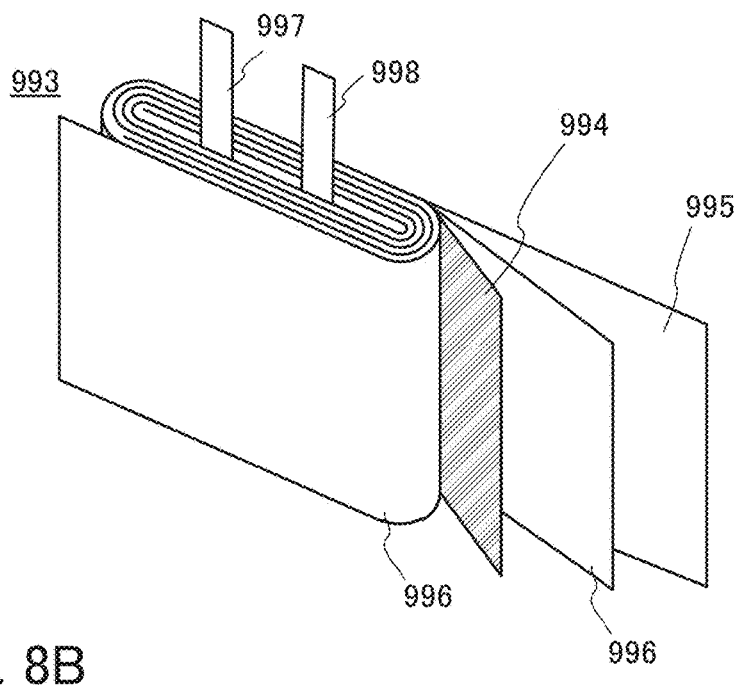
FIGS. 8A to 8C illustrate an example of a power storage device.
Figure 8B:
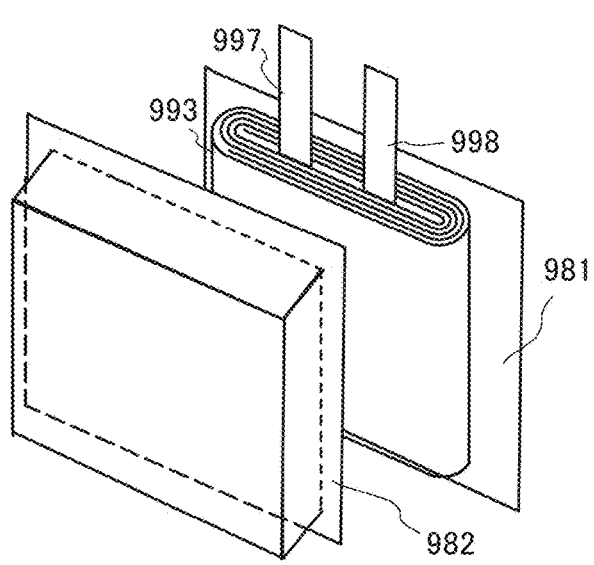
Figure 8C:
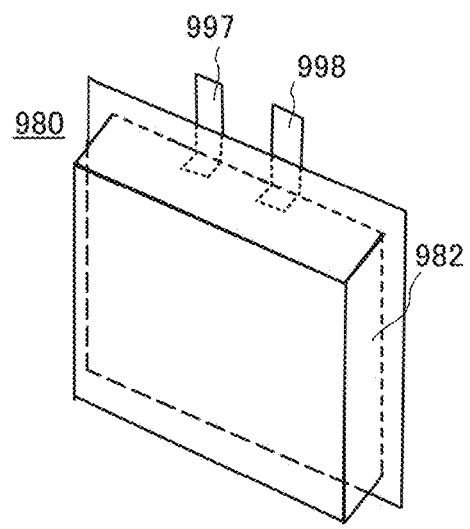

In a storage battery 980 illustrated in FIGS. 8B and 8C, the wound body 993 is packed in a space formed by bonding a film 981 and a film 982 having a depressed portion that serve as exterior bodies by thermocompression bonding or the like. The wound body 993 includes the lead electrode 997 and the lead electrode 998, and is soaked in an electrolytic solution inside a space surrounded by the film 981 and the film 982 having a depressed portion.

For the film 981 and the film 982 having a depressed portion, a metal material such as aluminum or a resin material can be used, for example. With the use of a resin material for the film 981 and the film 982 having a depressed portion, the film 981 and the film 982 having a depressed portion can be changed in their forms when external force is applied; thus, a flexible storage battery can be fabricated.

Although FIGS. 8B and 8C illustrate an example where a space is formed by two films, the wound body 993 may be placed in a space formed by bending one film.

Furthermore, in fabricating a flexible power storage device, a resin material or the like can be used for an exterior body and a sealed container of the power storage device. Note that in the case where a resin material is used for the exterior body and the sealed container, a conductive material is used for a portion connected to the outside.

For example, FIGS. 9B and 9C illustrate another example of a flexible thin storage battery. The wound body 993 illustrated in FIG. 9A is the same as that illustrated in FIG. 8A, and the detailed description thereof is omitted.

In a storage battery 990 illustrated in FIGS. 9B and 9C, the wound body 993 is packed in an exterior body 991. The wound body 993 includes the lead electrode 997 and the lead electrode 998, and is soaked in an electrolytic solution inside a space surrounded by the exterior body 991 and an exterior body 992. For example, a metal material such as aluminum or a resin material can be used for the exterior bodies 991 and 992. With the use of a resin material for the exterior bodies 991 and 992, the exterior bodies 991 and 992 can be changed in their forms when external force is applied; thus, a flexible thin storage battery can be fabricated.

[Structural Example of Power Storage System]

Structural examples of power storage systems will be described with reference to FIGS. 10A and 10B, FIGS. 11A1 to 11B2, and FIGS. 12A and 12B. Here, a power storage system refers to, for example, a device including a power storage device.

Figure 10A:
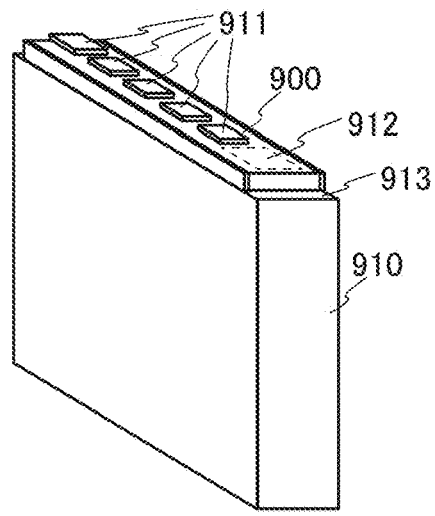
FIGS. 10A and 10B illustrate an example of a power storage device.
Figure 10B:
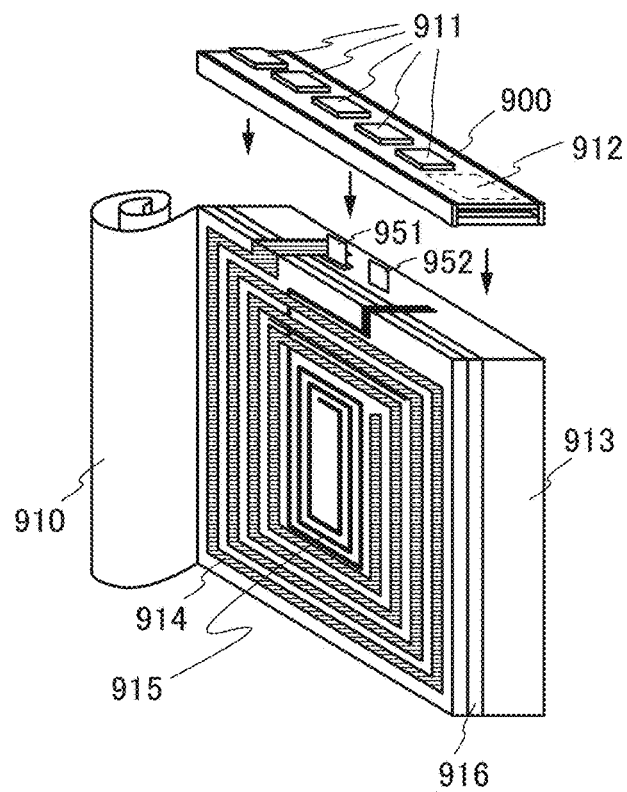

FIGS. 10A and 10B are external views of a power storage system. The power storage system includes a circuit board 900 and a storage battery 913. A label 910 is attached to the storage battery 913. As shown in FIG. 10B, the power storage system further includes a terminal 951, a terminal 952, an antenna 914, and an antenna 915.

The circuit board 900 includes terminals 911 and a circuit 912. The terminals 911 are connected to the terminals 951 and 952, the antennas 914 and 915, and the circuit 912. Note that a plurality of terminals 911 serving as a control signal input terminal, a power supply terminal, and the like may be provided.

The circuit 912 may be provided on the rear surface of the circuit board 900. The shape of each of the antennas 914 and 915 is not limited to a coil shape and may be a linear shape or a plate shape. Further, a planar antenna, an aperture antenna, a traveling-wave antenna, an EH antenna, a magnetic-field antenna, or a dielectric antenna may be used. Alternatively, the antenna 914 or the antenna 915 may be a flat-plate conductor. The flat-plate conductor can serve as one of conductors for electric field coupling. That is, the antenna 914 or the antenna 915 can serve as one of two conductors of a capacitor. Thus, electric power can be transmitted and received not only by an electromagnetic field or a magnetic field but also by an electric field.

The line width of the antenna 914 is preferably larger than that of the antenna 915. This makes it possible to increase the amount of electric power received by the antenna 914.

The power storage system includes a layer 916 between the storage battery 913 and the antennas 914 and 915. The layer 916 may have a function of blocking an electromagnetic field by the storage battery 913. As the layer 916, for example, a magnetic body can be used.

Note that the structure of the power storage system is not limited to that shown in FIGS. 10A and 10B.

For example, as shown in FIGS. 11A1 and 11A2, two opposite surfaces of the storage battery 913 in FIGS. 10A and 10B may be provided with respective antennas. FIG. 11A1 is an external view showing one side of the opposite surfaces, and FIG. 11A2 is an external view showing the other side of the opposite surfaces. For portions similar to those in FIGS. 10A and 10B, the description of the power storage system illustrated in FIGS. 10A and 10B can be referred to as appropriate.

As illustrated in FIG. 11A1, the antenna 914 is provided on one of the opposite surfaces of the storage battery 913 with the layer 916 interposed therebetween, and as illustrated in FIG. 11A2, the antenna 915 is provided on the other of the opposite surfaces of the storage battery 913 with a layer 917 interposed therebetween. The layer 917 may have a function of preventing an adverse effect on an electromagnetic field by the storage battery 913. As the layer 917, for example, a magnetic body can be used.

With the above structure, both of the antennas 914 and 915 can be increased in size.

Alternatively, as illustrated in FIGS. 11B1 and 11B2, two opposite surfaces of the storage battery 913 in FIGS. 10A and 10B may be provided with different types of antennas. FIG. 11B1 is an external view showing one side of the opposite surfaces, and FIG. 11B2 is an external view showing the other side of the opposite surfaces. For portions similar to those in FIGS. 10A and 10B, the description of the power storage system illustrated in FIGS. 10A and 10B can be referred to as appropriate.

As illustrated in FIG. 11B1, the antenna 914 is provided on one of the opposite surfaces of the storage battery 913 with the layer 916 interposed therebetween, and as illustrated in FIG. 11B2, an antenna 918 is provided on the other of the opposite surfaces of the storage battery 913 with the layer 917 interposed therebetween. The antenna 918 has a function of communicating data with an external device, for example. An antenna with a shape that can be applied to the antennas 914 and 915, for example, can be used as the antenna 918. As a system for communication using the antenna 918 between the power storage system and another device, a response method that can be used between the power storage system and another device, such as NFC, can be employed.

Figure 12A:
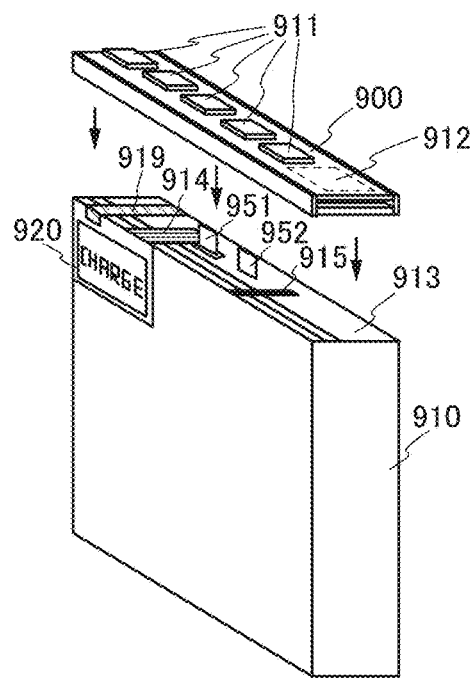
FIGS. 12A and 12B illustrate examples of power storage devices.

Alternatively, as illustrated in FIG. 12A, the storage battery 913 in FIGS. 10A and 10B may be provided with a display device 920. The display device 920 is electrically connected to the terminal 911 via a terminal 919. It is possible that the label 910 is not provided in a portion where the display device 920 is provided. For portions similar to those in FIGS. 10A and 10B, the description of the power storage system illustrated in FIGS. 10A and 10B can be referred to as appropriate.

The display device 920 can display, for example, an image showing whether charge is being carried out, an image showing the amount of stored power, or the like. As the display device 920, electronic paper, a liquid crystal display device, an electroluminescent (EL) display device, or the like can be used. For example, the use of electronic paper can reduce power consumption of the display device 920.

Figure 12B:
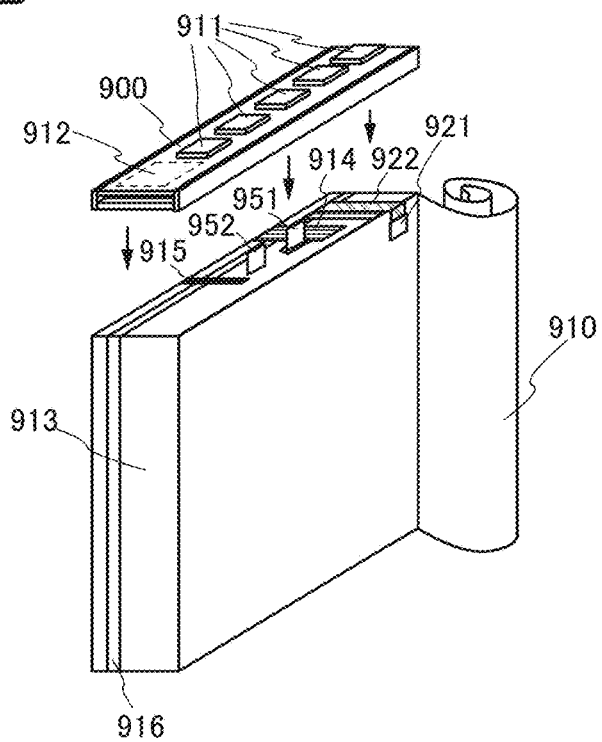

Alternatively, as illustrated in FIG. 12B, the storage battery 913 illustrated in FIGS. 10A and 10B may be provided with a sensor 921. The sensor 921 is electrically connected to the terminal 911 via a terminal 922. For portions similar to those in FIGS. 10A and 10B, the description of the power storage system illustrated in FIGS. 10A and 10B can be referred to as appropriate.

As the sensor 921, a sensor that has a function of measuring, for example, force, displacement, position, speed, acceleration, angular velocity, rotational frequency, distance, light, liquid, magnetism, temperature, chemical substance, sound, time, hardness, electric field, electric current, voltage, electric power, radiation, flow rate, humidity, gradient, oscillation, odor, or infrared rays can be used. With the sensor 921, for example, data on an environment (e.g., temperature) where the power storage system is placed can be determined and stored in a memory inside the circuit 912.

The electrode of one embodiment of the present invention is used in the storage battery and the power storage system that are described in this embodiment. The capacity of the storage battery and the power storage system can thus be high. Furthermore, energy density can be high. Moreover, reliability can be high, and life can be long.

This embodiment can be implemented in appropriate combination with any of the other embodiments.

(Embodiment 4)

In this embodiment, an example of an electronic device including a flexible storage battery will be described.

FIGS. 13A to 13G illustrate examples of electronic devices including the flexible storage batteries described in Embodiment 3. Examples of electronic devices each including a flexible storage battery include television devices (also referred to as televisions or television receivers), monitors of computers or the like, cameras such as digital cameras and digital video cameras, digital photo frames, mobile phones (also referred to as mobile phones or mobile phone devices), portable game machines, portable information terminals, audio reproducing devices, and large game machines such as pachinko machines.

In addition, a flexible power storage device can be incorporated along a curved inside/outside wall surface of a house or a building or a curved interior/exterior surface of a car.

Figure 13A:
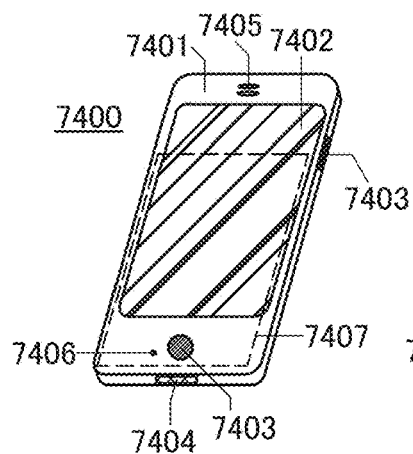
FIGS. 13A to 13G illustrate examples of electronic devices.

FIG. 13A illustrates an example of a mobile phone. A mobile phone 7400 is provided with a display portion 7402 incorporated in a housing 7401, an operation button 7403, an external connection port 7404, a speaker 7405, a microphone 7406, and the like. Note that the mobile phone 7400 includes a power storage device 7407.

Figure 13B:
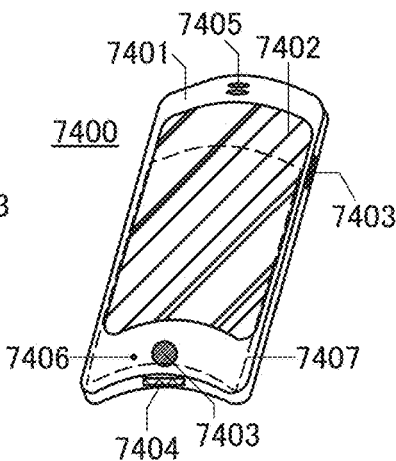
Figure 13C:
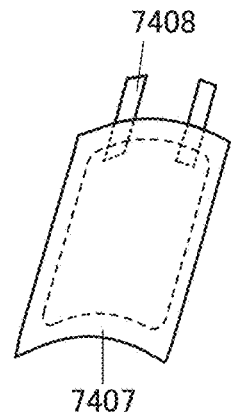

FIG. 13B illustrates the mobile phone 7400 that is bent. When the whole mobile phone 7400 is bent by the external force, the power storage device 7407 included in the mobile phone 7400 is also bent. FIG. 13C illustrates the bent power storage device 7407. The power storage device 7407 is a thin storage battery. The power storage device 7407 is fixed in a state of being bent. Note that the power storage device 7407 includes a lead electrode 7408 electrically connected to a current collector. The current collector is, for example, copper foil, and partly alloyed with gallium; thus, adhesion between the current collector and an active material layer in contact with the current collector is improved and the power storage device 7407 can have high reliability even in a state of being bent.

Figure 13D:
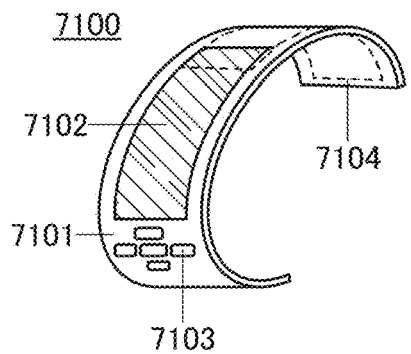
Figure 13E:
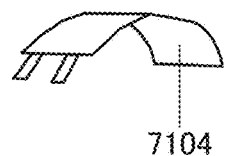

FIG. 13D illustrates an example of a portable bangle display device. A portable display device 7100 includes a housing 7101, a display portion 7102, an operation button 7103, and a power storage device 7104. FIG. 13E illustrates the bent power storage device 7104. When the display device is worn on a user's arm while the power storage device 7104 is bent, the housing changes its form and the curvature of a part or the whole of the power storage device 7104 is changed. Note that the radius of curvature of a curve at a point refers to the radius of the circular arc that best approximates the curve at that point. The reciprocal of the radius of curvature is curvature. Specifically, a part or the whole of the housing or the main surface of the power storage device 7104 is changed in the range of radius of curvature from 40 mm to 150 mm. When the radius of curvature at the main surface of the power storage device 7104 is greater than or equal to 40 mm and less than or equal to 150 mm, the reliability can be kept high.

Figure 13F:
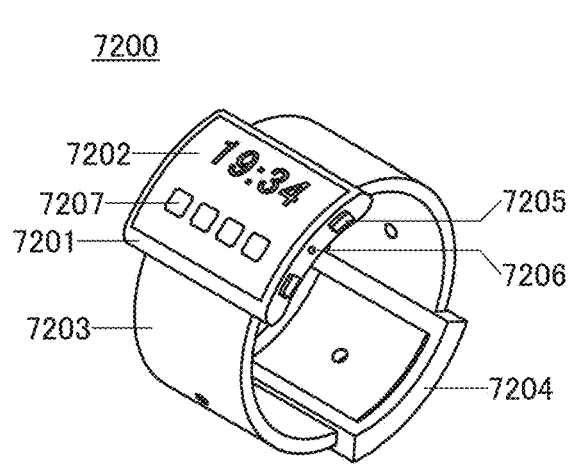

FIG. 13F illustrates an example of a watch-type portable information terminal. A portable information terminal 7200 includes a housing 7201, a display portion 7202, a band 7203, a buckle 7204, an operation button 7205, an input output terminal 7206, and the like.

The portable information terminal 7200 is capable of executing a variety of applications such as mobile phone calls, e-mailing, viewing and editing texts, music reproduction, Internet communication, and a computer game.

The display surface of the display portion 7202 is curved, and images can be displayed on the curved display surface. In addition, the display portion 7202 includes a touch sensor, and operation can be performed by touching the screen with a finger, a stylus, or the like. For example, by touching an icon 7207 displayed on the display portion 7202, application can be started.

With the operation button 7205, a variety of functions such as time setting, power on/off, on/off of wireless communication, setting and cancellation of a manner mode, and setting and cancellation of a power saving mode can be performed. For example, the functions of the operation button 7205 can be set freely by setting the operation system incorporated in the portable information terminal 7200.

The portable information terminal 7200 can employ near field communication that is a communication method based on an existing communication standard. In that case, for example, mutual communication between the portable information terminal 7200 and a headset capable of wireless communication can be performed, and thus hands-free calling is possible.

Moreover, the portable information terminal 7200 includes the input output terminal 7206, and data can be directly transmitted to and received from another information terminal via a connector. In addition, charging via the input output terminal 7206 is possible. Note that the charging operation may be performed by wireless power feeding without using the input output terminal 7206.

The display portion 7202 of the portable information terminal 7200 is provided with a power storage device including the electrode of one embodiment of the present invention. For example, the power storage device 7104 illustrated in FIG. 13E that is in the state of being curved can be provided in the housing 7201. Alternatively, the power storage device 7104 illustrated in FIG. 13E can be provided in the band 7203 such that it can be curved.

Figure 13G:
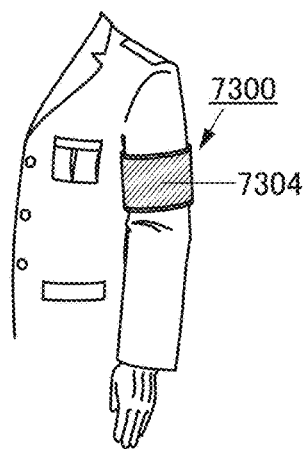

FIG. 13G illustrates an example of an armband display device. A display device 7300 includes a display portion 7304 and the power storage device of one embodiment of the present invention. For example, the power storage device 7104 illustrated in FIG. 13E that is bent can be included in a housing. The display device 7300 can include a touch sensor in the display portion 7304 and can serve as a portable information terminal.

The display surface of the display portion 7304 is bent, and images can be displayed on the bent display surface. A display state of the display device 7300 can be changed by, for example, near field communication, which is a communication method based on an existing communication standard.

The display device 7300 includes an input output terminal, and data can be directly transmitted to and received from another information terminal via a connector. In addition, charging via the input output terminal is possible. Note that the charging operation may be performed by wireless power feeding without using the input output terminal.

This embodiment can be implemented in appropriate combination with any of the other embodiments.

(Embodiment 5)

In this embodiment, examples of electronic devices that can include power storage devices will be described.

Figure 14A:
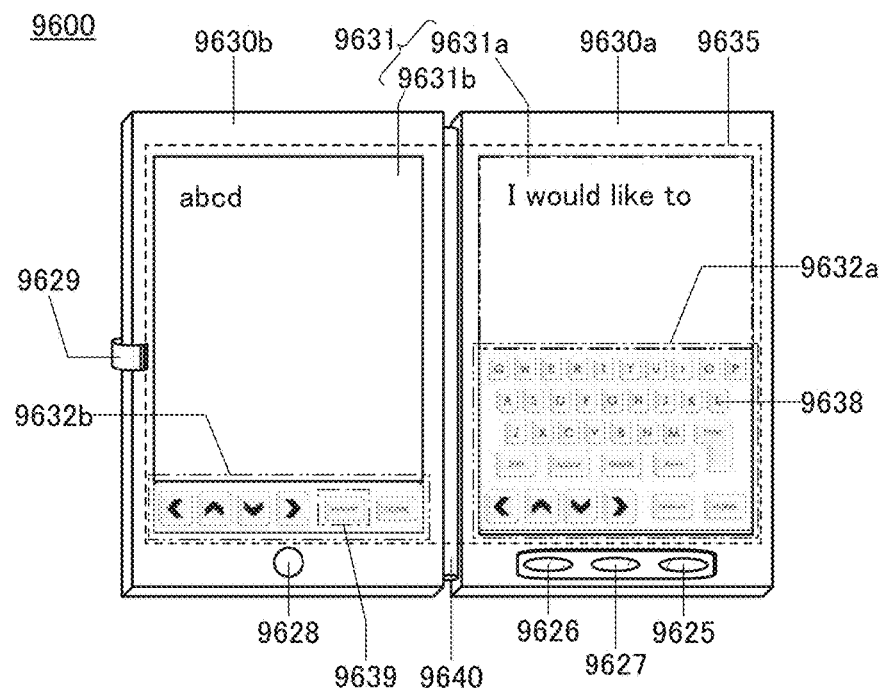
FIGS. 14A to 14C illustrate an example of an electronic device.
Figure 14B:
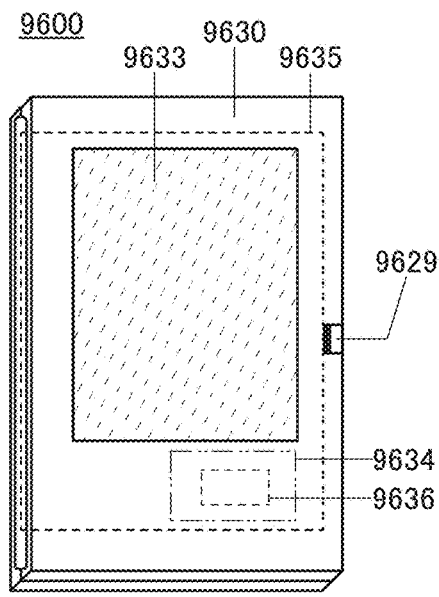

FIGS. 14A and 14B illustrate an example of a tablet terminal that can be folded in half. A tablet terminal 9600 illustrated in FIGS. 14A and 14B includes a housing 9630*a*, a housing 9630*b*, a movable portion 9640 connecting the housings 9630*a* and 9630*b*, a display portion 9631 including a display portion 9631*a* and a display portion 9631*b*, a display mode changing switch 9626, a power switch 9627, a power saving mode changing switch 9625, a fastener 9629, and an operation switch 9628. FIG. 14A illustrates the tablet terminal 9600 that is opened, and FIG. 14B illustrates the tablet terminal 9600 that is closed.

The tablet terminal 9600 includes a power storage unit 9635 inside the housings 9630*a* and 9630*b*. The power storage unit 9635 is provided across the housings 9630*a* and 9630*b*, passing through the movable portion 9640.

Part of the display portion 9631*a* can be a touch panel region 9632*a*, and data can be input by touching operation keys 9638 that are displayed. Note that FIG. 14A shows, as an example, that half of the area of the display portion 9631*a* has only a display function and the other half of the area has a touch panel function. However, the structure of the display portion 9631*a* is not limited to this, and all the area of the display portion 9631*a* may have a touch panel function. For example, all the area of the display portion 9631*a* can display a keyboard and serve as a touch panel while the display portion 9631*b* can be used as a display screen.

As in the display portion 9631*a*, part of the display portion 9631*b* can be a touch panel region 9632*b*. When a keyboard display switching button 9639 displayed on the touch panel is touched with a finger, a stylus, or the like, a keyboard can be displayed on the display portion 9631*b*.

Touch input can be performed in the touch panel region 9632*a* and the touch panel region 9632*b* at the same time.

The display mode changing switch 9626 allows switching between a landscape mode and a portrait mode, color display and black-and-white display, and the like. The power saving mode changing switch 9625 can control display luminance in accordance with the amount of external light in use of the tablet terminal 9600, which is measured with an optical sensor incorporated in the tablet terminal 9600. In addition to the optical sensor, other detecting devices such as sensors for determining inclination, such as a gyroscope or an acceleration sensor, may be incorporated in the tablet terminal.

Although the display portion 9631*a* and the display portion 9631*b* have the same area in FIG. 14A, one embodiment of the present invention is not limited to this example. The display portion 9631*a* and the display portion 9631*b* may have different areas or different display quality. For example, one of the display portions 9631*a* and 9631*b* may display higher definition images than the other.

The tablet terminal is closed in FIG. 14B. The tablet terminal includes the housing 9630, a solar cell 9633, and a charge and discharge control circuit 9634 including a DC-DC converter 9636. The power storage unit of one embodiment of the present invention is used as the power storage unit 9635.

The tablet terminal 9600 can be folded such that the housings 9630*a* and 9630*b* overlap with each other when not in use. Thus, the display portions 9631*a* and 9631*b* can be protected, which increases the durability of the tablet terminal 9600. In addition, the power storage unit 9635 of one embodiment of the present invention has flexibility and can be repeatedly bent without a significant decrease in charge and discharge capacity. Thus, a highly reliable tablet terminal can be provided.

The tablet terminal illustrated in FIGS. 14A and 14B can also have a function of displaying various kinds of data (e.g., a still image, a moving image, and a text image), a function of displaying a calendar, a date, or the time on the display portion, a touch-input function of operating or editing data displayed on the display portion by touch input, a function of controlling processing by various kinds of software (programs), and the like.

The solar cell 9633, which is attached on the surface of the tablet terminal, supplies electric power to a touch panel, a display portion, an image signal processing portion, and the like. Note that the solar cell 9633 can be provided on one or both surfaces of the housing 9630 and the power storage unit 9635 can be charged efficiently. The use of a lithium-ion secondary battery as the power storage unit 9635 brings an advantage such as reduction in size.

Figure 14C:
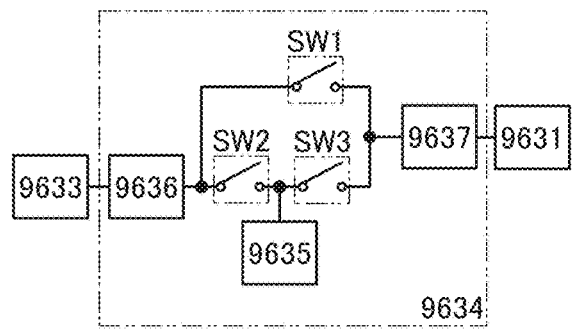

The structure and operation of the charge and discharge control circuit 9634 illustrated in FIG. 14B will be described with reference to a block diagram in FIG. 14C. The solar cell 9633, the power storage unit 9635, the DC-DC converter 9636, a converter 9637, switches SW1 to SW3, and the display portion 9631 are illustrated in FIG. 14C, and the power storage unit 9635, the DC-DC converter 9636, the converter 9637, and the switches SW1 to SW3 correspond to the charge and discharge control circuit 9634 in FIG. 14B.

First, an example of operation when electric power is generated by the solar cell 9633 using external light will be described. The voltage of electric power generated by the solar cell is raised or lowered by the DC-DC converter 9636 to a voltage for charging the power storage unit 9635. When the display portion 9631 is operated with the electric power from the solar cell 9633, the switch SW1 is turned on and the voltage of the electric power is raised or lowered by the converter 9637 to a voltage needed for operating the display portion 9631. When display on the display portion 9631 is not performed, the switch SW1 is turned off and the switch SW2 is turned on, so that the power storage unit 9635 can be charged. When the display portion 9631 is operated with the electric power from the power storage unit 9635, the switch SW1 is turned off, the switch SW2 is turned off, and the switch SW3 is turned on.

Note that the solar cell 9633 is described as an example of a power generation means; however, one embodiment of the present invention is not limited to this example. The power storage unit 9635 may be charged using another power generation means such as a piezoelectric element or a thermoelectric conversion element (Peltier element). For example, the power storage unit 9635 may be charged with a non-contact power transmission module capable of performing charging by transmitting and receiving electric power wirelessly (without contact), or any of the other charge means used in combination.

FIG. 15 illustrates other examples of electronic devices. In FIG. 15, a display device 8000 is an example of an electronic device including a power storage device 8004 of one embodiment of the present invention. Specifically, the display device 8000 corresponds to a display device for TV broadcast reception and includes a housing 8001, a display portion 8002, speaker portions 8003, and the power storage device 8004. The power storage device 8004 of one embodiment of the present invention is provided in the housing 8001. The display device 8000 can receive electric power from a commercial power supply. Alternatively, the display device 8000 can use electric power stored in the power storage device 8004. Thus, the display device 8000 can be operated with the use of the power storage device 8004 of one embodiment of the present invention as an uninterruptible power supply even when electric power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), or a field emission display (FED) can be used for the display portion 8002.

Note that the display device includes, in its category, all of information display devices for personal computers, advertisement displays, and the like besides TV broadcast reception.

In FIG. 15, an installation lighting device 8100 is an example of an electronic device including a power storage device 8103 of one embodiment of the present invention. Specifically, the lighting device 8100 includes a housing 8101, a light source 8102, and the power storage device 8103. Although FIG. 15 illustrates the case where the power storage device 8103 is provided in a ceiling 8104 on which the housing 8101 and the light source 8102 are installed, the power storage device 8103 may be provided in the housing 8101. The lighting device 8100 can receive electric power from a commercial power supply. Alternatively, the lighting device 8100 can use electric power stored in the power storage device 8103. Thus, the lighting device 8100 can be operated with the use of power storage device 8103 of one embodiment of the present invention as an uninterruptible power supply even when electric power cannot be supplied from a commercial power supply due to power failure or the like.

Note that although the installation lighting device 8100 provided in the ceiling 8104 is illustrated in FIG. 15 as an example, the power storage device of one embodiment of the present invention can be used in an installation lighting device provided in, for example, a wall 8105, a floor 8106, a window 8107, or the like other than the ceiling 8104. Alternatively, the power storage device of one embodiment of the present invention can be used in a tabletop lighting device or the like.

As the light source 8102, an artificial light source which emits light artificially by using electric power can be used. Specifically, an incandescent lamp, a discharge lamp such as a fluorescent lamp, and light-emitting elements such as an LED and an organic EL element are given as examples of the artificial light source.

In FIG. 15, an air conditioner including an indoor unit 8200 and an outdoor unit 8204 is an example of an electronic device including a power storage device 8203 of one embodiment of the present invention. Specifically, the indoor unit 8200 includes a housing 8201, an air outlet 8202, and the power storage device 8203. Although FIG. 15 illustrates the case where the power storage device 8203 is provided in the indoor unit 8200, the power storage device 8203 may be provided in the outdoor unit 8204. Alternatively, the power storage devices 8203 may be provided in both the indoor unit 8200 and the outdoor unit 8204. The air conditioner can receive electric power from a commercial power supply. Alternatively, the air conditioner can use electric power stored in the power storage device 8203. Particularly in the case where the power storage devices 8203 are provided in both the indoor unit 8200 and the outdoor unit 8204, the air conditioner can be operated with the use of the power storage device 8203 of one embodiment of the present invention as an uninterruptible power supply even when electric power cannot be supplied from a commercial power supply due to power failure or the like.

Note that although the split-type air conditioner including the indoor unit and the outdoor unit is illustrated in FIG. 15 as an example, the power storage device of one embodiment of the present invention can be used in an air conditioner in which the functions of an indoor unit and an outdoor unit are integrated in one housing.

In FIG. 15, an electric refrigerator-freezer 8300 is an example of an electronic device including a power storage device 8304 of one embodiment of the present invention. Specifically, the electric refrigerator-freezer 8300 includes a housing 8301, a door for a refrigerator 8302, a door for a freezer 8303, and the power storage device 8304. The power storage device 8304 is provided in the housing 8301 in FIG. 15. The electric refrigerator-freezer 8300 can receive electric power from a commercial power supply. Alternatively, the electric refrigerator-freezer 8300 can use electric power stored in the power storage device 8304. Thus, the electric refrigerator-freezer 8300 can be operated with the use of the power storage device 8304 of one embodiment of the present invention as an uninterruptible power supply even when electric power cannot be supplied from a commercial power supply due to power failure or the like.

Note that among the electronic devices described above, a high-frequency heating apparatus such as a microwave oven and an electronic device such as an electric rice cooker require high power in a short time. The tripping of a breaker of a commercial power supply in use of an electronic device can be prevented by using the power storage device of one embodiment of the present invention as an auxiliary power supply for supplying electric power which cannot be supplied enough by a commercial power supply.

In addition, in a time period when electronic devices are not used, particularly when the proportion of the amount of electric power which is actually used to the total amount of electric power which can be supplied from a commercial power supply source (such a proportion referred to as a usage rate of electric power) is low, electric power can be stored in the power storage device, whereby the usage rate of electric power can be reduced in a time period when the electronic devices are used. For example, in the case of the electric refrigerator-freezer 8300, electric power can be stored in the power storage device 8304 in night time when the temperature is low and the door for a refrigerator 8302 and the door for a freezer 8303 are not often opened or closed. On the other hand, in daytime when the temperature is high and the door for a refrigerator 8302 and the door for a freezer 8303 are frequently opened and closed, the power storage device 8304 is used as an auxiliary power supply; thus, the usage rate of electric power in daytime can be reduced.

This embodiment can be implemented in combination with any of the other embodiments as appropriate.

(Embodiment 6)

In this embodiment, examples of vehicles using power storage devices will be described.

The use of power storage devices in vehicles enables production of next-generation clean energy vehicles such as hybrid electric vehicles (HEVs), electric vehicles (EVs), and plug-in hybrid electric vehicles (PHEVs).

Figure 16A:
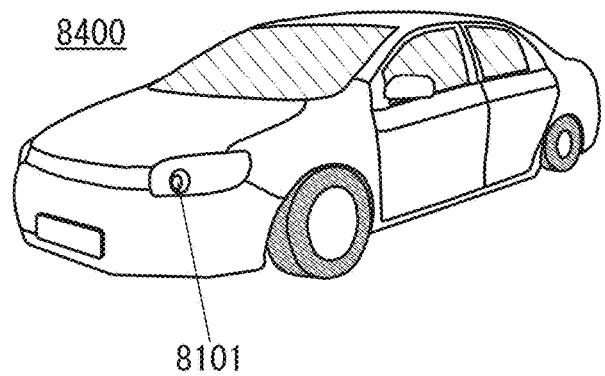
FIGS. 16A and 16B illustrate examples of electronic devices.
Figure 16B:
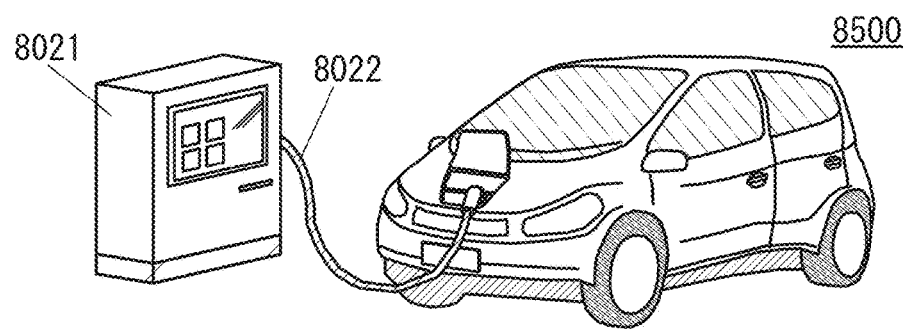

FIGS. 16A and 16B each illustrate an example of a vehicle using one embodiment of the present invention. An automobile 8400 illustrated in FIG. 16A is an electric vehicle that runs on the power of an electric motor. Alternatively, the automobile 8400 is a hybrid electric vehicle capable of driving appropriately using either the electric motor or the engine. One embodiment of the present invention can provide a high-mileage vehicle. The automobile 8400 includes the power storage device. The power storage device is used not only for driving the electric motor, but also for supplying electric power to a light-emitting device such as a headlight 8401 or a room light (not illustrated).

The power storage device can also supply electric power to a display device of a speedometer, a tachometer, or the like included in the automobile 8400. Furthermore, the power storage device can supply electric power to a semiconductor device included in the automobile 8400, such as a navigation system.

FIG. 16B illustrates an automobile 8500 including the power storage device. The automobile 8500 can be charged when the power storage device is supplied with electric power through external charging equipment by a plug-in system, a contactless power feeding system, or the like. In FIG. 16B, a power storage device included in the automobile 8500 is charged with the use of a ground-based charging apparatus 8021 through a cable 8022. In charging, a given method such as CHAdeMO (registered trademark) or Combined Charging System may be employed as a charging method, the standard of a connector, or the like as appropriate. The ground-based charging apparatus 8021 may be a charging station provided in a commerce facility or a power source in a house. For example, with the use of a plug-in technique, the power storage device included in the automobile 8500 can be charged by being supplied with electric power from outside. The charging can be performed by converting AC electric power into DC electric power through a converter such as an AC-DC converter.

Furthermore, although not illustrated, the vehicle may include a power receiving device so that it can be charged by being supplied with electric power from an above-ground power transmitting device in a contactless manner. In the case of the contactless power feeding system, by fitting a power transmitting device in a road or an exterior wall, charging can be performed not only when the electric vehicle is stopped but also when driven. In addition, the contactless power feeding system may be utilized to perform transmission and reception of electric power between vehicles. Furthermore, a solar cell may be provided in the exterior of the automobile to charge the power storage device when the automobile stops or moves. To supply electric power in such a contactless manner, an electromagnetic induction method or a magnetic resonance method can be used.

According to one embodiment of the present invention, the power storage device can have improved cycle characteristics and reliability. Furthermore, according to one embodiment of the present invention, the power storage device itself can be made more compact and lightweight as a result of improved characteristics of the power storage device. The compact and lightweight power storage device contributes to a reduction in the weight of a vehicle, and thus increases the driving distance. Furthermore, the power storage device included in the vehicle can be used as a power source for supplying electric power to products other than the vehicle. In such a case, the use of a commercial power source can be avoided at peak time of electric power demand.

Note that what is described (or part thereof) in one embodiment can be applied to, combined with, or replaced with different contents in the embodiment and/or what is described (or part thereof) in another embodiment or other embodiments.

Note that in each embodiment, what is described in the embodiment is contents described with reference to a variety of diagrams or contents described with text described in this specification.

Note that by combining a diagram (or may be part of the diagram) illustrated in one embodiment with another part of the diagram, a different diagram (or may be part of the different diagram) illustrated in the embodiment, and/or a diagram (or may be part of the diagram) illustrated in another embodiment or other embodiments, much more diagrams can be formed.

Note that contents that are not specified in any drawing or text in the specification can be excluded from one embodiment of the invention. Alternatively, when the range of a value that is defined by the maximum and minimum values is described, part of the range is appropriately narrowed or part of the range is removed, whereby one embodiment of the invention excluding part of the range can be constituted. In this manner, it is possible to specify the technical scope of one embodiment of the present invention so that a conventional technology is excluded, for example.

As a specific example, a diagram of a circuit including first to fifth transistors is illustrated. In that case, it can be specified that the circuit does not include a sixth transistor in the invention. It can be specified that the circuit does not include a capacitor in the invention. It can be specified that the circuit does not include a sixth transistor with a particular connection structure in the invention. It can be specified that the circuit does not include a capacitor with a particular connection structure in the invention. For example, it can be specified that a sixth transistor whose gate is connected to a gate of the third transistor is not included in the invention. For example, it can be specified that a capacitor whose first electrode is connected to the gate of the third transistor is not included in the invention.

As another specific example, the description of a value, "a voltage is preferably higher than or equal to 3 V and lower than or equal to 10 V" is given. In that case, for example, it can be specified that the case where the voltage is higher than or equal to −2 V and lower than or equal to 1 V is excluded from one embodiment of the invention. For example, it can be specified that the case where the voltage is higher than or equal to 13 V is excluded from one embodiment of the invention. Note that, for example, it can be specified that the voltage is higher than or equal to 5 V and lower than or equal to 8 V in the invention. For example, it can be specified that the voltage is approximately 9 V in the invention. For example, it can be specified that the voltage is higher than or equal to 3 V and lower than or equal to 10 V but is not 9 V in the invention. Note that even when the description "a value is preferably in a certain range" or "a value preferably satisfies a certain condition" is given, the value is not limited to the description. In other words, a description of a value that includes a term "preferable", "preferably", or the like does not necessarily limit the value.

As another specific example, the description "a voltage is preferred to be 10 V" is given. In that case, for example, it can be specified that the case where the voltage is higher than or equal to −2 V and lower than or equal to 1 V is excluded from one embodiment of the invention. For example, it can be specified that the case where the voltage is higher than or equal to 13 V is excluded from one embodiment of the invention.

As another specific example, the description "a film is an insulating film" is given to describe a property of a material. In that case, for example, it can be specified that the case where the insulating film is an organic insulating film is excluded from one embodiment of the invention. For example, it can be specified that the case where the insulating film is an inorganic insulating film is excluded from one embodiment of the invention. For example, it can be specified that the case where the insulating film is a conductive film is excluded from one embodiment of the invention. For example, it can be specified that the case where the insulating film is a semiconductor film is excluded from one embodiment of the invention.

As another specific example, the description of a stacked structure, "a film is provided between an A film and a B film" is given. In that case, for example, it can be specified that the case where the film is a layered film of four or more layers is excluded from the invention. For example, it can be specified that the case where a conductive film is provided between the A film and the film is excluded from the invention.

Note that various people can implement one embodiment of the invention described in this specification and the like. However, different people may be involved in the implementation of the embodiment of the invention. For example, in the case of a transmission/reception system, the following case is possible: Company A manufactures and sells transmitting devices, and Company B manufactures and sells receiving devices. As another example, in the case of a light-emitting device including a transistor and a light-emitting element, the following case is possible: Company A manufactures and sells semiconductor devices including transistors, and Company B purchases the semiconductor devices, provides light-emitting elements for the semiconductor devices, and completes light-emitting devices.

In such a case, one embodiment of the invention can be constituted so that a patent infringement can be claimed against each of Company A and Company B. In other words, one embodiment of the invention can be constituted so that only Company A implements the embodiment, and another embodiment of the invention can be constituted so that only Company B implements the embodiment. One embodiment of the invention with which a patent infringement suit can be filed against Company A or Company B is clear and can be regarded as being disclosed in this specification or the like. For example, in the case of a transmission/reception system, even when this specification or the like does not include a description of the case where a transmitting device is used alone or the case where a receiving device is used alone, one embodiment of the invention can be constituted by only the transmitting device and another embodiment of the invention can be constituted by only the receiving device. Those embodiments of the invention are clear and can be regarded as being disclosed in this specification or the like. Another example is as follows: in the case of a light-emitting device including a transistor and a light-emitting element, even when this specification or the like does not include a description of the case where a semiconductor device including the transistor is used alone or the case where a light-emitting device including the light-emitting element is used alone, one embodiment of the invention can be constituted by only the semiconductor device including the transistor and another embodiment of the invention can be constituted by only the light-emitting device including the light-emitting element. Those embodiments of the invention are clear and can be regarded as being disclosed in this specification or the like.

Note that in this specification and the like, it may be possible for those skilled in the art to constitute one embodiment of the invention even when portions to which all the terminals of an active element (e.g., a transistor or a diode), a passive element (e.g., a capacitor or a resistor), and the like are connected are not specified. In other words, one embodiment of the invention is clear even when connection portions are not specified. Further, in the case where a connection portion is disclosed in this specification and the like, it can be determined that one embodiment of the invention in which a connection portion is not specified is disclosed in this specification and the like, in some cases. In particular, in the case where the number of portions to which the terminal is connected may be more than one, it is not necessary to specify the portions to which the terminal is connected. Therefore, it may be possible to constitute one embodiment of the invention by specifying only portions to which some of terminals of an active element (e.g., a transistor or a diode), a passive element (e.g., a capacitor or a resistor), and the like are connected.

Note that in this specification and the like, it may be possible for those skilled in the art to specify the invention when at least the connection portion of a circuit is specified. Alternatively, it may be possible for those skilled in the art to specify the invention when at least a function of a circuit is specified. In other words, when a function of a circuit is specified, one embodiment of the present invention is clear. Moreover, it can be determined that one embodiment of the present invention whose function is specified is disclosed in this specification and the like. Therefore, when a connection portion of a circuit is specified, the circuit is disclosed as one embodiment of the invention even when a function is not specified, and one embodiment of the invention can be constituted. Alternatively, when a function of a circuit is specified, the circuit is disclosed as one embodiment of the invention even when a connection portion is not specified, and one embodiment of the invention can be constituted.

Note that in this specification and the like, part of a diagram or text described in one embodiment can be taken out to constitute one embodiment of the invention. Thus, in the case where a diagram or text related to a certain portion is described, the contents taken out from part of the diagram or the text are also disclosed as one embodiment of the invention, and one embodiment of the invention can be constituted. The embodiment of the present invention is clear. Therefore, for example, in a diagram or text in which one or more active elements (e.g., transistors or diodes), wirings, passive elements (e.g., capacitors or resistors), conductive layers, insulating layers, semiconductor layers, organic materials, inorganic materials, components, devices, operating methods, manufacturing methods, or the like are described, part of the diagram or the text is taken out, and one embodiment of the invention can be constituted. For example, from a circuit diagram in which N circuit elements (e.g., transistors or capacitors; N is an integer) are provided, it is possible to take out M circuit elements (e.g., transistors or capacitors; M is an integer, where M<N) and constitute one embodiment of the invention. For another example, it is possible to take out M layers (M is an integer, where M<N) from a cross-sectional view in which N layers (N is an integer) are provided and constitute one embodiment of the invention. For another example, it is possible to take out M elements (M is an integer, where M<N) from a flow chart in which N elements (N is an integer) are provided and constitute one embodiment of the invention. For another example, it is possible to take out some given elements from a sentence "A includes B, C, D, E, or F" and constitute one embodiment of the invention, for example, "A includes B and E", "A includes E and F", "A includes C, E, and F", or "A includes B, C, D, and E".

Note that in the case where at least one specific example is described in a diagram or text described in one embodiment in this specification and the like, it will be readily appreciated by those skilled in the art that a broader concept of the specific example can be derived. Therefore, in the diagram or the text described in one embodiment, in the case where at least one specific example is described, a broader concept of the specific example is disclosed as one embodiment of the invention, and one embodiment of the invention can be constituted. The embodiment of the present invention is clear.

Note that in this specification and the like, what is illustrated in at least a diagram (which may be part of the diagram) is disclosed as one embodiment of the invention, and one embodiment of the invention can be constituted. Therefore, when certain contents are described in a diagram, the contents are disclosed as one embodiment of the invention even when the contents are not described with text, and one embodiment of the invention can be constituted. In a similar manner, part of a diagram, which is taken out from the diagram, is disclosed as one embodiment of the invention, and one embodiment of the invention can be constituted. The embodiment of the present invention is clear.

This embodiment can be implemented in combination with any of the other embodiments as appropriate.

EXAMPLE 1

One embodiment of the present invention will be specifically described below with examples. Note that one embodiment of the present invention is not limited to the following examples.

First, a method for fabricating an electrode used in this example will be described.
(Electrode A)

Electrode A was fabricated using active material particles with films thereon. First, artificial graphite (MCMB) as the active material, ethyl silicate 40 as a film-forming material, a 97% ethanol aqueous solution, and hydrochloric acid were used to prepare a dispersion liquid. As described in Embodiment 2, the amount of ethyl silicate 40 was determined in a stage of preparing the dispersion liquid such that the proportion of silicon oxide to graphite in the dispersion liquid was 1 wt %. The dispersion liquid poured into a spray dryer was sprayed and dried in a moment in a spray cylinder in a nitrogen atmosphere in which the temperature was 100° C., so that powder was obtained.

The powder was steamed at 70° C. using a bell jar. Through this step, an organosilicon compound deposited on the surfaces of graphite particles reacted with moisture, so that hydrolysis reaction occurred, and the hydrolyzed organosilicon compound was condensed by dehydration reaction following the hydrolysis reaction. In this manner, a film containing silicon oxide as its main component was formed on each of the surfaces of the graphite particles, whereby graphite with the film containing silicon oxide as its main component was obtained.

Next, VGCF as a conductive additive and CMC and SBR as binders were used to form slurry in which the weight ratio of graphite with the film containing silicon oxide to VGCF, CMC, and SBR was 96:1:1:2. As a solvent of the slurry, pure water was used.

In forming the slurry, graphite with the film containing silicon oxide, VGCF, and a small amount of pure water were mixed first, an aqueous solution where CMC-Na was uniformly dissolved in pure water was added to the mixture, and then mixing was performed. The mixing was performed with a planetary mixer.

Then, an SBR dispersion liquid was added to the mixture, and mixing was performed with a mixer.

Pure water was then added to the mixture until a predetermined viscosity was obtained, and mixing was performed with a mixer for 5 minutes twice.

Subsequently, the slurry was applied to a current collector with the use of a blade and then dried. For the drying, the surface of the slurry was dried at 30° C. in an air atmosphere and then the temperature was raised to 50° C., and the surface of the slurry was further dried at 100° C. in a reduced pressure atmosphere for ten hours. As the current collector, 18-μm-thick rolled copper foil was used.

Through the above steps, Electrode A was fabricated.
(Electrode B)

The weight proportion of silicon oxide to graphite in Electrode B is different from that in Electrode A. In the case of Electrode B, the amount of ethyl silicate 40 was determined in a stage of preparing a dispersion liquid such that the proportion of silicon oxide to graphite in the dispersion liquid was 2 wt %. The structure and a fabricating method of Electrode B are the same as those of Electrode A except for the proportion of silicon oxide; thus, the description thereof is omitted here.
(Comparative Electrode C)

Electrode A and Electrode B are each an electrode formed using active material particles with films each containing silicon oxide as its main component, whereas Comparative Electrode C is an electrode formed using active material particles without a film containing silicon oxide as its main component. In the case of Comparative Electrode C, artificial graphite MCMB as an active material, VGCF as a conductive additive, and CMC and SBR as binders were used to form slurry in which the weight ratio of graphite to VGCF, CMC, and SBR was 96:1:1:2. As a solvent of the slurry, water was used.

Graphite, VGCF, and a small amount of pure water were mixed first, an aqueous solution where CMC-Na was uniformly dissolved in pure water was added to the mixture, and then mixing was performed. The mixing was performed with a planetary mixer.

Then, an SBR aqueous solution was added to the mixture, and mixing was performed with a mixer.

Then, pure water was then added to the mixture until a predetermined viscosity was obtained, and mixing was performed with a mixer for 5 minutes twice.

Subsequently, the slurry was applied to a current collector with the use of a blade and then dried. For the drying, the surface of the slurry was dried at 30° C. in an air atmosphere and then the temperature was raised to 50° C., and the surface of the slurry was further dried at 100° C. in a reduced pressure atmosphere for ten hours. As the current collector, 18-μm-thick rolled copper foil was used.

Through the above steps, Comparative Electrode C was fabricated.
(TEM Observation and EDX Analysis)

FIG. 17 shows an observation image of graphite with a film containing silicon oxide. The cross section was observed with a high-resolution transmission electron microscope (TEM) ("H9000-NAR" manufactured by Hitachi, Ltd.) at an acceleration voltage of 200 kV. Graphite powder after the step using the spray dryer that was used to fabricate Electrode A was sliced using a focused ion beam system (FIB) and then observed at a magnification of 2,050,000 times. It was observed that a film 1402 was formed thin and uniformly on the surface of graphite 1401. Furthermore, the thickness thereof is estimated to be approximately 5 nm or less. Note that a reference numeral 1403 denotes a protective film formed for the purpose of observing the cross section.

Table 1 shows results obtained by energy dispersive X-ray spectroscopy (EDX) on a sample formed by slicing graphite powder after the step using the spray dryer with the use of FIB. Each numerical value in Table 1 is represented by mass %. Silicon and oxygen were detected in most regions of nine analysis points. In addition, EDX was performed on a similar sample by line scanning, and silicon and oxygen were detected. This result implies that the film 1402 in contact with the graphite 1401 contained silicon oxide as its component. The result also suggests that the spray dryer allowed formation of a film covering at least part of the surface of graphite.

TABLE 1

|    | 1     | 2     | 3     | 4     | 5     | 6     | 7     | 8     | 9     |
|----|-------|-------|-------|-------|-------|-------|-------|-------|-------|
| C  | 96.39 | 95.10 | 99.48 | 92.66 | 96.58 | 99.68 | 98.91 | 97.34 | 96.60 |
| Si | 1.57  | 2.57  | —     | 5.27  | 1.39  | —     | 0.48  | 1.33  | 1.45  |
| O  | 2.04  | 2.33  | 0.52  | 2.07  | 2.03  | 0.32  | 0.61  | 1.33  | 1.96  |

(Measurement of Cycle Performance)

Next, a full cell including Electrode A as a negative electrode, an electrolytic solution, a separator, and a positive electrode was fabricated and charged and discharged once, whereby Lithium-ion Secondary Battery A was fabricated. A cycle test was performed on the Lithium-ion Secondary Battery A. In a similar manner, full cells including Electrode B/Comparative Electrode C as a negative electrode, an electrolytic solution, a separator, and a positive electrode were fabricated and charged and discharged once, whereby Lithium-ion Secondary Battery B and Lithium-ion Secondary Battery C were fabricated. Cycle tests were performed on Lithium-ion Secondary Battery B and Lithium-ion Secondary Battery C.

The cells used for the cycle tests were laminated cells. For each positive electrode, LiFePO$_4$ as an active material, graphene oxide as a conductive additive, PVDF as a binder were used to form slurry in which the weight ratio of graphite to graphene oxide and PVDF was 94.2:0.8:5. As a solvent of the slurry, NMP was used.

Note that LiFePO$_4$ coated with carbon in a stage of solid phase synthesis of LiFePO$_4$ with the use of a raw material to which glucose was added was used as LiFePO$_4$. First, NMP was added as a solvent to carbon-coated LiFePO$_4$ to which graphene oxide was added and the mixture was kneaded. After an NMP solution in which PVDF was dissolved was added to the mixture, NMP was further added and mixing was performed to form slurry. The slurry was applied to a current collector and dried at 90° C. in an air atmosphere for 4 minutes, so that a positive electrode where a positive electrode active material layer was formed over the current collector was fabricated.

An electrolytic solution was formed in such a manner that lithium hexafluorophosphate (LiPF$_6$) was dissolved at a concentration of 1 mol/L in a solution in which ethylene carbonate (EC) and ethyl methyl carbonate (EMC) were mixed at a weight ratio of 3:7 and a small amount (1 wt %) of vinylene carbonate (VC) was added to the mixed solution. As the separator, polypropylene (PP) was used.

Here, a charge rate and a discharge rate will be described. For example, in the case of charging a secondary battery with a certain capacity X [Ah] at a constant current, a charge rate of 1 C means the current value I [A] with which charging is terminated in exactly 1 h, and a charge rate of 0.2 C means I/5 [A] (i.e., the current value with which charging is terminated in exactly 5 h). Similarly, a discharge rate of 1 C means the current value I [A] with which discharging is ended in exactly 1 h, and a discharge rate of 0.2 C means I/5 [A] (i.e., the current value with which discharging is ended in exactly 5 h).

In this example, charge and discharge in the first cycle were performed at a constant current of 0.2 C (charging is terminated in 5 hours), and charge and discharge in the second and the subsequent cycles were performed at a constant current of 0.5 C (charging is terminated in 2 hours) for the cycle tests. In all the cycles, the voltage range was from 2 V to 4 V, and the ambient temperature was 60° C.

Figure 18:
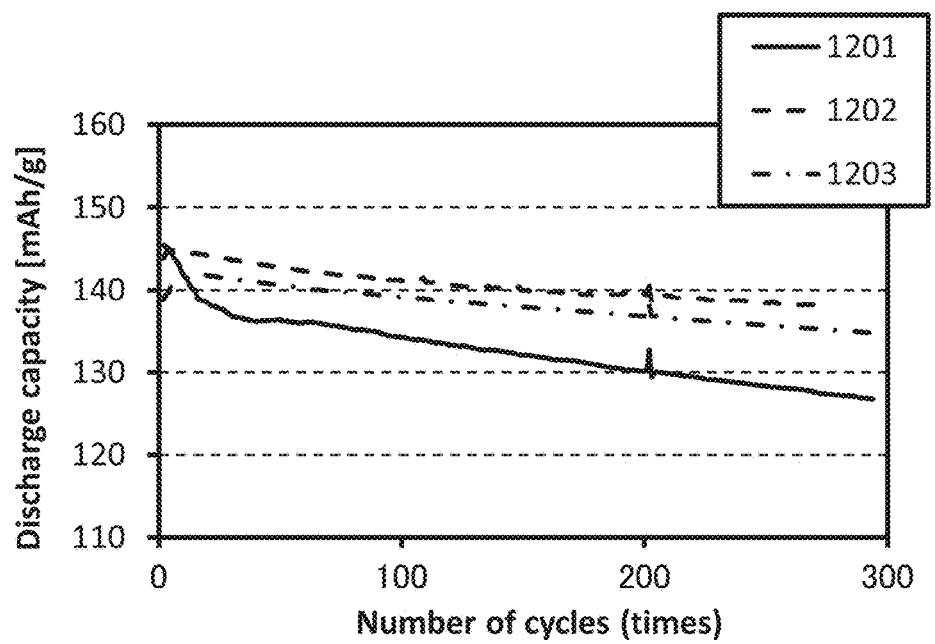
FIG. 18 shows cycle performance.

FIG. 18 shows measurement results of the cycle tests. The horizontal axis represents the number of cycles (times) and the vertical axis represents discharge capacity (mAh/g) of the secondary batteries. In FIG. 18, a curve 1202 shows the cycle performance of Lithium-ion Secondary Battery A; a curve 1203 shows the cycle performance of Lithium-ion Secondary Battery B; and a curve 1201 shows the cycle performance of Lithium-ion Secondary Battery C.

As a result of the measurement, it is found that the discharge capacity of Lithium-ion Secondary Battery C including a negative electrode active material layer containing graphite without a film containing silicon oxide decreases as the number of cycles increases, as indicated by the curve 1201.

In contrast, the discharge capacities of Lithium-ion Secondary Batteries A and B each including a negative electrode active material layer containing graphite with a film containing silicon oxide decrease as indicated by the curves 1202 and 1203; however, the decreases in the capacities are not as significant as the decrease in the capacity of Lithium-ion Secondary Battery C. This implies that the deterioration in charge and discharge cycles of Lithium-ion Secondary Batteries A and B due to the decomposition of the electrolytic solution, etc. was sufficiently inhibited.

The results shown in FIG. 18 suggest that in Lithium-ion Secondary Batteries A and B, the electrochemical decomposition of the electrolytic solution, etc. around the electrode was able to be minimized because the surface of graphite contained in the negative electrode active material layer includes a region in contact with a film containing silicon oxide as its main component. The results also suggest that formation of other passivating films by repeated cycles of charge and discharge was inhibited in Lithium-ion Secondary Batteries A and B and thus the cycle performance thereof was improved.

(Evaluation)

According to the above, the use of the electrode of one embodiment of the present invention in a lithium-ion secondary battery allows minimization of the decomposition reaction of the electrolytic solution, etc. as a side reaction of charge and discharge by repeated charge and discharge cycles of the lithium-ion secondary battery, resulting in an improvement in the cycle performance of the lithium-ion secondary battery.

EXAMPLE 2

One embodiment of the present invention will be specifically described below with examples. Note that one embodiment of the present invention is not limited to the following examples.

In this example, the case will be described in which the number of times of forming a film on the surfaces of active material particles and the proportion of a film-forming material to the active material were changed.

Specifically, an active material (Active Material D) obtained by performing film formation twice and an active material (Active Material E) obtained by performing film formation once with the use of a film-forming material whose proportion to an active material was higher than that in the case of Active Material D were compared.

(Active Material D)

Active Material D was obtained by performing film formation twice. First, artificial graphite MCMB as the active material, ethyl silicate 40 as a film-forming material, a 97% ethanol aqueous solution, and hydrochloric acid were used to prepare a dispersion liquid. The amount of ethyl silicate 40 was determined in a stage of preparing the dispersion liquid as described in Embodiment 2 such that the proportion of silicon oxide to graphite was 1 wt %. The dispersion liquid poured into a spray dryer was sprayed and dried in a moment in a spray cylinder in a nitrogen atmosphere in which the temperature was 100° C., so that powder was obtained.

The powder was steamed at 70° C. using a bell jar. Through this step, an organosilicon compound deposited on the surfaces of graphite particles reacted with moisture, so that hydrolysis reaction occurred, and the hydrolyzed organosilicon compound was condensed by dehydration reaction following the hydrolysis reaction. In this manner, a film containing silicon oxide as its main component was formed on the surface of each of the graphite particles, whereby graphite with the film containing silicon oxide was obtained.

Then, graphite with the film containing silicon oxide, ethyl silicate 40, a 97% ethanol aqueous solution, and hydrochloric acid were used to prepare a dispersion liquid again. The dispersion liquid poured into a spray dryer was sprayed and dried in a moment in a spray cylinder in a nitrogen atmosphere in which the temperature was 100° C., so that powder was obtained.

Note that the amount of ethyl silicate 40 for the second film formation was determined in the stage of preparing a dispersion liquid such that the weight proportion of silicon oxide to graphite with the film containing silicon oxide was 1 wt %.

Then, the powder was steamed at 70° C. using a bell jar. Through this step, an organosilicon compound reacted with moisture, so that hydrolysis reaction occurred, and the hydrolyzed organosilicon compound was condensed by dehydration reaction following the hydrolysis reaction. In this manner, a film containing silicon oxide as its main component was formed on the surface of each of the graphite particles, whereby graphite with the film containing silicon oxide was obtained.

[ToF-SIMS Analysis]

Time-of-flight secondary ion mass spectrometry (ToF-SIMS) was performed on Active Material D to examine the state of the film on the surface of graphite. For the analysis, TOF-SIMS300 manufactured by ION-TOF GmbH was used and Bi was used as a primary ion source.

Figure 19A:
FIGS. 19A to 19C show analysis results by ToF-SIMS.
Figure 19B:
Figure 19C:
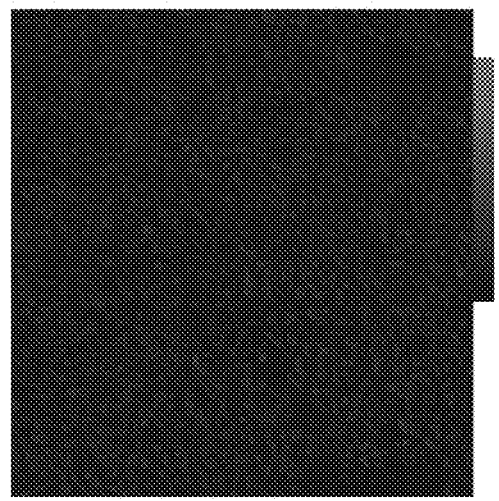

FIGS. 19A to 19C show ToF-SIMS analysis results. Specifically, FIG. 19B shows the result of C ion mapping measurement; FIG. 19C shows the result of $Si_2O_5H$ ion mapping measurement; and FIG. 19A shows both the measurement results that overlap with each other. Note that the size of an observation area was 500 μm×500 μm, and $Si_2O_5H$ ions were attributed to silicon oxide. Each image data shows that ions were more intensely detected in a portion with higher luminance.

It is found from FIGS. 19A to 19C that a film containing silicon oxide as its main component was formed on the surface of graphite. Furthermore, the concentration distribution of $Si_2O_5H$ ions in the image data shows that the surface of graphite also includes a region not covered with the film containing silicon oxide as its main component.

(TEM Observation)

Figure 20A:
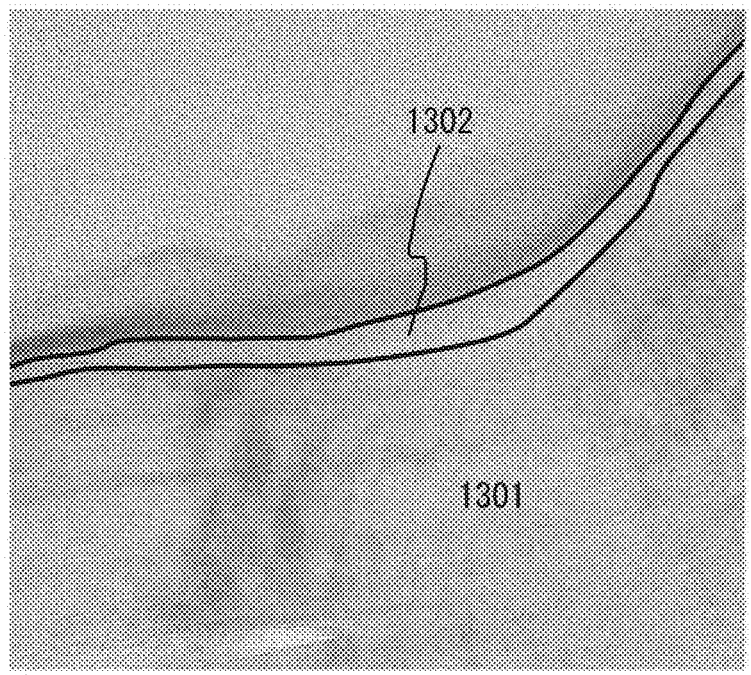
FIGS. 20A and 20B show TEM images.

FIG. 20A shows an observation image of Active Material D. Active Material D was sliced using FIB and then the cross section thereof was observed at a magnification of 2,050,000 times with a high-resolution TEM ("H9000-NAR" manufactured by Hitachi, Ltd.) at an acceleration voltage of 200 kV. It was observed that a film 1302 was formed on the surface of graphite 1301. Furthermore, the thickness of a thick portion of the film 1302 was approximately 5 nm to 6 nm.

(Active Material E)

Next, Active Material E will be described. Active Material E was obtained by performing film formation once with the use of a film-forming material whose proportion to an active material was higher than that in the case of Active Material D. First, artificial graphite MCMB as the active material, ethyl silicate 40 as a film-forming material, a 97% ethanol aqueous solution, and hydrochloric acid were used to prepare a dispersion liquid. The amount of ethyl silicate 40 was determined in a stage of preparing the dispersion liquid as described in Embodiment 2 such that the proportion of silicon oxide to graphite in the dispersion liquid was 2 wt %. The dispersion liquid poured into a spray dryer was sprayed and dried in a moment in a spray cylinder in a nitrogen atmosphere in which the temperature was 100° C., so that powder was obtained.

The powder was steamed at 70° C. using a bell jar. Through this step, an organosilicon compound deposited on the surfaces of graphite particles reacted with moisture, so that hydrolysis reaction occurred, and the hydrolyzed organosilicon compound was condensed by dehydration reaction following the hydrolysis reaction. In this manner, a film containing silicon oxide as its main component was formed on the surface of each of the graphite particles, whereby graphite with the film containing silicon oxide as its main component was obtained.

(TEM Observation)

Figure 20B:
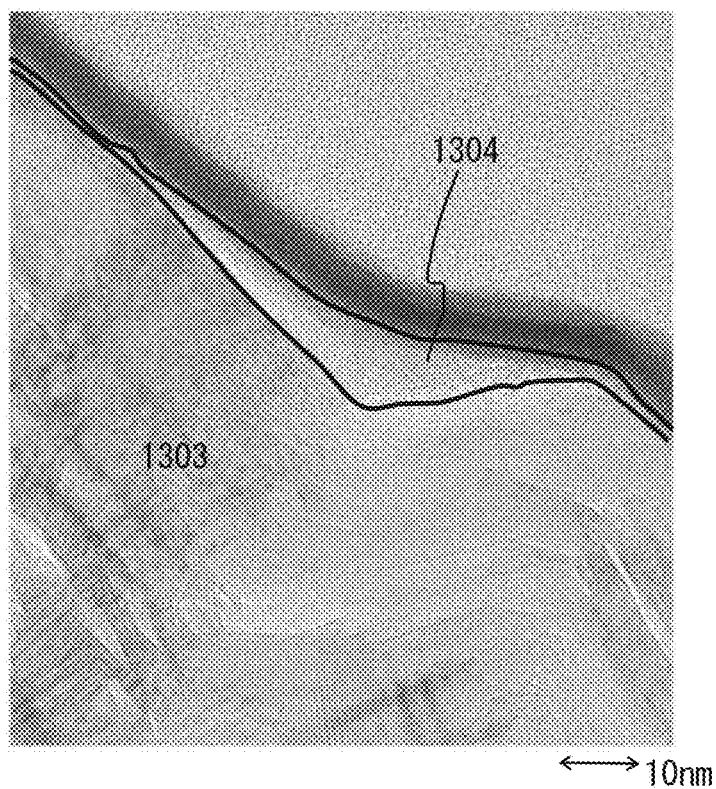

FIG. 20B shows an observation image of Active Material E. The cross section of Active Material E was observed as in the case of Active Material D. It was observed that a film 1304 was formed on the surface of graphite 1303.

The result of comparison between Active Material D in FIG. 20A and Active Material E in FIG. 20B shows that the film thickness varies more greatly in Active Material E than in Active Material D, and the film thickness in Active Material D is more even than that in Active Material E.

Next, Electrode D was fabricated using Active Material D, and Electrode E was fabricated using Active Material E.

(Electrode D)

Active Material D, VGCF as a conductive additive, and CMC and SBR as binders were used to form slurry in which the weight ratio of Active Material D to VGCF, CMC, and SBR was 96:1:1:2. As a solvent of the slurry, pure water was used.

In forming the slurry, Active Material D, VGCF, and a small amount of pure water were mixed first, an aqueous solution where CMC-Na was uniformly dissolved in pure water was added to the mixture, and then mixing was performed. The mixing was performed with a planetary mixer.

Then, an SBR dispersion liquid was added to the mixture, and mixing was performed with a mixer.

Pure water was then added to the mixture until a predetermined viscosity was obtained, and mixing was performed with a mixer for 5 minutes twice.

Subsequently, the slurry was applied to a current collector with the use of a blade and then dried. For the drying, the surface of the slurry was dried at 30° C. in an air atmosphere and then the temperature was raised to 50° C., and the surface of the slurry was further dried at 100° C. in a reduced pressure atmosphere for ten hours. As the current collector, 18-μm-thick rolled copper foil was used.

Through the above steps, Electrode D was fabricated.

(Electrode E)

The structure and a fabricating method of Electrode E are the same as those of Electrode D except that Active Material E was used; thus, the description thereof is omitted here.

(Measurement of Cycle Performance)

A full cell including Electrode D as a negative electrode, an electrolytic solution, a separator, and a positive electrode was fabricated and charged and discharged once, whereby Lithium-ion Secondary Battery D was fabricated. A cycle test was performed on Lithium-ion Secondary Battery D. In a similar manner, a full cell including Electrode E as a negative electrode, an electrolytic solution, a separator, and a positive electrode were fabricated and charged and discharged once, whereby Lithium-ion Secondary Battery E was fabricated. A cycle test was performed on Lithium-ion Secondary Battery E.

(Lithium-Ion Secondary Battery D)

The cells used for the cycle tests were laminated cells. For each positive electrode, $LiFePO_4$ as an active material, graphene oxide as a conductive additive, PVDF as a binder were used to form slurry in which the weight ratio of $LiFePO_4$ to graphene oxide and PVDF was 94.2:0.8:5. As a solvent of the slurry, NMP was used.

$LiFePO_4$ coated with carbon in a stage of solid phase synthesis of $LiFePO_4$ with the use of a raw material to which glucose was added was used as $LiFePO_4$. First, NMP was added as a solvent to carbon-coated $LiFePO_4$ to which graphene oxide was added and the mixture was kneaded. After an NMP solution in which PVDF was dissolved was added to the mixture, NMP was further added and mixing was performed to form slurry. The slurry was applied to a current collector and dried at 90° C. in an air atmosphere for 4 minutes and then graphene oxide was reduced, so that a positive electrode was fabricated.

An electrolytic solution was formed in such a manner that lithium bis(trifluoromethanesulfonyl)amide (LiTFSA) was dissolved at a concentration of 0.65 mol/Kg in a solution in which ethylene carbonate (EC) and diethyl carbonate (DEC) were mixed at a weight ratio of 1:1 and a small amount (2 wt %) of lithium hexafluorophosphate ($LiPF_6$) and a small amount (1 wt %) of vinylene carbonate (VC) were added to the mixed solution as additives. As the separator, polypropylene (PP) was used.

In this example, charge and discharge in the first cycle were performed at a constant current of 0.2 C (charging is terminated in 5 hours), and charge and discharge in the second and the subsequent cycles were performed at a constant current of 0.5 C (charging is terminated in 2 hours) for the cycle tests. In all the cycles, the voltage range was from 2 V to 4 V, and the ambient temperature was 60° C.

Figure 21:
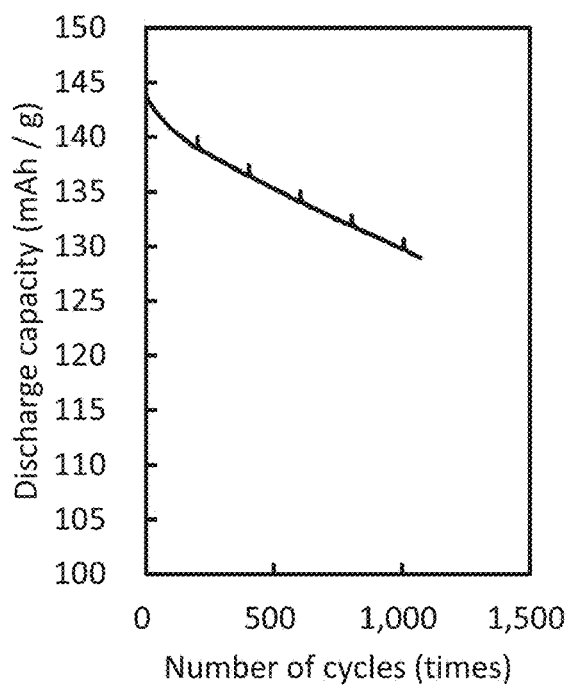
FIG. 21 shows cycle performance.

FIG. 21 shows a measurement result of the cycle test. The horizontal axis represents the number of cycles (times) and the vertical axis represents discharge capacity (mAh/g) of the secondary battery. Although the discharge capacity decreases, the decrease in the capacity is not significant. This implies that the deterioration in charge and discharge cycles due to the decomposition of the electrolytic solution, etc. was sufficiently inhibited.

(Lithium-Ion Secondary Battery E)

A laminated cell used for a cycle test except for an electrolytic solution was fabricated under the same condition as Lithium-ion Secondary battery D; thus, the description thereof is omitted. An electrolytic solution for the Lithium-ion Secondary Battery E was formed in such a manner that lithium hexafluorophosphate ($LiPF_6$) was dissolved at a concentration of 1 M in a solution in which ethylene carbonate (EC) and ethyl methyl carbonate (EMC) were mixed at a weight ratio of 3:7 and vinylene carbonate (VC) was added to the mixed solution. As the separator, polypropylene (PP) was used.

Figure 22:
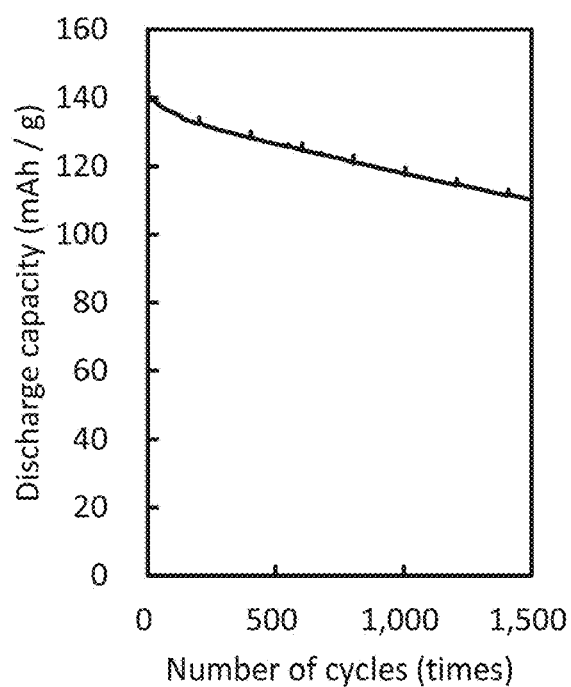
FIG. 22 shows cycle performance.

FIG. 22 shows a measurement result of the cycle test. Although the discharge capacity decreases, the decrease in the capacity is not significant. This implies that the deterioration in charge and discharge cycles due to the decomposition of the electrolytic solution, etc. was sufficiently inhibited.

(Evaluation)

According to the above, the use of the electrode of one embodiment of the present invention in a lithium-ion secondary battery allows minimization of the decomposition reaction of the electrolytic solution, etc. as a side reaction of charge and discharge by repeated charge and discharge cycles of the lithium-ion secondary battery, resulting in an improvement in the cycle performance of the lithium-ion secondary battery.

EXAMPLE 3

One embodiment of the present invention will be specifically described below with examples. Note that one embodiment of the present invention is not limited to the following examples.

In this example, the result of comparison between electrodes fabricated by employing different methods as film forming methods will be described.

Specifically, an electrode (Electrode F) fabricated using a dip coating method as a film forming method and an electrode (Electrode G) fabricated using a coating method using a spray dryer as a film forming method were compared.

(Electrode F)

Electrode F was fabricated using a dip coating method as a method for forming a film over the surface of active materials. First, graphite (G10) as an active material, VGCF as a conductive additive, CMC and SBR as binders, and water as a solvent were mixed to form slurry such that the weight ratio of graphite to VGCF, CMC, and SBR was 96:1:1:2.

Then, the slurry was applied to one surface of a current collector and dried, so that an active material layer was formed.

In forming a film on the surface of the active material, first, ethyl silicate 40 (ethyl silicate as Pentamer), which is an organosilicon compound, as a film-forming material, ethanol as a solvent, and hydrochloric acid as a catalyst were mixed to prepare a treatment liquid. The amount of ethyl silicate 40 was determined such that the proportion of ethyl silicate 40 to the treatment liquid was 1 wt %.

Then, the active material layer formed over the current collector was soaked in the treatment liquid at room temperature for 1 minute and taken out of the treatment liquid, and the solvent in the treatment liquid attached to the active material layer was evaporated. After that, the active material layer was subjected to heat treatment at 70° C. in a water vapor atmosphere. Through this step, an organosilicon compound deposited on the surface of graphite reacted with moisture, so that hydrolysis reaction occurred, and the hydrolyzed organosilicon compound was condensed by dehydration reaction following the hydrolysis reaction. In this manner, a film containing silicon oxide as its main component was formed over the surface of the graphite.

In the active material layer of Electrode F, active material particles are bound with the binders. The active material layer in this state was soaked in the treatment liquid containing an organosilicon compound, whereby the treatment liquid permeated the whole active material layer while the active material particles remained bound with the binders. After that, heat treatment was performed in a water vapor atmosphere so that hydrolysis reaction and condensation reaction of the organosilicon compound occurred, whereby films each containing silicon oxide as a main component were able to be formed over the surfaces of the active material particles.

(Electrode G)

Electrode G includes active material particles with films each containing silicon oxide that is formed using a spray dryer. The description in (Active Material D) and (Electrode D) in Example 2 can be referred to for Electrode F except for the condition that graphite (G10) was used as the active material; thus, the description thereof is omitted here.

(Measurement of Cycle Performance)

A full cell including Electrode F as a negative electrode, an electrolytic solution, a separator, and a positive electrode was fabricated and charged and discharged once, whereby Lithium-ion Secondary Battery F was fabricated. A cycle test was performed on Lithium-ion Secondary Battery F. In a similar manner, a full cell including Electrode G as a negative electrode, an electrolytic solution, a separator, and a positive electrode were fabricated and charged and discharged once, whereby Lithium-ion Secondary Battery G was fabricated. A cycle test was performed on Lithium-ion Secondary Battery G.

(Lithium-Ion Secondary Battery F)

The cell used for the cycle test was a laminated cell. For a positive electrode, $LiFePO_4$ as an active material, graphene oxide as a conductive additive, PVDF as a binder were used to form a slurry in which the weight ratio of $LiFePO_4$ to graphene oxide and PVDF was 94.2:0.8:5. As a solvent of the slurry, NMP was used.

$LiFePO_4$ coated with carbon in a stage of solid phase synthesis of $LiFePO_4$ with the use of a raw material to which glucose was added was used as $LiFePO_4$. First, NMP was added as a solvent to carbon-coated $LiFePO_4$ to which graphene oxide was added and the mixture was kneaded. After an NMP solution in which PVDF was dissolved was added to the mixture, NMP was further added and mixing was performed to form a paste. The slurry was applied to a current collector and dried at 65° C. in an air atmosphere for 15 minutes and then dried at 75° C. in the air atmosphere for 15 minutes. Graphene oxide included in the obtained electrode was reduced, so that the positive electrode was fabricated.

An electrolytic solution was formed in such a manner that lithium bis(trifluoromethanesulfonyl)amide (LiTFSA) was dissolved at a concentration of 1 M in a solution in which ethylene carbonate (EC) and diethyl carbonate (DEC) were mixed at a weight ratio of 1:1 and a small amount (2 wt %) of lithium hexafluorophosphate ($LiPF_6$) and a small amount (1 wt %) of vinylene carbonate (VC) were added to the mixed solution as additives. As the separator, polypropylene (PP) was used.

(Lithium-Ion Secondary Battery G)

A laminated cell used for a cycle test was fabricated under the same condition as Lithium-ion Secondary battery F; thus, the description thereof is omitted. An electrolytic solution for the Lithium-ion Secondary Battery G was formed in such a manner that lithium bis(trifluoromethanesulfonyl)amide (LiTFSA) was dissolved at a concentration of 0.65 mol/Kg in a solution in which ethylene carbonate (EC) and diethyl carbonate (DEC) were mixed at a weight ratio of 1:1 and a small amount (2 wt %) of lithium hexafluorophosphate ($LiPF_6$) and a small amount (1 wt %) of vinylene carbonate (VC) were added to the mixed solution as additives.

In this example, charge and discharge in the first cycle were performed at a constant current of 0.2 C (charging is terminated in 5 hours), and charge and discharge in the second and the subsequent cycles were performed at a constant current of 0.5 C (charging is terminated in 2 hours) for the cycle tests. In all the cycles, the voltage range was from 2 V to 4 V, and the ambient temperature was 60° C.

Figure 23:
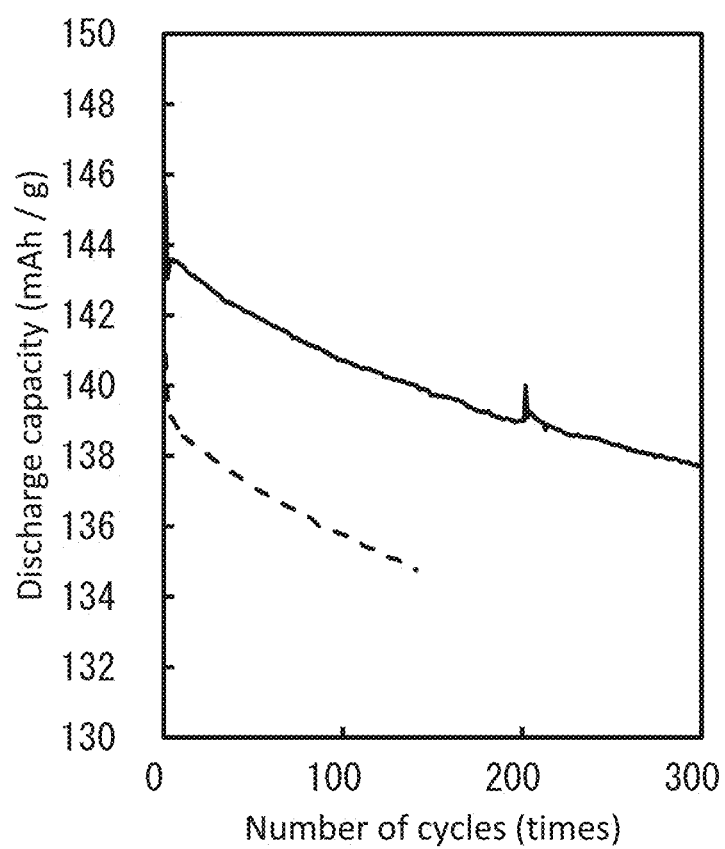
FIG. 23 shows cycle performance.

FIG. 23 shows measurement results of the cycle tests. The horizontal axis represents the number of cycles (times) and the vertical axis represents discharge capacity (mAh/g) of the secondary batteries. A dashed line shows the cycle performance of Lithium-ion Secondary Battery F, and a solid line shows the cycle performance of Lithium-ion Secondary Battery G.

The result of comparison between the two batteries shows that the deterioration of Lithium-ion Secondary Battery G, which was fabricated using a spray dryer as a film forming method, due to the decomposition of the electrolytic solution, etc. in charge and discharge cycles was sufficiently inhibited.

For Electrode G used in Lithium-ion Secondary Battery G, the description of (Active Material D) and (Electrode D) in Example 2 can be referred to; thus, the observation image in FIG. 20A can be referred to as the observation image of the active material used for Electrode G. As shown in FIG. 20A, the film 1302 containing silicon oxide as its main component was directly formed thin and uniformly on the surface of the graphite 1301; accordingly, it is suggested that the electrochemical decomposition of the electrolytic solution, etc. in Electrode G was able to be minimized even if the surface of graphite included a region not covered with the film containing silicon oxide as its main component. This led to inhibition of formation of other passivating films by repeated charge and discharge cycles, improving the cycle performance of Lithium-ion Secondary Battery G.

In contrast, in the case of the active material layer of Electrode F used in Lithium-ion Secondary Battery F, film formation was performed while the active material particles remained bound with the binder; thus, the film containing silicon oxide as its main component was formed over the active material particles with the binder therebetween. However, when the electrolytic solution is in contact with the surface of the active material particle which is not covered with the film containing silicon oxide as its main component, the electrolytic solution presumably spreads throughout the surface of the active material particles even if the active material was covered with the binder, and finally causes the electrochemical decomposition of the electrolytic solution on almost all of the surfaces of the active material particles.

The electrochemical decomposition of the electrolytic solution occurs due to contact between the active material particles and the electrolytic solution. This implies that formation of passivating films by repeated charge and discharge cycles was inhibited more considerably in Lithium-ion Secondary Battery G where the film containing silicon oxide as its main component was formed directly on the surface of the active material particle than in Lithium-ion Secondary Battery F where the film was formed over the surface of the active material particle with the binder therebetween, and thus, Lithium-ion Secondary Battery G has better cycle performance than Lithium-ion Secondary Battery F.

(Evaluation)

According to the above results, the use of the electrode of one embodiment of the present invention in the lithium-ion secondary battery enabled minimization of the decomposition reaction of the electrolytic solution, etc. as a side reaction of charge and discharge by repeated charge and discharge cycles of the lithium-ion secondary battery, enhancing the cycle performance of the lithium-ion secondary battery.

EXPLANATION OF REFERENCE

101: electrode, 102: current collector, 103: active material layer, 111: active material particle, 112: film, 113: binder, 114: conductive additive, 115: space, 121: two fluid nozzle, 122: heating means, 123: spray cylinder, 124: cyclone, 125: container, 141: active material particle, 142: film, 143: binder, 144: conductive additive, 300: storage battery, 301: positive electrode can, 302: negative electrode can, 303: gasket, 304: positive electrode, 305: positive electrode current collector, 306: positive electrode active material layer, 307: negative electrode, 308: negative electrode current collector, 309: negative electrode active material layer, 310: separator, 500: lithium-ion secondary battery, 501: positive electrode current collector, 502: positive electrode active material layer, 503: positive electrode, 504: negative electrode current collector, 505: negative electrode active material layer, 506: negative electrode, 507: separator, 508: electrolytic solution, 509: exterior body, 521: positive electrode active material particle, 522: film, 523: binder, 524: conductive additive, 600: storage battery, 601: positive electrode cap, 602: battery can, 603: positive electrode terminal, 604: positive electrode, 605: separator, 606: negative electrode, 607: negative electrode terminal, 608: insulating plate, 609: insulating plate, 611: PTC element, 612: safety valve mechanism, 900: circuit board, 910: label, 911: terminal, 912: circuit, 913: storage battery, 914: antenna, 915: antenna, 916: layer, 917: layer, 918: antenna, 919: terminal, 920: display device, 921: sensor, 922: terminal, 951: terminal, 952: terminal, 980: storage battery, 981: film, 982: film, 991: exterior body, 992: exterior body, 993: wound body, 994: negative electrode, 995: positive electrode, 996: separator, 997: lead electrode, 998: lead electrode, 1201: curve, 1202: curve, 1203: curve, 1301: graphite, 1302: film, 1303: graphite, 1304: film, 1401: graphite, 1402: film, 7100: portable display device, 7101: housing, 7102: display portion, 7103: operation button, 7104: power storage device, 7200: portable information terminal, 7201: housing, 7202: display portion, 7203: band, 7204: buckle, 7205: operation button, 7206: input output terminal, 7207: icon, 7300: display device, 7304: display portion, 7400: mobile phone, 7401: housing, 7402: display portion, 7403: operation button, 7404: external connection port, 7405: speaker, 7406: microphone, 7407: power storage device, 7408: lead electrode, 8000: display device, 8001: housing, 8002: display portion, 8003: speaker portion, 8004: power storage device, 8021: ground-based charging apparatus, 8022: cable, 8100: lighting device, 8101: housing, 8102: light source, 8103: power storage device, 8104: ceiling, 8105: wall, 8106: floor, 8107: window, 8200: indoor unit, 8201: housing, 8202: air outlet, 8203: power storage device, 8204: outdoor unit, 8300: electric refrigerator-freezer, 8301: housing, 8302: door for refrigerator, 8303: door for freezer, 8304: power storage device, 8400: automobile, 8401: headlight, 8500: automobile, 9600: tablet terminal, 9625: power saving mode changing switch, 9626: display mode changing switch, 9627: power switch, 9628: operation switch, 9629: fastener, 9630: housing, 9630a: housing, 9630b: housing, 9631: display portion, 9631a: display portion, 9631b: display portion, 9632a: touch panel region, 9632b: touch panel region, 9633: solar cell, 9634: charge and discharge control circuit, 9635: power storage unit, 9636: DC-DC converter, 9637: converter, 9638: operation key, 9639: keyboard display switching button, 9640: movable portion This application is based on Japanese Patent Application serial No. 2014-050374 filed with Japan Patent Office on Mar. 13, 2014 and Japanese Patent Application serial No. 2014-216071 filed with Japan Patent Office on Oct. 23, 2014, the entire contents of which are hereby incorporated by reference.

The invention claimed is:

1. A method for fabricating an electrode, comprising:
preparing a dispersion liquid containing active material particles, an organosilicon compound, and a solvent;
forming powder by spraying and drying the dispersion liquid with a spray dryer;
performing heat treatment on the powder;
forming a slurry by mixing the powder, a conductive additive, a binder, and a solvent after performing the heat treatment; and
forming an active material layer by applying the slurry to a current collector and drying the slurry,
wherein in the step of performing heat treatment, the organosilicon compound deposited on the active material particles is hydrolyzed and condensed, so that a film containing silicon oxide as its main component is formed on at least part of a surface of each of the active material particles.

2. The method for fabricating an electrode, according to claim 1, wherein the active material particles contain graphite.

3. The method for fabricating an electrode, according to claim 1, wherein the organosilicon compound is any one of ethyl silicate, ethyl polysilicate, methyl polysilicate, propyl polysilicate, butyl polysilicate, tetramethoxysilane, tetraethoxysilane, tetrabutoxysilane, and tetrapropoxysilane.

4. The method for fabricating an electrode, according to claim 1, wherein the conductive additive contains carbon fiber.

5. The method for fabricating an electrode, according to claim 1, wherein the binder contains a water-soluble polymer.

6. The method for fabricating an electrode, according to claim 5, wherein the water-soluble polymer includes one or more of carboxymethyl cellulose, methyl cellulose, ethyl cellulose, hydroxypropyl cellulose, diacetyl cellulose, a styrene monomer, and a butadiene monomer.

* * * * *